United States Patent
Ikeda

(10) Patent No.: US 11,265,539 B2
(45) Date of Patent: Mar. 1, 2022

(54) ENCODING APPARATUS, ENCODING METHOD, DECODING APPARATUS, AND DECODING METHOD

(71) Applicant: SONY CORPORATION, Tokyo (JP)

(72) Inventor: Masaru Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/053,532

(22) PCT Filed: May 7, 2019

(86) PCT No.: PCT/JP2019/018214
§ 371 (c)(1),
(2) Date: Nov. 6, 2020

(87) PCT Pub. No.: WO2019/220947
PCT Pub. Date: Nov. 21, 2019

(65) Prior Publication Data
US 2021/0289200 A1 Sep. 16, 2021

(30) Foreign Application Priority Data

May 18, 2018 (JP) .............................. JP2018-095906

(51) Int. Cl.
*H04N 19/117* (2014.01)
*H04N 19/182* (2014.01)
*H04N 19/82* (2014.01)

(52) U.S. Cl.
CPC ......... *H04N 19/117* (2014.11); *H04N 19/182* (2014.11); *H04N 19/82* (2014.11)

(58) Field of Classification Search
CPC .... H04N 19/117; H04N 19/182; H04N 19/82; H04N 19/14
(Continued)

(56) References Cited

U.S. PATENT DOCUMENTS

2013/0343470 A1* 12/2013 Matsumura ............... G06T 5/20
375/240.29

FOREIGN PATENT DOCUMENTS

JP 2012-191310 A 10/2012

OTHER PUBLICATIONS

Karczewicz NPL cited by Applicant on Nov. 6, 2020 IDS. (Year: 2016).*

(Continued)

*Primary Examiner* — Matthew K Kwan
(74) *Attorney, Agent, or Firm* — Paratus Law Group, PLLC

(57) ABSTRACT

There is provided an encoding apparatus, an encoding method, a decoding apparatus, and a decoding method that make it possible to improve the performance of a filter process. The encoding apparatus and the decoding apparatus perform classification of classifying, according to a reliability degree determined according to a frequency distribution of inclination directions indicating directions of inclination of pixel values of a plurality of pixels in a frequency distribution generation region including a pixel of interest of a decoded image, the pixel of interest into any of a plurality of classes, and performs a filter process of applying, to the decoded image, a prediction formula for performing product sum calculation of tap coefficients of the class of the pixel of interest obtained by the classification and pixels of the decoded image. The present technology can be applied, for example, to a case in which encoding and decoding of an image are performed.

28 Claims, 28 Drawing Sheets

(58) Field of Classification Search
USPC .................................................. 375/240.29
See application file for complete search history.

(56) References Cited

OTHER PUBLICATIONS

Matsumura NPL cited by Applicant on Nov. 6, 2020 IDS. (Year: 2011).*

Karczewicz et al., Geometry Transformation-based Adaptive In-Loop Filter, 2016 Picture Coding Symposium (PCS), Dec. 4-7, 2016, pp. 1-5, IEEE, Nuremberg, Germany.

Suzuki et al., Description of SDR and HDR video coding technology proposal by Sony, Joint Video Experts Team (JVET) of ITU-T SG 16 WP 3 and ISO/IEC JTC 1/SC 29/WG 11, Apr. 10-20, 2018, pp. i and 13, $10^{th}$ Meeting: San Diego.

Matsumura et al., Modifications of in-loop filter based on non-local means filter, Joint Collaborative Team on Video Coding (JCT-VC) of ITU-T SG16 WP3 and ISO/IEC JTC1/SC29/WG11, Jul. 14-22, 2011, pp. 1-19, $6^{th}$ Meeting: Torino, IT.

Chen et al., Algorithm Description of Joint Exploration Test Model 7 (JEM 7), Joint Video Exploration Team (JVET) of ITU-T SG 16 WP 3 and ISO/IEC JTC 1/SC 29/WG 11, Jul. 13-21, 2017, pp. 1-46, $7^{th}$ Meeting: Torino, IT.

\* cited by examiner

FIG. 2

| MainDir | SecDir | direction | transpose | class |
|---|---|---|---|---|
| D0 | V | 0(000) | 0 | 0 |
| V | D0 | 2(010) | 0 | 2 |
| D0 | H | 1(001) | 1 | 0 |
| H | D0 | 6(110) | 1 | 2 |
| D1 | V | 4(100) | 2 | 0 |
| V | D1 | 3(011) | 2 | 2 |
| D1 | H | 5(101) | 3 | 0 |
| H | D1 | 7(111) | 3 | 2 |

DIRECTION CLASSIFICATION TABLE

PERIPHERAL REGION

| D0/V | D0/V | D0/H |
|---|---|---|
| D0/V | D0/V | D0/H |
| V/D0 | V/D0 | V/D0 |

SecDir PIXEL OF INTEREST
MainDir
PIXEL

FIG. 3

| FINAL CLASS | GRADIENT STRENGTH RATIO | DIRECTION CLASS | SPATIAL FEATURE AMOUNT |
|---|---|---|---|
| 0 | None ($r_{d1,d2} < t_1$ or $r_{h,v} < t_1$) | | Small |
| 1 | | | |
| 2 | | | |
| 3 | | | |
| 4 | | | Large |
| 5 | Weak ($t_1 \leq r_{d1,d2} < t_2$) | 0 (D0 or D1) | Small |
| 6 | | | |
| 7 | | | |
| 8 | | | |
| 9 | | | Large |
| 10 | Strong ($r_{d1,d2} \geq t_2$) | | Small |
| 11 | | | |
| 12 | | | |
| 13 | | | |
| 14 | | | Large |
| 15 | Weak ($t_1 \leq r_{h,v} < t_2$) | 2 (V or H) | Small |
| 16 | | | |
| 17 | | | |
| 18 | | | |
| 19 | | | Large |
| 20 | Strong ($r_{h,v} \geq t_2$) | | Small |
| 21 | | | |
| 22 | | | |
| 23 | | | |
| 24 | | | Large |

| FINAL CLASS | RELIABILITY DEGREE | DIRECTION CLASS | SPATIAL FEATURE AMOUNT |
|---|---|---|---|
| 0 | Low (RELIABILITY < p1) | | Small |
| 1 | | | |
| 2 | | | |
| 3 | | | |
| 4 | | | |
| 5 | Weak (p1 ≦ RELIABILITY < p2) | 0 (D0 or D1) | Large |
| 6 | | | Small |
| 7 | | | |
| 8 | | | |
| 9 | | | |
| 10 | Strong (p2 ≦ RELIABILITY) | | Large |
| 11 | | | Small |
| 12 | | | |
| 13 | | | |
| 14 | | | |
| 15 | Weak (p1 ≦ RELIABILITY < p2) | 2 (V or H) | Large |
| 16 | | | Small |
| 17 | | | |
| 18 | | | |
| 19 | | | |
| 20 | Strong (p2 ≦ RELIABILITY) | | Large |
| 21 | | | Small |
| 22 | | | |
| 23 | | | |
| 24 | | | Large |
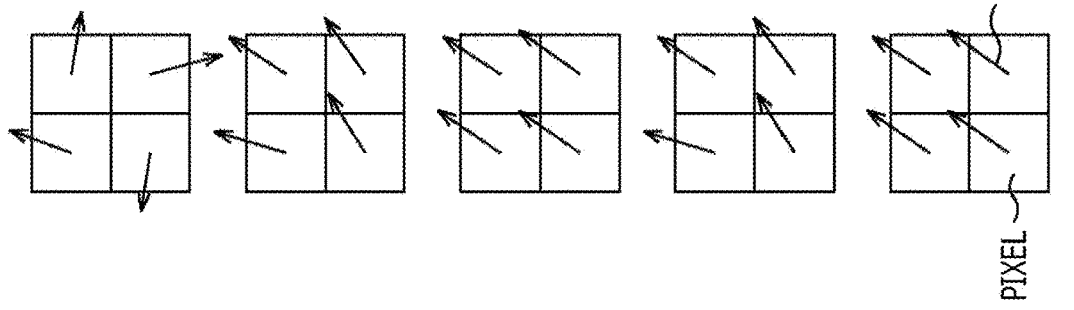
F I G. 7

FIG. 15

| FINAL CLASS | GRADIENT STRENGTH RATIO | DIRECTION CLASS AND RELIABILITY DEGREE | SPATIAL FEATURE AMOUNT |
|---|---|---|---|
| 0 | None ($r_{d1,d2} < t_1$ or $r_{h,v} < t_1$) | None (RELIABILITY $< p$) | Small |
| 1 | | | |
| 2 | | | |
| 3 | | | |
| 4 | | | |
| 5 | Weak ($t_1 \leq r_{d1,d2} < t_2$) | 0 (D0 or D1) ($p \leq$ RELIABILITY) | Large |
| 6 | | | Small |
| 7 | | | |
| 8 | | | |
| 9 | | | |
| 10 | Strong ($r_{d1,d2} \geq t_2$) | | Large |
| 11 | | | Small |
| 12 | | | |
| 13 | | | |
| 14 | | | |
| 15 | Weak ($t_1 \leq r_{h,v} < t_2$) | 2 (V or H) ($p \leq$ RELIABILITY) | Large |
| 16 | | | Small |
| 17 | | | |
| 18 | | | |
| 19 | | | |
| 20 | Strong ($r_{h,v} \geq t_2$) | | Large |
| 21 | | | Small |
| 22 | | | |
| 23 | | | |
| 24 | | | Large |

ENCODING APPARATUS, ENCODING METHOD, DECODING APPARATUS, AND DECODING METHOD

CROSS REFERENCE TO PRIOR APPLICATION

This application is a National Stage patent application of PCT International Patent Application No. PCT/JP2019/018214 (filed on May 7, 2019) under 35 U.S.C. § 371, which claims priority to Japanese Patent Application No. 2018-095906 (filed on May 18, 2018), which are all hereby incorporated by reference in their entirety.

TECHNICAL FIELD

The present technology relates to an encoding apparatus, an encoding method, a decoding apparatus, and a decoding method, and specifically to an encoding apparatus, an encoding method, a decoding apparatus, and a decoding method that make it possible to improve, for example, the performance of a filter process.

BACKGROUND ART

Work towards the start of standardization of FVC (Future Video Coding) as a succession standard of HEVC (High Efficiency Video Coding) is in progress, and as an ILF (In Loop Filter) used for encoding and decoding of an image, a bilateral filter (Bilateral Filter) and an ALF (Adaptive Loop Filter) are examined in addition to a deblocking filter and an adaptive offset filter (refer, for example, to NPL 1).

Further, as a filter for improving the existing ALF, a GALF (Geometry Adaptive Loop Filter) is proposed (refer, for example, to NPL 2).

CITATION LIST

Non Patent Literature

[NPL 1]
Algorithm description of Joint Exploration Test Model 7 (JEM7), 2017 Aug. 19
[NPL 2]
Marta Karczewicz, Li Zhang, Wei-Jung Chien, Xiang Li, "Geometry transformation-based adaptive in-loop filter," IEEE Picture Coding Symposium (PCS), 2016.

SUMMARY

Technical Problem

In regard to a filter process performed in an ILF, it is demanded to improve the performance of a filter process in order to improve the encoding efficiency and the picture quality.

The present technology has been made in view of such a situation as just described and makes it possible to improve the performance of a filter process.

Solution to Problem

A decoding apparatus of the present technology is a decoding apparatus including a decoding section configured to decode encoded data included in an encoded bit stream using a filter image to generate a decoded image, a classification section configured to perform classification of classifying, according to reliability degrees set according to a frequency distribution of inclination directions indicating directions of inclination of pixel values of a plurality of pixels in a frequency distribution generation region that includes a pixel of interest of the decoded image generated by the decoding section, the pixel of interest into any of a plurality of classes, and a filter section configured to perform a filter process of applying, to the decoded image, a prediction formula for performing product sum calculation of tap coefficients of a class of the pixel of interest obtained by the classification performed by the classification section and pixels of the decoded image to generate the filter image.

A decoding method of the present technology is a decoding method including decoding encoded data included in an encoded bit stream using a filter image to generate a decoded image, performing classification of classifying, according to reliability degrees set according to a frequency distribution of inclination directions indicating directions of inclination of pixel values of a plurality of pixels in a frequency distribution generation region that includes a pixel of interest of the decoded image, the pixel of interest into any of a plurality of classes, and performing a filter process of applying, to the decoded image, a prediction formula for performing product sum calculation of tap coefficients of a class of the pixel of interest obtained by the classification and pixels of the decoded image to generate the filter image.

In the decoding apparatus and the decoding method of the present technology, encoded data included in an encoded bit stream is decoded using a filter image to generate a decoded image. Further, classification of classifying, according to reliability degrees set according to a frequency distribution of inclination directions indicating directions of inclination of pixel values of a plurality of pixels in a frequency distribution generation region that includes a pixel of interest of the decoded image, the pixel of interest into any of a plurality of classes is performed. Then, a filter process of applying, to the decoded image, a prediction formula for performing product sum calculation of tap coefficients of a class of the pixel of interest obtained by the classification and pixels of the decoded image is performed to generate the filter image.

An encoding apparatus of the present technology is an encoding apparatus including a classification section configured to perform classification of classifying, according to a reliability degree set according to a frequency distribution of inclination directions indicating directions of inclination of pixel values of a plurality of pixels in a frequency distribution generation region including a pixel of interest of a decoded image decoded locally, the pixel of interest into any of a plurality of classes, a filter section configured to perform a filter process of applying, to the decoded image, a prediction formula for performing product sum calculation of tap coefficients of the class of the noticed pixel obtained by the classification performed by the classification section and pixels of the decoded image to generate a filter image, and an encoding section configured to encode an original image using the filter image generated by the filter section.

An encoding method according to the present technology is an encoding method including performing classification of classifying, according to a reliability degree set according to a frequency distribution of inclination directions indicating directions of inclination of pixel values of a plurality of pixels in a frequency distribution generation region including a pixel of interest of a decoded image decoded locally, the pixel of interest into any of a plurality of classes, performing a filter process of applying, to the decoded image, a prediction formula for performing product sum calculation of tap coefficients of the class of the pixel of interest obtained by the classification and pixels of the decoded image to generate a filter image, and encoding an original image using the filter image.

In the encoding apparatus and the encoding method of the present technology, classification of classifying, according to a reliability degree set according to a frequency distribution of inclination directions indicating directions of inclination of pixel values of a plurality of pixels in a frequency distribution generation region including a pixel of interest of a decoded image decoded locally, the pixel of interest into any of a plurality of classes is performed. Further, a filter process of applying, to the decoded image, a prediction formula for performing product sum calculation of tap coefficients of the class of the pixel of interest obtained by the classification and pixels of the decoded image is performed to generate a filter image. Then, an original image is encoded using the filter image.

It is to be noted that the encoding apparatus and the decoding apparatus may each be an independent apparatus or may each be an internal block configuring one apparatus.

Further, the encoding apparatus and the decoding apparatus can be implemented by causing a computer to execute a program. The program can be provided by transmitting the same through a transmission medium or by recording the same on a recording medium.

Advantageous Effect of Invention

According to the present technology, the performance of a filter process can be improved.

It is to be noted that the advantageous effect described is not necessarily restrictive and may be any of advantageous effects described in the present disclosure.

BRIEF DESCRIPTION OF DRAWINGS

FIG. 2 is a view illustrating how to obtain the direction of GALF as a specified direction (inclination direction) of a pixel of interest.

FIG. 3 is a view illustrating classes that are obtained by classification of GALF.

FIG. 7 is a view illustrating classes that are obtained by classification of the first frequency distribution method.

FIG. 15 is a view illustrating how to obtain, in classification of the fourth frequency distribution method, a class that is obtained by classification of GALF as a final class.

DESCRIPTION OF EMBODIMENT

Figure 1:
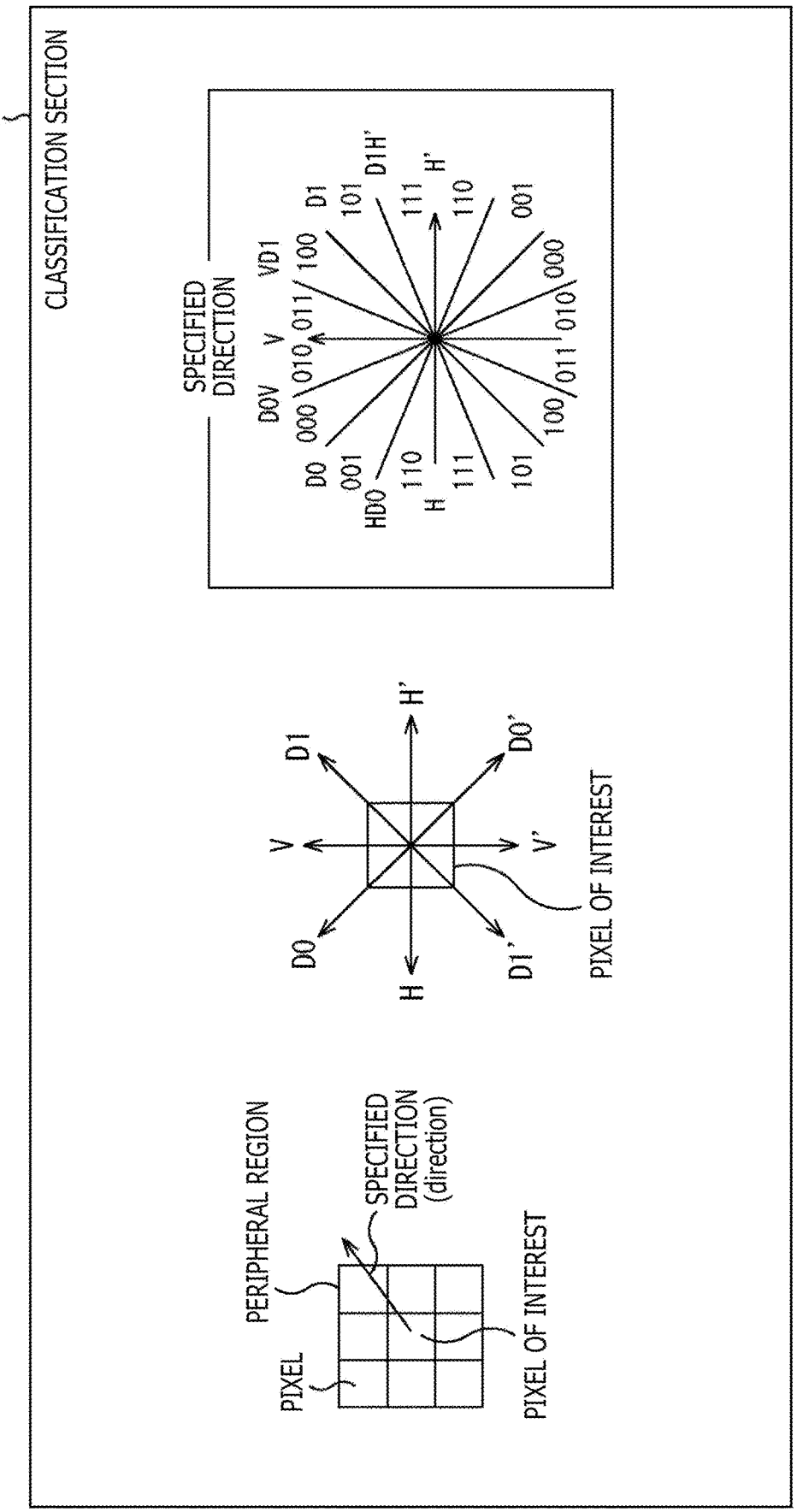
FIG. 1 is a view illustrating an overview of processing of a classification section 10 that performs classification of GALF.

<Documents, etc. That Support Technical Contents and Technical Terms>

The scope disclosed by the present application includes not only contents described in the present specification and the drawings but also the contents described in the following documents that were publicly known at the time of application.

Document 1: AVC Standard ("Advanced video coding for generic audiovisual services," ITU-T H.264 (April 2017))
Document 2: HEVC Standard ("High efficiency video coding," ITU-T H.265 (December 2016))
Document 3: FVC Algorithm Manual (Algorithm description of Joint Exploration Test Model 7 (JEM7), 2017 Aug. 19)

In short, also the contents described in the documents specified above become the grounds for determining sport requirements. For example, even in the case where Quad-Tree Block Structure described in Document 1 or QTBT (Quad Tree Plus Binary Tree) or Block Structure described in Document 3 are not directly described in the description of the embodiment, they fall within the scope of disclosure of the present technology and satisfy the support requirements for the claims. Further, even where such technical terms as parse (Parsing), syntax (Syntax), and semantics (Semantics) are not directly described in the description of the embodiment, they fall within the scope of disclosure of the present technology and satisfy the support requirements for the claims similarly.

Further, unless otherwise mentioned specifically, "block" (that is not a block indicative of a processing section) used in description as a partial region of an image (picture) or a processing unit indicates an optional partial region in a picture and is not restrictive in terms of the size, shape, characteristic, and so forth. For example, the "block" is any optional partial region (processing unit) such as TB (Transform Block), TU (Transform Unit), PB (Prediction block), PU (Prediction Unit), SCU (Smallest Coding Unit), CU (Coding Unit), LCU (Largest Coding Unit), CTB (Coding Tree Block), CTU (Coding Tree Unit), transform block, sub block, macro block, tile, or slice described in Document 1 to Document 3 given above.

Further, when to designate a size of such a block as described above, a block size may be designated not only directly but also indirectly. For example, identification information for identifying a size may be used to designate a block size. As an alternative, for example, a block size may be designated by a ratio or a difference with respect to a size of a block that is made a reference (for example, an LCU or an SCU). For example, in the case where information that designates a block size is transmitted as a syntax element or the like, such information that indirectly designates a size as described above may be used as the information. This sometimes makes it possible to reduce the information amount of the information and improve the encoding efficiency. Further, the designation of a block size includes also a designation of a range of a block size (for example, a designation of a range of a permissible block size or the like).

<Definition>

In the present application, the following terms are defined in the following manner.

Encoded data is data obtained by encoding an image and is data, for example, obtained by orthogonally transforming and quantizing (a residual of) an image.

An encoded bit stream is a bit stream including encoded data and includes, as occasion demands, encoding information relating to encoding. The encoding information includes information necessary to decode encoded data, that is, for example, at least a quantization parameter (QP) in the case where quantization is performed in encoding, a motion vector in the case where prediction encoding (motion compensation) is performed in encoding and so forth.

Acquirable information is information that can be acquired from an encoded bit stream. Accordingly, the acquirable information also is information that can be acquired by any of an encoding apparatus that encodes an image to generate an encoded bit stream and a decoding apparatus that decodes the encoded bit stream into an image. The acquirable information includes, for example, encoding information placed in an encoded bit stream and an image feature amount of an image obtained by decoding encoded data included in an encoded bit stream.

A prediction formula is a polynomial for predicting second data from first data. In the case where the first data and the second data are each, for example, an image (data), the prediction formula is a polynomial for predicting the second image from the first image. Each of the terms of the prediction formula in the form of a polynomial is configured from the product of one tap coefficient and one or more prediction taps. Accordingly, the prediction formula is a formula for performing product sum calculation of a tap coefficient and a prediction tap or taps. If (the pixel value) of a pixel as an i-th prediction tap to be used for prediction of a pixel of a first image is represented by $x_i$; the i-th tap coefficient is represented by $w_i$; and besides (the prediction value of a pixel value of) a pixel of a second image is represented by y' and a polynomial including only first-order terms is adopted as the prediction formula, then the prediction formula is represented by an expression $y'=\Sigma w_i x_i$. In the expression $y'=\Sigma w_i x_i$, $\Sigma$ represents summation regarding i. The tap coefficient $w_i$ configuring the prediction formula can be obtained by learning that statistically minimizes the error y'-y of the value y' obtained by the prediction formula from the true value y. As the method of leaning for obtaining a tap coefficient (hereinafter referred to as tap coefficient learning), a least-squares method is applicable. In the tap coefficient learning, a normal equation is set up by performing, using a student image corresponding to a first image to which the prediction formula is applied and used as student data (input $x_i$ to the prediction formula) that becomes a student of learning and a teacher image corresponding to a second image to be obtained as a result of application of the prediction formula to the first image and used as a teacher data that becomes a teacher of learning (true value y of a prediction value obtained by calculation of the prediction formula), addition of coefficients of the terms configuring the prediction formula (summation of the coefficients), and by solving the normal equation, a tap coefficient that minimizes the sum total of the squared errors of the prediction values y'.

A prediction process is a process of predicting the second image by applying the prediction formula to the first image. In the prediction process, (pixel values) of pixels of the first image are used to perform product sum calculation as calculation of the prediction formula to obtain prediction values of the second image. To perform the product sum calculation using the first image can be regarded as a filter process of applying a filter to the first image, and the prediction process of performing product sum calculation of the prediction formula (product sum calculation as calculation of the prediction formula) using the first image can be regarded as a kind of filter process.

A filter image signifies an image obtained as a result of the filter process. The (prediction values of the) second image obtained from the first image by the filter process as a prediction process is a filter image.

A tap coefficient is a coefficient configuring each term of a polynomial of the prediction formula and corresponds to a filter coefficient by which a signal of a target of filtering at a tap of a digital filter is multiplied.

A prediction tap is information of (a pixel value of) a pixel used for calculation of the prediction formula or the like and is multiplied to a tap coefficient in the prediction formula. The prediction tap includes not only (a pixel value of) a pixel itself but also a value obtained from pixels, for example, the sum total, an average value or the like of (pixel values of) pixels in a certain block.

Here, to select a pixel or the like as a prediction tap to be used in calculation of the prediction formula corresponds to stretching (arranging) a connection line for supplying a signal to be inputted to a tap of a digital filter, and therefore, to select a pixel as a prediction tap to be used in calculation of the prediction formula is referred to also as "to stretch a prediction tap."

Classification signifies to classify (cluster) a pixel into any of a plurality of classes. The classification can be performed, for example, using (pixel values of) pixels in a peripheral region of a pixel of interest or encoding information relating to the pixel of interest. The encoding information relating to a pixel of interest may be, for example, a quantization parameter used for quantization of the pixel of interest, DF (Deblocking Filter) information relating to a deblocking filter applied to the pixel of interest and so forth. The DF information is, for example, such information regarding which one of a strong filter and a weak filter is applied or none of them is applied in a deblocking filter.

A classification prediction process is a filter process as a prediction process performed for each class. A basic principle of the classification prediction process is described, for example, in Japanese Patent No. 4449489 and so forth.

A high-order term is a term having a product of (pixels as) two or more prediction taps among the terms configuring a polynomial as the prediction formula.

A D-order term is a term having a product of D prediction taps from among the terms configuring a polynomial as the prediction formula. For example, the first-order term is a term having one prediction tap, and a second-order term is a term having a product of two prediction taps. In the product of prediction taps configuring a D-order term, the prediction taps of the multiplication may be same prediction taps (pixels).

A D-order coefficient signifies a tap coefficient configuring the D-order term.

A D-order tap signifies (a pixel as) a prediction tap configuring the D-order term. It sometimes occurs that a certain one pixel is a D-order tap and besides is a D'-order tap different from the D-order tap. Further, the tap structure of the D-order tap and the tap structure of the D'-order tap different from the D-order tap need not be same as each other.

A DC (Direct Current) prediction formula is a prediction formula including a DC term.

A DC term is a term of the product of a value indicating a DC component of an image as a prediction tap among terms configuring a polynomial of the prediction formula and a tap coefficient.

A DC tap signifies a prediction tap of a DC term, namely, a value indicating a DC component.

A DC coefficient signifies a tap coefficient of the DC term.

A first-order prediction formula is a prediction formula including only first-order terms.

A higher-order prediction formula is a prediction formula including a higher-order term, namely, a prediction formula including a first-order term or terms and higher-order terms of a second or higher order or orders.

If an i-th prediction tap (pixel value or the like) to be used for prediction of a pixel of a first image is represented by $x_i$; the i-th tap coefficient is represented by $w_i$; and (the prediction value of a pixel value of) a pixel of a second image to be obtained by the prediction formula is represented by y, then the first-order prediction formula is represented by an expression $y=\Sigma w_i x_i$.

Meanwhile, a higher-order prediction formula including only first and second order terms is represented, for example, by an expression $y=\Sigma w_i x_i + \Sigma(\Sigma w_{j,k} x_k) x_j$.

Furthermore, for example, a DC prediction formula including a DC term in a first order prediction formula is represented by an expression $\Sigma w_i x_i + w_{DCB} DCB$. Here, $W_{DCB}$ represents a DC coefficient, and DCB represents a DC tap.

Any of tap coefficients of a first order prediction formula, a higher-order prediction formula, and a DC prediction formula can be obtained by performing tap coefficient learning by such a least-squares method as described hereinabove.

In the present embodiment, in order to simplify the description, a first order prediction formula is adopted as the prediction formula.

A tap structure signifies arrangement of a pixel as a prediction (for example, with reference to a position of the pixel of interest). The tap structure can be regarded also as how to set a prediction tap. In the case where a first order prediction formula is adopted, if a state is considered in which, at a position of a pixel configuring a prediction tap, a tap coefficient to be multiplied to the pixel is arranged, then the tap structure can be regarded also as arrangement of a tap coefficient. Therefore, the tap structure herein signifies any of arrangement of a pixel configuring a prediction tap of a pixel of interest and arrangement of a tap coefficient in a state in which, at a position of a pixel configuring a prediction tap, a tap coefficient to be multiplied to the pixel is arranged.

An activity (of an image) signifies a change condition of a spatial pixel value of a pixel.

A decoded image is an image obtained by decoding encoded data obtained by encoding an original image. The decoded image includes an image obtained by decoding an encoded data by a decoding apparatus and an image obtained, in the case where an original image is prediction encoded by an encoding apparatus, by local decoding of the prediction encoding. In particular, in the case where an original image is prediction encoded by an encoding apparatus, a prediction image and a (decoded) residual are added in local decoding, and an addition result of the addition is a decoded image. In the case where an ILF is used for local decoding of the encoding apparatus, a decoded image that is an addition result of a prediction image and a residual is made a target of a filter process of the ILF, and the decoded image after the filter process of the ILF is also a filter image.

An inclination direction (of a pixel) signifies a direction of inclination of a pixel value, for example, a direction in which the inclination of a pixel value is in the maximum. It is to be noted that the direction in which the inclination of a pixel value is a maximum is a direction orthogonal to a contour line of pixel values and perpendicularly crosses with a tangential direction of a contour line of pixel values, and therefore, has a one-to-one relationship with a tangential direction tor a contour line of pixel values. Accordingly, a direction in which the inclination of a pixel value is in the maximum and a tangential direction to a contour line of pixel values is equivalent information, and the term tangential direction is used to include both of a direction in which the inclination of a pixel value is in the maximum and a tangential direction of a contour line of pixel values. In the present embodiment, for the inclination direction, the direction in which the inclination of a pixel value is in the maximum is adopted.

A specified direction signifies a discrete direction determined in advance. As a representation method of a direction, for example, a method of representing successive directions by successive angles, a method of representing a direction by two different discrete directions of a horizontal direction and a vertical direction, a method of representing a direction by a discrete direction among eight directions into which the circumference of 360 degrees is divided at equal angles and so forth can be adopted. The specified direction signifies a direction represented by a discrete direction determined in advance. For example, the direction used in GALF described in NPL 2, a direction represented by a direction class of GALF (two types of directions including any one of the V direction or the H direction hereinafter described or any one of the D0 direction or the D1 direction), or the like is an example of the specified direction.

When the term inclination direction is used, it includes directions represented successively by successive angles and specified angles. In other words, an inclination direction can be represented not only by a successive direction but also by a specified direction.

A gradient feature amount is a feature amount of an image indicating an inclination direction. For example, an activity of each direction or a gradient vector (gradient) obtained by applying a Sobel filter or the like to an image is an example of the gradient feature amount.

As the gradient feature amount, a gradient feature amount of a pixel and a gradient feature amount of a region are available. The gradient feature amount of a pixel is a gradient feature amount obtained, focusing on one pixel, by processing for the one pixel. The gradient feature amount of a region is a gradient feature amount that is used comprehensively by performing a statistical process or the like individually for gradient feature amounts of a plurality of pixels in the region. The gradient feature amount of a pixel can be regarded as a local gradient feature amount because one pixel is focused, and the gradient feature amount of a region can be regarded as a macro gradient feature amount because it is obtained comprehensively using gradient feature amounts of a plurality of pixels. For example, an activity obtained by applying a Laplacian filter to one pixel is an example of a gradient feature amount of a pixel (local gradient feature amount), and a sum value obtained by adding activities individually of a plurality of pixels in a peripheral region of a pixel of interest (hereinafter referred to also as activity sum) is an example of the gradient feature amount of a region (macro gradient feature amount).

A reliability degree of a gradient direction signifies a reliability degree (certainty) of a gradient direction of a pixel obtained by some method.

A frequency distribution generation region is a predetermined region including the pixel of interest and is a region of pixels used for generation of a frequency distribution of gradient directions (specified directions).

A feature amount of a gradient direction signifies a feature amount of an image of a gradient direction. For example, an activity of a gradient direction is an example of a feature amount of a gradient direction.

<Overview of Classification of GALF>

FIG. 1 is a view illustrating an overview of processing of a classification section 10 that performs classification of GALF.

In particular, FIG. 1 depicts an overview of classification of JVET (Joint Video. Exploration Team)-B0060.

The classification section 10 successively selects pixels, which become a target of classification in a decoded image (including a decoded image obtained by local decoding by the encoding apparatus), as a pixel of interest and obtains an activity of each of a plurality of directions whose start point is the pixel of interest as a gradient feature amount of the pixel of interest.

The classification section 10 adopts, as the plurality of directions from a start point given by the pixel of interest, for example, four directions including an upper direction as a vertical direction, a left direction as a horizontal direction, and an upper left direction and an upper right direction from a start point given by the pixel of interest.

Here, as depicted in FIG. 1, the upper direction, left direction, upper left direction, and upper right direction are referred to also as V direction, H direction, D0 direction, and D1 direction, respectively. Further, point symmetry directions (opposite directions) to the V direction, H direction, D0 direction, and D1 direction with respect to (the position of) the pixel of interest are referred to also as V' direction, H' direction, D0' direction, and D1' direction, respectively.

Since activities of an image are frequently point symmetric, in classification of GALF, for activities in two directions of point symmetry, an activity in one of the two directions is used as the other (substituted). In particular, for the activities in the V direction and the V' direction, the activity in the V direction is used as both activities, and for the activities in the H direction and the H' direction, the activity in the H direction is used as both activities. For the activities in the D0 direction and the D0' direction, the activity in the D0 direction is used as both activities, and for the activities in the D1 direction and the D1' direction, the activity in the D1 direction is used as both activities.

Since the V direction, H direction, D0 direction, and D1 direction are directions in which an activity is obtained in classification of GALF, they can be regarded as activity calculation directions. Since the V direction, H direction, D0 direction, and D1 direction that are the activity calculation directions are discrete directions determined in advance, they are (kinds of) specified directions.

The classification section 10 calculates the activities A(D) in the D directions (V direction, H direction, D0 direction, and D1 direction) of a pixel of interest by applying, for example, a Laplacian filter to a decoded image including the pixel of interest. In this case, the activities A(V), A(H), A(D0), and A(D1) of the respective V direction, H direction, D0 direction, and D1 direction of the pixel of interest can be obtained, for example, in accordance with the following expressions.

$$A(V)=\text{abs}((L[y][x]<<1)L[y-1][x]L[y+1][x])$$

$$A(H)=\text{abs}((L[y][x]<<1)L[y][x-1]L[y][x+1])$$

$$A(D0)=\text{abs}((L[y][x]<<1)L[y-1][x-1]L[y+1][x+1])$$

$$A(D1)=\text{abs}((L[y][x]<<1)L[y+1][x-1]L[y-1][x+1]) \quad (1)$$

Here, L[y][x] represents a pixel value (luminance value) of a pixel at a position in the y row in the x column of the decoded image, and in the present case, the pixel at the position in the y row in the x column of the noticed image is the pixel of interest. Further, abs(V) represents an absolute value of v, and v<<b represents to shift v by b bits left (to multiply by $2^b$).

The classification section 10 obtains an activity of each of a plurality of pixels in a peripheral region of the pixel of interest similarly. Then, the classification section 10 adds the individual activities of the plurality of pixels in the peripheral region of the pixel of interest for the V direction, H direction, D0 direction, and D1 direction to obtain sum values of the activities (hereinafter referred to also as activity sum (activity summation) individually in the V direction, H direction, D0 direction, and D1 direction.

In the present embodiment, for example, as depicted in FIG. 1, a region of 3×3 pixels in horizontal direction× vertical direction centering on the pixel of interest is the peripheral region that is made a target for which the activities A(D) as the gradient feature amounts are used comprehensively, and the activities A(V) of the expression (1) for the 3×3 pixels of the peripheral region are added to obtain an activity sum sumA(V) in the V direction of the pixel of interest. The activity sums sumA(H), sumA(D0), and sumA(D1) in the H direction, D0 direction, and D1 direction of the pixel of interest can be obtained in a similar manner. Here, the peripheral region is not limited to a region of 3×3 pixels. As the peripheral region that is made a target for which gradient feature amounts are used comprehensively (here, a peripheral region to be made a target of addition of the activities A(D)), not only a region of 3×3 pixel but also a region of 6×6 pixels including the pixel of interest and any other optional region including the pixel of interest can be adopted.

The classification section 10 uses the activity sums sumA(V), sumA(H), sumA(D0), and sumA(D1) in the V direction, H direction, D0 direction, and D1 direction of the pixel of interest to obtain the direction of GALF as a specified direction indicating an inclination direction of the pixel of interest.

Here, the direction of GALF as a specified direction includes eight directions to which 000 to 111 in binary number, 0 to 7 in decimal number, are allocated as depicted in FIG. 1. In GALF, as the direction as a specified direction, eight directions in total are determined in advance including a direction between the H direction and a direction HD0 that bisects the H direction and the D0 direction, a direction between the direction HD0 and the D0 direction, a direction between the D0 direction, and a direction D0V that bisects the D direction and the V direction; a direction between the direction D0V and the V direction, a direction between the V direction and a direction VD1 that bisects the V direction and the D1 direction, a direction between the direction VD1 and the D1 direction, a direction between the D1 direction and a direction D1H' that bisects the D1 direction and the H' direction, and a direction between the direction D1H' and the H' direction.

To a direction between the H direction and the direction HD0, 110 in binary number is allocated; to a direction between the direction HD0 and the D0 direction, 001 in binary number is allocated; to a direction between the D0 direction and the direction D0V, 000 in binary number is allocated; to a direction between the direction D0V and the V direction, 010 in binary number is allocated; to a direction between the V direction and the direction VD1, 011 in binary number is allocated; to a direction between the direction VD1 and the D1 direction, 100 in binary number is allocated; to a direction between the D1 direction and the direction D1H', 101 in binary number is allocated; and to a direction between the direction D1H' and the H' direction, 111 in binary number is allocated. It is to be noted that, in GALF, the individual eight directions and directions point symmetrical to the individual eight directions are treated as respectively same directions.

The classification section 10 obtains (sets) a direction class indicating an inclination direction of a pixel of interest from the GALF direction as the specified direction of the pixel of interest. The direction class of GALF represents two types of directions that are one of the V direction and the H direction and one of the D0 direction and the D1 direction.

Here, since to obtain a direction class configures part of the classification of GALF performed by the classification section 10, it can be regarded as subclass classification. Subclass classification for obtaining a direction class is hereinafter referred to as direction subclass classification.

The classification section 10 classifies a pixel of interest according to a direction class of the pixel of interest and the activity sums sumA(V), sumA(H), sumA(D0), and sumA(D1) in the V direction, H direction, D0 direction, and D1 direction.

FIG. 2 is a view illustrating how to obtain the direction of GALF as a specified direction (inclination direction) of a pixel of interest.

FIG. 2 depicts examples of MainDir and SecDir obtained (set) using the activity sums sumA(V), sumA(H), sumA(D0), and sumA(D1) in the V direction, H direction, D0 direction, and D1 direction of the pixel of interest in classification of GALF. Further, FIG. 2 depicts a direction classification table indicative of a relationship between MainDir and SecDir used in classification of GALF and the GALF direction and a relationship between the GALF direction and transpose and class.

The classification section 10 compares, after it obtains the activity sums sumA(V), sumA(H), sumA(D0), and sumA(D1) in the V direction, H direction, D0 direction, and D1 direction, the activity sums sumA(H) and sumA(V) with each other, and determines a higher one of activity sums as a first winner activity HVhigh and determines the other one of the activity sums as a first loser activity HVlow.

Further, the classification section 10 compares the activity sums sumA(D0) and sumA(D1) with each other, and determines a higher one of them as a second winner activity Dhigh and the other one of them as a second loser activity Dlow.

Then, the classification section 10 compares a multiplication value HVhigh×Dlow of the first winner activity HVhigh and the second loser activity Dlow and a multiplication value Dhigh×HVlow of the second winner activity Dhigh and the first loser activity HVlow with each other.

In the case where the multiplication value HVhigh×Dlow is higher than the multiplication value Dhigh×HVlow, the classification section 10 determines a direction (H direction or V direction) in which the first winner activity HVhigh is obtained as MainDir (Main Direction) and determines the direction (D0 direction or D1 direction) in which the second winner activity Dhigh is obtained as SecDir (Second Direction).

On the other hand, in the case where HVhigh×Dlow is not higher than Dhigh×HVlow, the classification section 10 determines the direction in which the second winner activity Dhigh is obtained as MainDir and determines the direction in which the first winner activity HVhigh is obtained as SecDir.

In FIG. 2, MainDir and SecDir of the pixel of interest are the D0 direction and the V direction, respectively.

The classification section 10 determines the GALF direction allocated to MainDir and SecDir of the pixel of interest in the direction classification table as the GALF direction of the specified direction of the pixel of interest. Further, the classification section 10 determines the transpose and class allocated to the GALF direction of the pixel of interest in the direction classification table as the transpose and class of the pixel of interest.

Here, although, in GALF, a filter coefficient is transposed and used in a filter process, the transpose represents how to transpose a filter coefficient. The class represents a direction class. As the direction class of GALF, two classes represented by 0 and 2 in decimal number are available. The direction class can be obtained by logical ANDing of the GALF direction of the pixel of interest and the decimal number 010. The direction class 0 represents that the inclination direction is the D0 direction or the D1 direction, and the direction class 2 represents that the inclination direction is the V direction or the H direction.

FIG. 3 is a view illustrating classes obtained by classification of GALF.

In the classification of GALF performed by the classification section 10, a pixel of interest is classified into any of 25 classes of final classes 0 to 24.

In particular, the classification section 10 uses the direction class of the noticed class and the activity sums sumA(V), sumA(H), sumA(D0), and sumA(D1) in the V direction, H direction, D0 direction, and D1 direction of the pixel of interest as occasion demands to obtain a gradient strength ratio, and obtains (sets) a class of the pixel of interest indicating the gradient strength ratio according to the obtained gradient strength ratio.

Here, to obtain a class indicating the gradient strength ratio can be regarded as subclass classification because it configures part of the classification of GALF performed by the classification section 10. The subclass classification for obtaining a class indicating a gradient strength ratio is hereinafter referred to also as gradient strength ratio subclass classification.

In the case where the direction class of a pixel of interest is the direction class 0 corresponding to the D0 direction or the D1 direction, the classification section 10 calculates a ratio $r_{d1,d2}$ of the activity sums sumA(D0) and sumA(D1) in the D0 direction and the D1 direction as a gradient strength ratio.

In particular, the gradient strength ratio $r_{d1,d2}$ is obtained in accordance with an expression (2).

$$r_{d1,d2} = \max\{sumA(D0), sumA(D1)\}/\min\{sumA(D0), sumA(D1)\} \quad (2)$$

Here, max{A, B} represents a greater one of A and B, and min{A, B} represents a smaller one of A and B.

In the case where the gradient strength ratio $r_{d1,d2}$ is lower than a first threshold value $t_1$, the pixel of interest is classified into a none (None) class as a gradient strength ratio subclass in which the gradient strength ratio is very low.

In the case where a pixel of interest is classified into the none class in the gradient strength ratio subclass classification, the classification section 10 classifies the pixel of interest into a class that is final (hereinafter referred to also as final class) according to the activity sums sumA(V), sumA(H), sumA(D0), and sumA(D1) of the V direction, H direction, D0 direction, and D1 direction as the spatial feature amount of the pixel of interest.

In particular, the pixel of interest classified into the none class in the gradient strength ratio subclass classification is classified into any of the final classes 0 to 4 according to the activity sums sumA(V), sumA(H), sumA(D0), and sumA(D1) of the V direction, H direction, D0 direction, and D1 direction of the pixel of interest.

In the case where the gradient strength ratio $r_{d1,d2}$ is equal to or higher than the first threshold value $t_1$ but lower than a second threshold value $t_2$, the pixel of interest is classified into a weak (Weak) class as a gradient strength ratio subclass, in which the gradient strength ratio is low.

In the case where the pixel of interest is classified into the weak class in the gradient strength ratio subclass classification, the classification section 10 classifies the pixel of interest into a final class according to the activity sums sumA(V), sumA(H), sumA(D0), and sumA(D1) in the V direction, H direction, D0 direction, and D1 direction as the spatial feature amount of the pixel of interest.

In particular, the pixel of interest classified into the weak class in the gradient strength ratio subclass classification is classified into any of the final classes 5 to 9 according to the activity sums sumA(V), sumA(H), sumA(D0), and sumA(D1) of the V direction, H direction, D0 direction, and D1 direction of the pixel of interest.

In the case where the gradient strength ratio $r_{d1,d2}$ is equal to or higher than the second threshold value $t_2$, the pixel of interest is classified into a strong (Strong) class as a gradient strength ratio subclass in which the gradient strength ratio is high.

In the case where the pixel of interest is classified into the strong class in the gradient strength ratio subclass classification, the classification section 10 classifies the pixel of interest into a final class according to the activity sums sumA(V), sumA(H), sumA(D0), and sumA(D1) of the V direction, H direction, D0 direction, and D1 direction as the spatial feature amount of the pixel of interest.

In particular, the pixel of interest classified into the strong class in the gradient strength ratio subclass classification is classified into any of the final classes 10 to 14 according to the activity sums sumA(V), sumA(H), sumA(D0), and sumA(D1) of the V direction, H direction, D0 direction, and D1 direction of the pixel of interest.

On the other hand, in the case where the direction class of the pixel of interest is the direction class 2 corresponding to the V direction or the H direction, the classification section 10 calculates a ratio $r_{h,v}$ of the activity sums sumA(V) and sumA(H) of the V direction and the H direction as a gradient strength ratio.

In particular, the gradient strength ratio $r_{h,v}$ is obtained in accordance with an expression (3).

$$r_{h,v} = \max\{sumA(V), sumA(H)\}/\min\{sumA(V), sumA(H)\} \quad (3)$$

In the case where the gradient strength ratio $r_{h,v}$ is lower than the first threshold value $t_1$, the pixel of interest is classified into the none (None) class as a gradient strength ratio subclass in which the gradient strength ratio is very low.

In the case where the pixel of interest is classified into the none class in the gradient strength ratio subclass classification, the classification section 10 classifies the pixel of interest into any of the final classes 0 to 4 according to the activity sums sumA(V), sumA(H), sumA(D0), and sumA(D1) of the V direction, H direction, D0 direction, and D1 direction as the spatial feature amount of the pixel of interest.

In the case where the gradient strength ratio $r_{h,v}$ is equal to or higher than the first threshold value $t_1$ but lower than the second threshold value $t_2$, the pixel of interest is classified into the weak (Weak) class as a gradient strength ratio subclass in which the gradient strength ratio is low.

In the case where the pixel of interest is classified into the weak class in the gradient strength ratio subclass classification, the classification section 10 classifies the pixel of interest into any of the final classes 15 to 19 according to the activity sums sumA(V), sumA(H), sumA(D0), and sumA(D1) in the V direction, H direction, D0 direction, and D1 direction as the spatial feature amount of the pixel of interest.

In the case where the gradient strength ratio $r_{h,v}$ is equal to or higher than the second threshold value $t_2$, the pixel of interest is classified into the strong (Strong) class as a gradient strength ratio subclass in which the gradient strength ratio is high.

In the case where the pixel of interest is classified into the strong class in the gradient strength ratio subclass classification, the classification section 10 classifies the pixel of interest into any of the final classes 20 to 24 according to the activity sums sumA(V), sumA(H), sumA(D0), and sumA (D1) in the V direction, H direction, D0 direction, and D1 direction as the spatial feature amount of the pixel of interest.

The classification of GALF described above is free from a way of thinking of the reliability degree of an inclination direction.

Further, in the classification of GALF, the activities A(D) individually of a plurality of pixels (in FIG. 1, 3×3 pixels) in a peripheral region of a pixel of interest can be regarded as local gradient feature amounts, and the activity sums sumA(D) can be regarded as macro gradient feature amounts obtained comprehensively using the activities A(D) individually of the plurality of pixels in the peripheral region as the local gradient feature amounts. Although, in the classification of GALF, the activity sums sumA(D) as macro gradient feature amounts are used, the activities A(D) themselves as the local gradient feature amounts are not used.

Here, according to the inventor of the present disclosure, it has been confirmed that, by introducing the reliability degree of an inclination direction into classification in a filter process as a classification prediction process, a performance of the filter process is improved, namely, an error of a filter image obtained by the filter process from an original image decreases and the encoding efficiency and the picture quality of a filter image that is a final decoded image are improved.

Therefore, in the following, classification that is performed according to the reliability degree of an inclination direction is described. A method of the classification performed according to the reliability degree of an inclination direction is referred to also as reliability method.

<Classification of Inner Product Reliability Method>

Figure 4:
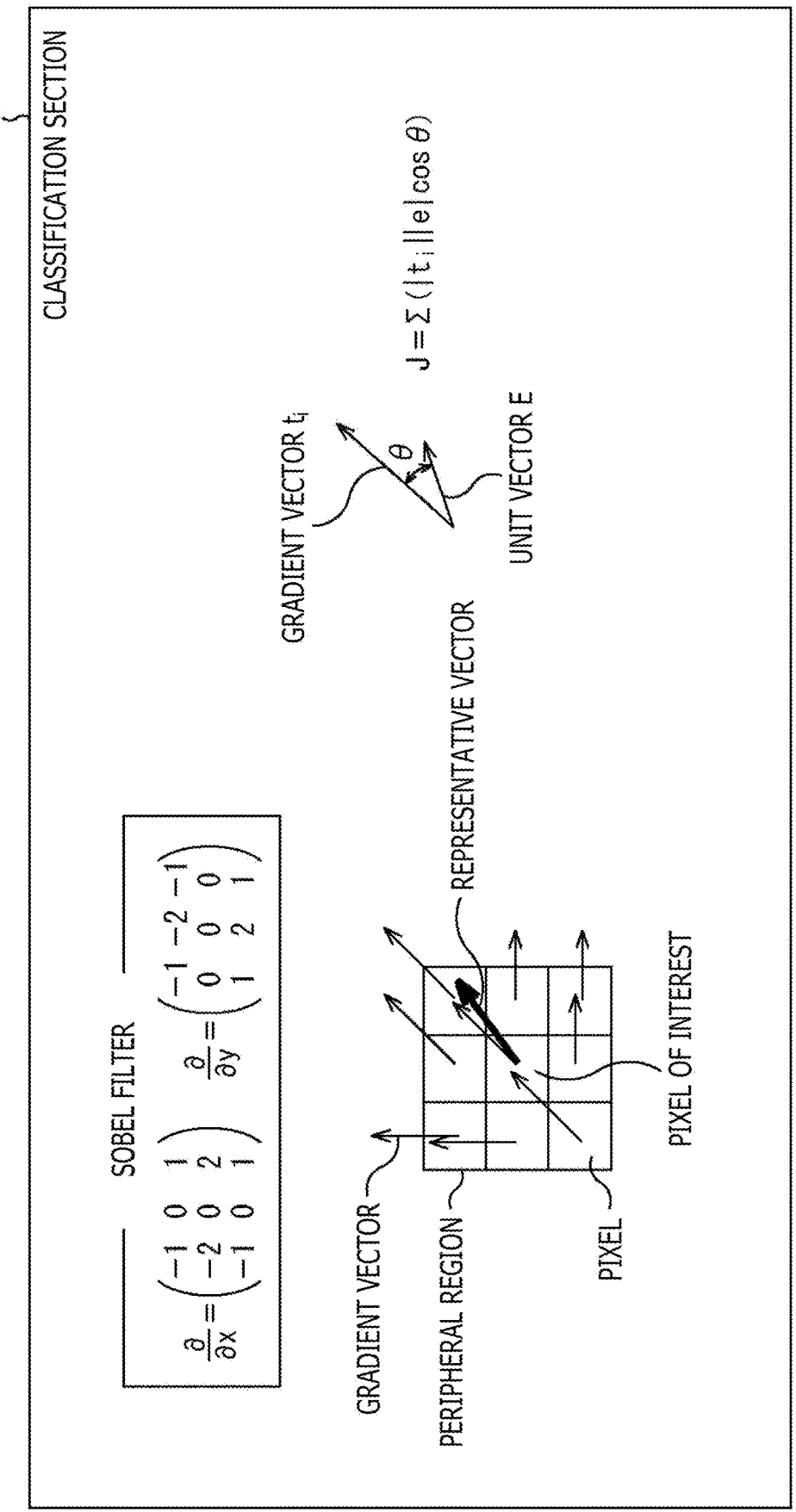
FIG. 4 is a view illustrating an overview of processing of a classification section 20 that performs classification of an inner product reliability method.

FIG. 4 is a view illustrating an overview of processing of a classification section 20 that performs classification of the inner product reliability method.

The inner product reliability method is one of reliability methods. As the reliability methods, an inner product reliability method and a frequency distribution method hereinafter described are available.

The classification section 20 that performs classification of the inner product reliability method successively selects pixels that become a target of classification in a decoded image as a pixel of interest similarly as in the classification of GALF. Then, the classification section 20 applies, regarding the pixel of interest, a Sobel filter to the decoded image to obtain a gradient vector indicating an inclination direction of the pixel of interest as a gradient feature amount of the pixel of interest.

In particular, if the pixel value of a pixel at a position i is represented by R(i) and the gradient vector is represented by $t_i=(\text{grad}X(i), \text{grad}Y(i))$, then the classification section 20 calculates the gradient vector $t_i=(\text{grad}X(i), \text{grad}Y(i))$ of the pixel of interest at the position i in accordance with an expression (4).

$$t_i=(\text{grad}X(i),\text{grad}Y(i))=(\partial R(i)/\partial x, \partial R(i)/\partial y) \quad (4)$$

$\partial/\partial x$ and $\partial/\partial y$ represent a Sobel filter.

Here, a vector obtained by rotating the gradient vector $t_i$ by 90 degrees represents a tangential direction to a contour line of pixel values.

The classification section 20 similarly calculates each of gradient vectors $t_i$ of 3×3 pixels centering on the pixel of interest as a plurality of pixels in a peripheral region that is made a target in which gradient feature amounts are used comprehensively.

Then, the classification section 20 obtains (sets) a unit vector e, which maximizes the sum total $J=\Sigma(|t_i||e|\cos\theta)$ of the inner products with the gradient vectors $t_i$ of the 3×3 pixels in the peripheral region to be made a target in which the gradient feature amounts are used comprehensively as a representative vector that represents the gradient vectors $t_i$ of the 3×3 pixels in the peripheral region. Here, in the expression $J=\Sigma(|t_i||e|\cos\theta)$, J represents the sum total of inner products of the individual gradient vectors $t_i$ of the 3×3 pixels and the unit vector e, and $\Sigma$ represents summation of the 3×3 pixels in the peripheral region. $|t_i|$ and $|e|$ represent norms of the gradient vector $t_i$ and the unit vector e, respectively, and $\theta$ represents an angle defined by the gradient vector $t_i$ and the unit vector e.

Here, in the inner product reliability method, the gradient vectors $t_i$ of the 3×3 pixels in the peripheral region of the pixel of interest can be regarded as local gradient feature amounts, and a representative pixel of the peripheral region obtained in regard to the pixel of interest (representative vector of the pixel of interest) can be regarded as a macro gradient feature amount obtained by comprehensively using the gradient vectors $t_i$ of the 3×3 pixels as the local gradient feature amounts.

The classification section 20 uses the representative vector regarding the pixel of interest, for example, to obtain (set) the direction of GALF as a specified direction indicating an inclination direction of the pixel of interest. In particular, the classification section 20 obtains the GALF direction to which (the direction of) the representative vector regarding the pixel of interest in the GALF directions of the eight directions described hereinabove with reference to FIG. 1 as a specified direction indicating the inclination direction of the pixel of interest.

Further, the classification section 20 obtains (sets) a value corresponding to the sum total of the inner products of the representative vector and the gradient vectors $t_i$ of the 3×3 pixels in the peripheral region of the pixel of interest as a reliability degree of the specified direction indicating the inclination direction of the pixel of interest.

In this case, it can be considered that the reliability degree of a specified direction of a pixel of interest is obtained (set) using a degree by which the gradient vectors $t_i$ of the 3×3 pixels in the peripheral region of the pixel of interest contribute to the representative vector.

The reliability degree of the specified direction of the pixel of interest obtained in such a manner as described above represents a degree by which a gradient vector $t_i$ in a direction different from the specified direction (inclination direction) of the pixel of interest does not exist in the gradient vectors $t_i$ of the 3×3 pixels in the peripheral region (degree by which a gradient vector $t_i$ in a direction similar to the specified direction of the pixel of interest exists in the gradient vectors $t_i$ of the 3×3 pixels.)

Accordingly, that the reliability degree is high represents that many gradient vectors $t_i$ of a direction similar to the specified direction of the pixel of interest exist in the gradient vectors $t_i$ of the 3×3 pixels in the peripheral region.

The classification section 20 performs classification according to the specified direction of the pixel of interest and the reliability degree to obtain a class (final class) of the pixel of interest.

Figure 5:
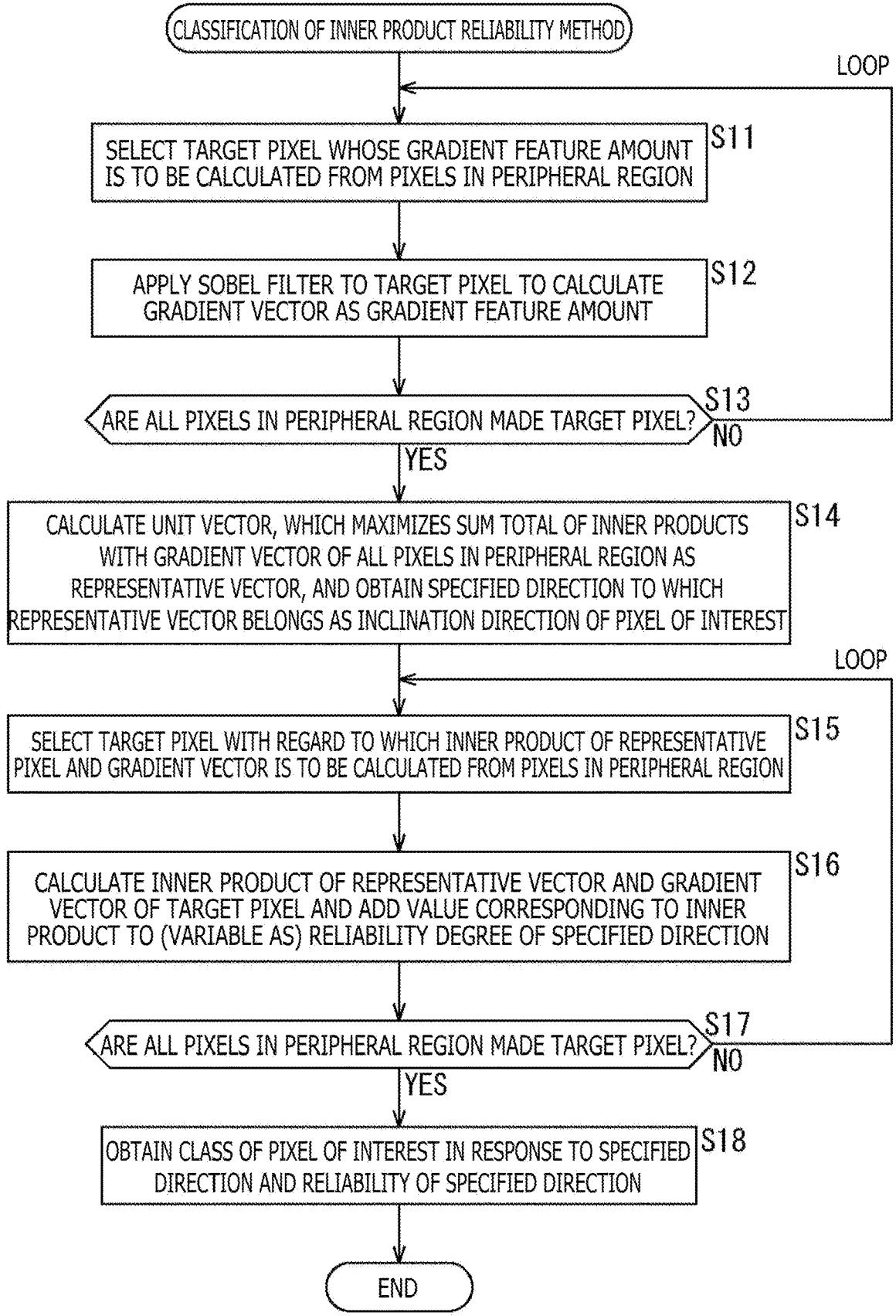
FIG. 5 is a flow chart illustrating an example of processing of classification of the inner product reliability method performed for a pixel of interest by the classification section 20.

FIG. 5 is a flow chart illustrating an example of processing of the inner product reliability method performed for a pixel of interest by the classification section 20 of FIG. 4.

In step S11, the classification section 20 selects one of pixels that have not been selected as a target pixel of a target for which a gradient vector is to be obtained as a gradient feature amount as a target pixel from among 3×3 pixels in a peripheral region of the pixel of interest, and the processing advances to step S12.

In step S12, the classification section 20 applies a Sobel filter to the decoded image to obtain a gradient vector as a gradient feature amount of the target pixel, and the processing advances to step S13.

In step S13, the classification section 20 decides whether or not all of the 3×3 pixels in the peripheral region have been selected as a target pixel.

In the case where it is decided in step S13 that all of the 3×3 pixels in the peripheral region have not been selected as a target pixel as yet, then the processing returns to step S11. In step S11, the classification section 20 selects a new target pixel from among the 3×3 pixels in the peripheral region and thereafter repeats similar processes.

On the other hand, in the case where it is decided in step S13 that all of the 3×3 pixels in the peripheral region have been selected as a target pixel, the processing advances to step S14.

In step S14, the classification section 20 calculates (sets), regarding the pixel of interest, a unit vector e that maximizes the sum total $J=\Sigma(|t_i||e|\cos\theta)$ of the inner products individually with the gradient vectors $t_i$ of the 3×3 pixels in the peripheral region as a representative vector. Further, the classification section 20 obtains (sets) the GALF direction to which (the direction of) the representative vector of the pixel of interest among the GALF directions of the eight directions belongs as a specified direction indicating an inclination direction of the pixel of interest, and the processing advances from step S14 to step S15.

In step S15, the classification section 20 selects one of pixels that have not been selected as a target pixel of a target, in which the inner product of the representative vector regarding the pixel of interest and the gradient vector $t_i$ is to be obtained, as a target pixel from among the 3×3 pixels in the peripheral region of the pixel of interest, and the processing advances to step S16.

In step S16, the classification section 20 calculates an inner product of the representative vector regarding the pixel of interest and the gradient vector $t_i$ of the target pixel, and adds a value corresponding to the inner product to (a variable as) the reliability degree of the specified direction of the pixel of interest. Thereafter, the processing advances to step S17.

Here, (the variable as) the reliability degree of the specified direction of the pixel of interest is reset to 0 before the process in step S15 is performed first for the pixel of interest.

In step S17, the classification section 20 decides whether or not all of the 3×3 pixels in the peripheral region have been selected as a target pixel.

In the case where it is decided in step S17 that all of the 3×3 pixels in the peripheral region have not been selected as a target pixel as yet, then the processing returns to step S15. In step S15, the classification section 20 newly selects a target pixel from among the 3×3 pixels in the peripheral region and thereafter repeats similar processes.

On the other hand, in the case where it is decided in step S17 that all of the 3×3 pixels in the peripheral region have been selected as a target pixel, the processing advances to step S18.

In step S18, the classification section 20 performs classification according to the specified direction of the pixel of interest and the reliability degree (of the specified direction) to obtain a class (final class) of the pixel of interest, and then ends the processing of the classification regarding a pixel of interest.

In step S18, for example, the classification section 20 obtains (sets) a reliability degree class indicating a reliability degree of the specified direction according to the reliability degree of the specified direction of the pixel of interest. In particular, for example, in the case where the reliability degree of the specified direction of the pixel of interest is equal to or higher than a predetermined threshold value, the classification section 20 classifies the pixel of interest into a class having some reliability degree, but in the case where the reliability degree is not equal to or higher than the predetermined threshold value, the classification section 20 classifies the pixel of interest into a no-reliability class representing that the pixel of interest has no reliability.

Here, since to obtain a reliability degree class configures part of the classification of the inner product reliability method performed by the classification section 20, it can be regarded as subclass classification. The subclass classification of obtaining a reliability degree class is hereinafter referred to also as reliability subclass classification.

The classification section 20 classifies the pixel of interest according to the reliability degree class of the pixel of interest (here, the class with reliability or the class without reliability) and the specified direction of the pixel of interest.

In particular, for example, in the case where, in the reliability subclass class, the pixel of interest is classified into the class without reliability, the classification section 20 classifies the pixel of interest into a final class allocated in advance to the class without reliability.

On the other hand, for example, in the case where, in the reliability subclass class, the pixel of interest is classified into the class with reliability, the classification section 20 classifies the pixel of interest into a final class allocated in advance to a direction coincident with the specified direction of the pixel of interest among the final classes allocated in advances to the eight directions represented by the directions of GALF.

In such classification of the inner product reliability method as described above, a pixel of interest is classified into any of nine final classes in total including one final class allocated in advance to the class without reliability and the eight final classes allocated in advance individually to the eight directions represented by the directions of GALF.

According to the classification of the inner product reliability method, since classification is performed according to a reliability degree of a specified direction of a pixel of interest, the performance of a filter process as a classification prediction process can be improved.

However, in the classification of the inner product reliability method, totaling two loop processes including a loop process in steps S11 to S13 and another loop process of steps S15 to S17 exist as a loop process that is performed using a plurality of pixels in a peripheral region as a target pixel as depicted in the flow chart of FIG. 5.

As described above, the classification of the inner product reliability method that is one of the reliability methods includes two loop processes. Further, in the classification of the inner product reliability method, when to obtain (set) a reliability degree of a specified direction (inclination), it is necessary to obtain the inner product. Therefore, in the case where a classification prediction process for performing classification of the inner product reliability method is incorporated into an encoding apparatus and a decoding apparatus, the throughput necessary for the encoding apparatus and the decoding apparatus is deteriorated, and the impact on hardware required for the encoding apparatus and the decoding apparatus increases.

Therefore, in the following, classification of the frequency distribution method that is a reliability method that achieves reduction of the throughput necessary for an encoding apparatus and a decoding apparatus is described.

Classification of the frequency distribution method uses a predetermined region including a pixel of interest as a frequency distribution generation region that is a region of pixels to be used for generation of a frequency distribution of a specified direction and generates, using local gradient feature amounts themselves individually of a plurality of pixels in the frequency distribution generation region, a frequency distribution of specified directions represented by gradient feature amounts and uses a value corresponding to a frequency of the frequency distribution as a reliability degree of a specified direction.

Consequently, in classification of the frequency distribution method, a reliability degree of an inclination direction can be obtained by addition of frequencies upon generation of a frequency distribution without obtaining a reliability degree of an inclination direction. Further, in classification of the frequency distribution method, the loop process to be performed for target pixels that are a plurality of pixels can be reduced to only one loop process.

Accordingly, in the case where classification of the frequency distribution method is performed, the throughput necessary for an encoding apparatus and a decoding apparatus can be improved and the performance of a filter process as a classification prediction process can be improved in comparison with those in an alternative case in which classification of the inner product reliability method is performed.

<Classification of First Frequency Distribution Method>

Figure 6:
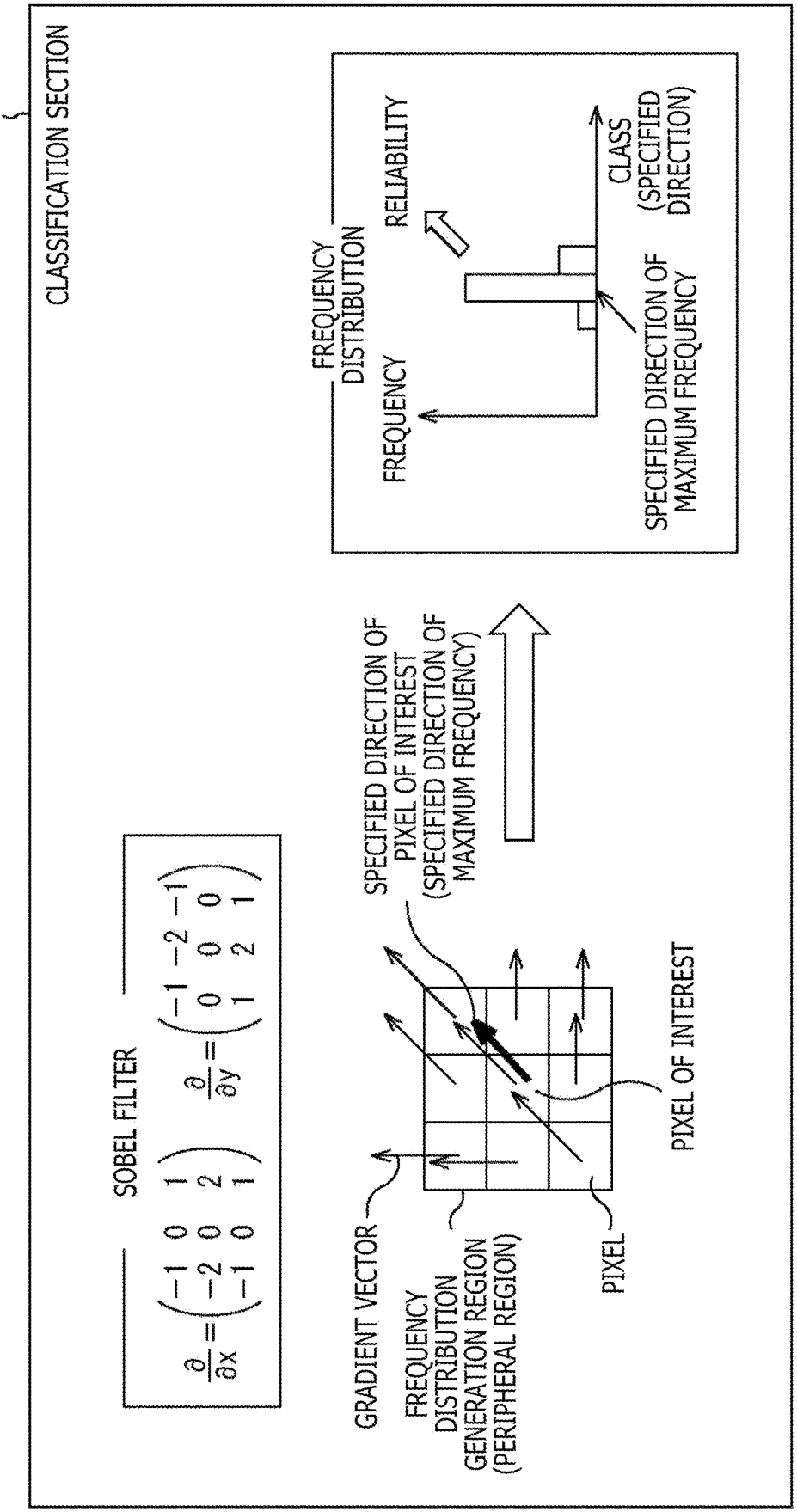
FIG. 6 is a view illustrating an overview of processing of a classification section 30 that performs classification of a first frequency distribution method.

FIG. 6 is a view illustrating an overview of processing of the classification section 30 that performs classification of a first frequency distribution method.

The first frequency distribution method is one of reliability methods.

The classification section 30 that performs classification of the first frequency distribution method successively selects pixels to be made a target of classification in a decoded image as a pixel of interest. Then, the classification section 30 applies, regarding the pixel of interest, a Sobel filter to the decoded image to obtain a gradient vector as a local gradient feature amount of the pixel of interest similarly, for example, to the classification section 20 (FIG. 4) that performs classification of the inner product reliability method.

The classification section 30 determines a predetermined region including the pixel of interest as a frequency distribution generation region and similarly calculates a gradient vector as a local gradient feature amount of the eight pixels other than the pixel of interest from among the 3×3 pixels centering on the pixel of interest as a plurality of pixels in the frequency distribution generation region.

Then, the classification section 30 generates a frequency distribution of the inclination directions using the gradient vectors themselves as the local gradient feature amounts of the 3×3 pixels in the frequency distribution generation region of the pixel of interest.

In particular, the classification section 30 determines, for example, specified directions as the directions of eight directions of GALF described hereinabove with reference to FIG. 1 as classes of the frequency distribution and counts, regarding the pixel of interest, targeting the gradient vectors of the 3×3 pixels in the frequency distribution generation region, the frequency of the specified directions as the classes to which the gradient vectors belong to generate a frequency distribution of (the inclination directions represented by) the specified directions.

Thereafter, the classification section 30 obtains (sets) a specified direction of a maximum frequency in the frequency distribution of the specified directions regarding the pixel of interest as a specified direction of the pixel of interest and obtains (sets) a value corresponding to the maximum frequency as a reliability degree of the specified direction of the pixel of interest.

Then, the classification section 30 performs classification according to the specified direction, reliability degree, and so forth of the pixel of interest to obtain a class (final class) of the pixel of interest.

It is to be noted that, although, in the present embodiment, the frequency distribution generation region is a region of 3×3 pixels that coincides with a peripheral region that is made a target in which activities or gradient vectors as local gradient feature amounts are used comprehensively when to obtain an activity sum or a representative vector as a macro gradient feature amount, the frequency distribution generation region is not limited to a region of 3×3 pixels including a pixel of interest. Further, as the frequency distribution generation region, a region that does not coincide with a peripheral region can be adopted.

FIG. 7 is a view illustrating classes that are obtained by classification of the first frequency distribution method.

In classification of the first frequency distribution method performed by the classification section 30, a pixel of interest can be classified into any of 25 classes of the final classes 0 to 24 similarly, for example, as in the classification of GALF described hereinabove with reference to FIG. 3.

The classification section 30 classifies the pixel of interest, for example, according to the specified direction and the reliability degree as well as the activity sums sumA(V), sumA(H), sumA(D0), and sumA(D1) in the V direction, H direction, D0 direction, and D1 direction of the pixel of interest.

In particular, the classification section 30 obtains a gradient vector of 3×3 pixels in a frequency distribution generation region coincident with a peripheral region of the pixel of interest. Further, the classification section 30 obtains activities A(V), A(H), A(D0), and A(D1) in the four directions of the V direction, H direction, D0 direction, and D1 direction similarly to the classification section 10.

Further, the classification section 30 uses the gradient vectors of the 3×3 pixels in the frequency distribution generation region to obtain (generate) a frequency distribution of the specified directions to which the gradient vectors belong. Furthermore, the classification section 30 calculates activity sums sumA(V), sumA(H), sumA(D0), and sumA(D1) using the activities A(V), A(H), A(D0), and A(D1) in the V direction, H direction, D0 direction, and D1 direction of the 3×3 pixels in the peripheral region similarly to the classification section 10.

Thereafter, the classification section 30 obtains (sets) a specified direction of a maximum frequency in the frequency distribution of the specified directions regarding the pixel of interest as a specified direction of the pixel of interest and obtains (sets) a value corresponding to the maximum frequency as a reliability degree of the specified direction of the pixel of interest.

Then, the classification section 30 performs direction subclass classification according to the GALF direction as the specified direction of the pixel of interest to obtain (sets) a direction class similar to that in GALF regarding the pixel of interest, for example, similarly to the classification section 10. As described hereinabove with reference to FIG. 3, the direction class of GALF indicates two types of direction including the V direction or the H direction and the D0 direction or the D1 direction.

Further, the classification section 30 performs reliability subclass classification according to the reliability degree of the specified direction of the pixel of interest to classify, for example, the pixel of interest into any of the low (Low) class in which the reliability degree is low, a weak (Weak) class in which the reliability degree is moderate and a strong (Strong) class in which the reliability degree is high.

In the case where the reliability degree of the specified direction is lower than a first threshold value p1, the pixel of interest is classified into the low class as a reliability degree subclass classified. On the other hand, in the case where the reliability degree of the specified direction is equal to or higher than the first threshold value p1 but lower than a second threshold value p2, the pixel of interest is classified into the weak class as a reliability degree subclass, and in the case where the reliability degree of the specified direction is equal to or higher than the second threshold value p2, the pixel of interest is classified into the strong class as a reliability degree subclass.

In the case where the inclination directions of the 3×3 pixels in the frequency distribution generation region do not almost coincide with each other, the pixel of interest is classified into the low class. In the case where the inclination directions of the 3×3 pixels in the frequency distribution generation region coincide with each other to some degree, the pixel of interest is classified into the weak class. The inclination directions of the 3×3 pixels in the frequency distribution generation region almost coincide each other, the pixel of interest is classified into the strong class.

In the case where a pixel of interest is classified into the low class in the reliability subclass classification, the classification section 30 classifies the pixel of interest into a final class according to the activity sums sumA(V), sub(H), sumA(D0), and sumA(D1) in the V direction, H direction, D0 direction, and D1 direction irrespective of the direction class.

In particular, a pixel of interest having been classified into the low class in the reliability subclass classification is classified into any of the final classes 0 to 4 according to the activity sums sumA(V), sub(H), sumA(D0), and sumA(D1) in the V direction, H direction, D0 direction, and D1 direction similarly as in the classification of GALF.

In the case where a pixel of interest has been classified into the weak class in the reliability subclass classification, the classification section 30 classifies the pixel of interest into a final class according to the direction class and the activity sums sumA(V), sub(H), sumA(D0), and sumA(D1) in the V direction, H direction, D0 direction, and D1 direction.

In particular, a pixel of interest having been classified into the weak class in the reliability subclass classification and classified into the direction class 0 corresponding to the D0 direction or the D1 direction in the direction classification is classified into any of the final classes 5 to 9 according to the activity sums sumA(V), sub(H), sumA(D0), and sumA(D1) in the V direction, H direction, D0 direction, and D1 direction similarly as in the classification of GALF.

A pixel of interest having been classified into the strong class in the reliability subclass classification and classified into the direction class 0 corresponding to the D0 direction or the D1 direction in the direction classification is classified into any of the final classes 10 to 14 according to the activity sums sumA(V), sub(H), sumA(D0), and sumA(D1) in the V direction, H direction, D0 direction, and D1 direction similarly as in the classification of GALF.

A pixel of interest having been classified into the weak class in the reliability subclass classification and classified into the direction class 2 corresponding to the V direction or the H direction in the direction classification is classified into any of the final classes 15 to 19 according to the activity sums sumA(V), sub(H), sumA(D0), and sumA(D1) in the V direction, H direction, D0 direction, and D1 direction similarly as in the classification of GALF.

A pixel of interest having been classified into the strong class in the reliability subclass classification and classified into the direction class 2 corresponding to the V direction or the H direction in the direction classification is classified into any of the final classes 20 to 24 according to the activity sums sumA(V), sub(H), sumA(D0), and sumA(D1) in the V direction, H direction, D0 direction, and D1 direction similarly as in the classification of GALF.

In the first frequency distribution method, the first threshold value p1 and the second threshold value p2 can be set according to the pixel number in the frequency distribution generation region. For example, in the case where the frequency (here, the maximum frequency) itself of the frequency distribution of the specified direction is adopted as the reliability degree of the specified direction, when the frequency distribution generation region is a region of 6×6 pixels, the first threshold value p1 can be set, for example, to ¼ the pixel number (for example, 36 pixels) of the frequency distribution region, and the second threshold value p2 can be set, for example, to ½ the pixel number of the frequency distribution generation region.

It is to be noted that, although, in the case described above, in the case where the reliability degree of the specified direction of the pixel of interest is lower than the first threshold value p1 in the reliability degree subclass classification, a pixel of interest is classified into the low class, in which the reliability degree is low, as a reliability subclass, in the case where the reliability degree of the specified direction of the pixel of interest is lower than the first threshold value p1, it is possible to pass the filter process as a prediction process without performing classification for obtaining a final class or to classify the pixel of interest into a final class passing a filter process. This similarly applies also to classification of the frequency distribution method hereinafter described.

Figure 8:
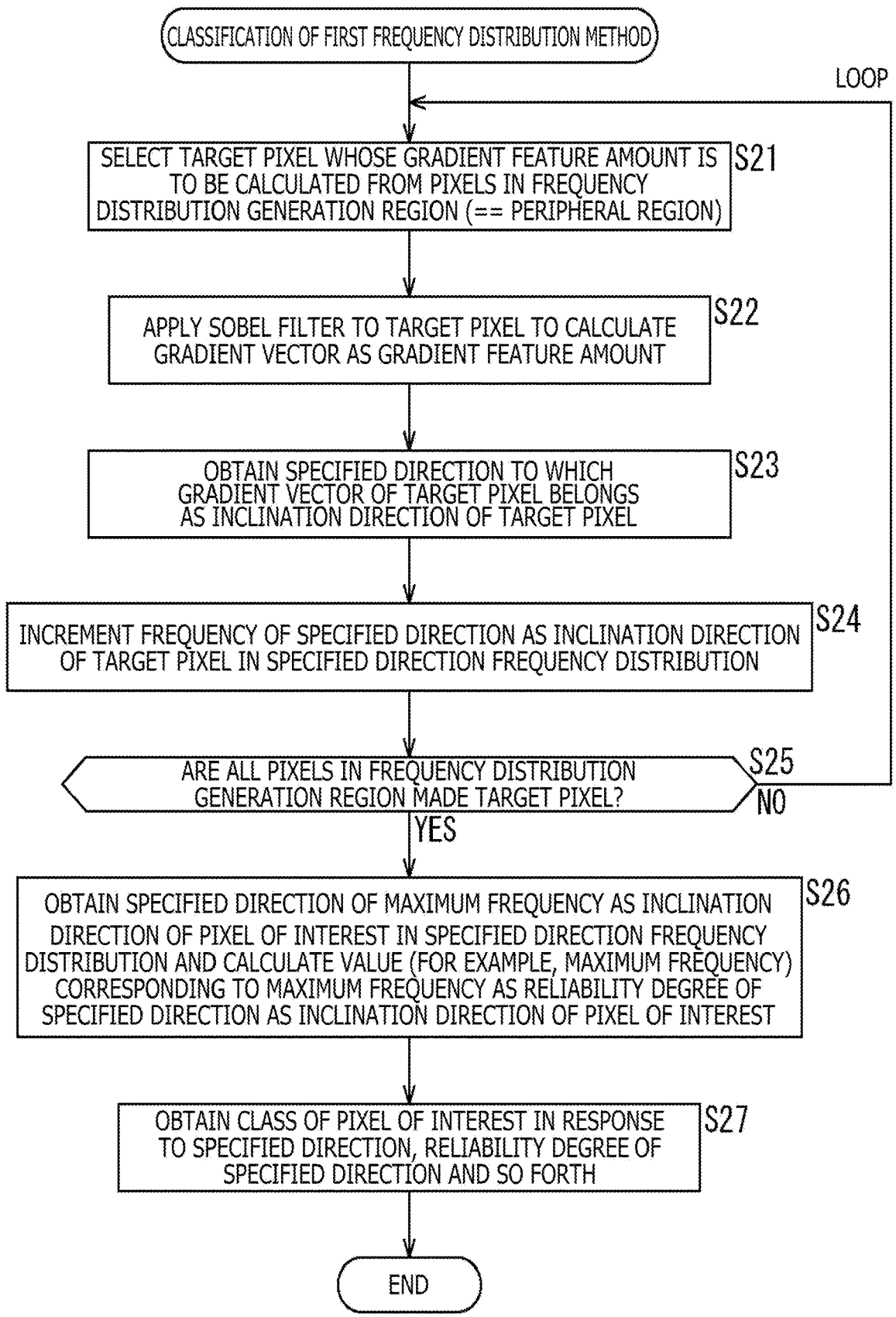
FIG. 8 is a flow chart illustrating an example of processing of classification of the first frequency distribution method performed for a pixel of interest by the classification section 30.

FIG. 8 is a flow chart illustrating an example of processing of classification of the first frequency distribution method performed for a pixel of interest by the classification section 30.

In step S21, the classification section 30 selects one of pixels that have not been selected as a target pixel of a target for which a gradient vector as a gradient feature amount is to be obtained from among 3×3 pixels in the frequency distribution generation region coincident with the peripheral region of the pixel of interest as a target pixel, and the processing advances to step S22.

In step S22, the classification section 30 applies a Sobel filter and a Laplacian filter to the decoded image to obtain a gradient vector as a gradient feature amount of the pixel of interest and activities in the four directions (V direction, H direction, D0 direction, and D1 direction), and the processing advances to step S23.

In step S23, the classification section 30 obtains (sets) the direction of GALF to which the gradient vector of the target pixel belongs as an inclination direction of the target pixel, and the processing advances to step S24.

In step S24, the classification section 30 increments the frequency in the specified direction as the inclination direction of the target pixel in (variables that hold the frequencies of the classes of) the frequency distribution regarding the specified direction of the pixel of interest. Further, in step S24, the classification section 30 adds the activities in the four directions of the pixel of interest to (the variables as) the activity sums individually in the four directions of the pixel of interest, and the processing advances to step S25.

Here, (the variables that hold the frequencies of the classes of) the frequency distribution regarding the specified direction regarding the pixel of interest and (the variables as) the activity sums individually in the four directions of the pixel of interest are reset to 0 before the process in step S21 for the pixel of interest is performed for the first time.

In step S25, the classification section 30 decides whether or not all of the 3×3 pixels in the frequency distribution generation region have been selected as a target pixel.

In the case where it is decided in step S25 that all of the 3×3 pixels in the frequency distribution generation region have not been selected as a target pixel as yet, the processing returns to step S21. In step S21, the classification section 30 newly selects a target pixel from among the 3×3 pixels in the frequency distribution generation region and thereafter repeats similar processes.

On the other hand, in the case where it is decided in step S25 that all of the 3×3 pixels in the frequency distribution generation region have been selected as a target pixel, the processing advances to step S26.

In step S26, the classification section 30 obtains (sets) a specified direction of a maximum frequency in the frequency distribution of the specified directions regarding the pixel of interest as a specified direction of the pixel of interest and obtains a value corresponding to the maximum frequency (for example, the maximum frequency itself) as a reliability degree of the specified direction of the pixel of interest, and the processing advances to step S27.

In step S27, the classification section 30 performs classification described hereinabove with reference to FIG. 7 according to the specified direction, reliability degree, and activity sums individually in the four directions of the pixel of interest to obtain a final class of the pixel of interest, and ends the processing of the classification of the pixel of interest.

According to the classification of the first frequency distribution method, since classification is performed according to the reliability degree of the specified direction of the pixel of interest, the performance of the filter process as a classification prediction process can be improved.

Further, in the classification of the first frequency distribution method, since only one loop process in steps S21 to S25 exists as a loop process that is performed using a plurality of pixels in a frequency distribution generation region as a target pixel as indicated by the flow chart of FIG. 8.

Accordingly, in comparison with the classification of the inner production reliability method in which two loop processes exist (FIG. 5), the throughput can be improved.

Further, in the classification of the first frequency distribution method, gradient vectors themselves as local gradient feature amounts of a plurality of pixels in a frequency distribution generation region are used to generate a frequency distribution of specified directions to which gradient vectors belong, and the frequency distribution is used to obtain (set) a specified direction as an inclination direction of the pixel of interest and a reliability degree of the specified direction. Accordingly, according to the first frequency distribution method, a reliability degree can be obtained (set) without performing complicated calculation for obtaining an inner product as in the inner product reliability method.

<Classification of Second Frequency Distribution Method>

Figure 9:
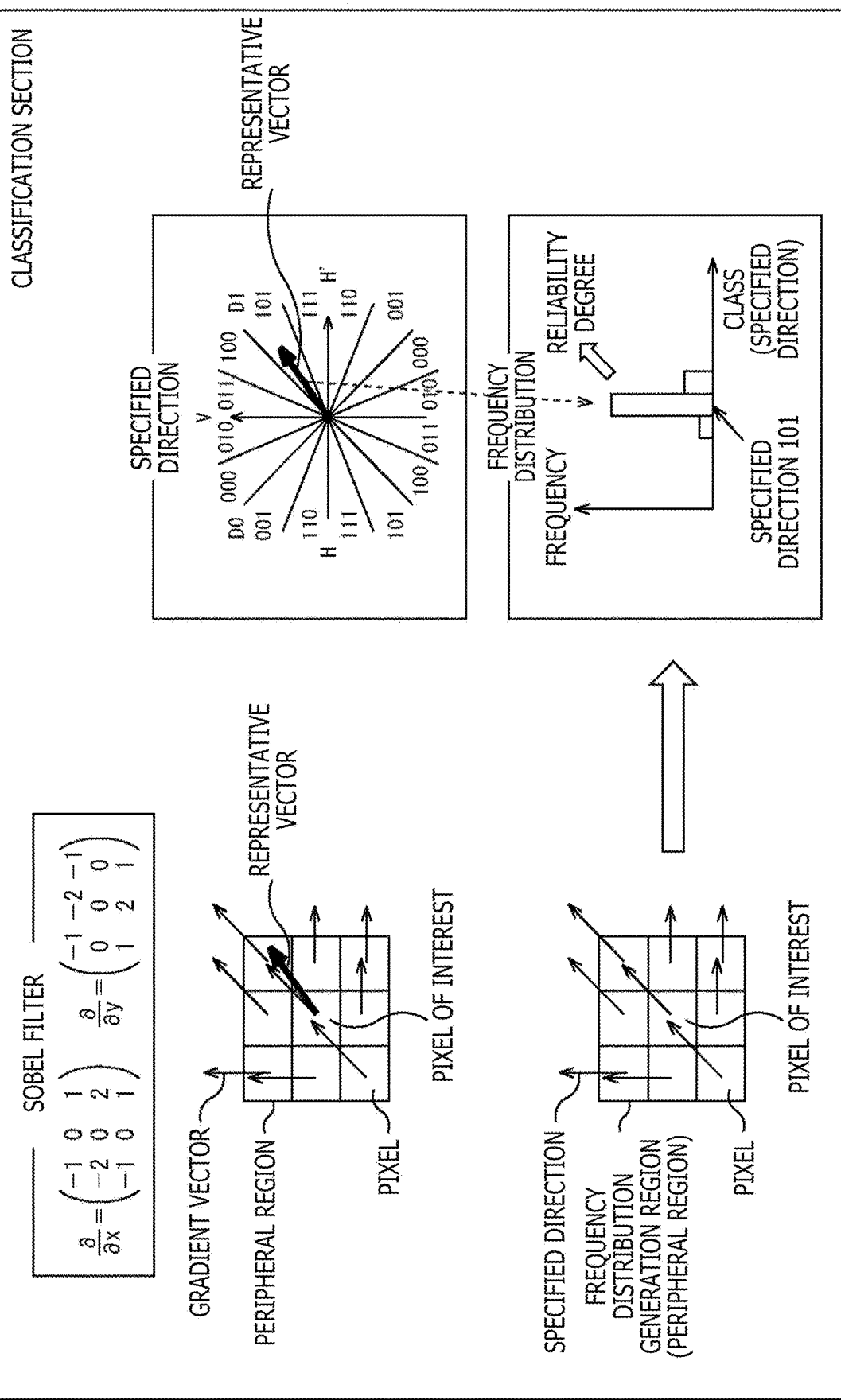
FIG. 9 is a view illustrating an overview of processing of a classification section 40 that performs classification of a second frequency distribution method.

FIG. 9 is a view illustrating an outline of processing of a classification section 40 that performs classification of a second frequency distribution method.

The second frequency distribution method is one of reliability methods similarly to the first frequency distribution method.

The classification section 40 that preforms classification of the second frequency distribution method successively selects pixels that become a target of classification as a pixel of interest.

Then, the classification section 40 obtains (sets) a representative vector regarding the pixel of interest similarly as in the inner product reliability method described hereinabove with reference to FIGS. 4 and 5.

In particular, the classification section 40 applies a Sobel filter to the decoded image to obtain gradient vectors as local gradient feature amounts of 3×3 pixels in the peripheral region that is also a frequency distribution generation region including the pixel of interest.

Then, the classification section 40 obtains (set) a unit vector that maximizes the sum total of inner products of the gradient vectors of the 3×3 pixels in the peripheral region as a representative vector of the pixel of interest.

Further, the classification section 40 generates a frequency distribution of inclination directions regarding the pixel of interest similarly as in the first frequency distribution method described hereinabove with reference to FIGS. 6 to 8.

In particular, the classification section 40 applies a Sobel filter to the decoded image to obtain gradient vectors as local gradient feature amounts of the 3×3 pixels in the frequency distribution generation region including the pixel of interest. It is to be noted here that, since the frequency distribution generation region coincides with the peripheral region, as the gradient vectors of the 3×3 pixels in the frequency distribution generation region, the gradient vectors of the 3×3 pixels in the peripheral region obtained when the representative vector is obtained can be used as they are.

The classification section 40 determines, for example, the directions of the eight directions of GALF as specified directions indicating classes of a frequency distribution and counts, targeting the gradient vectors of the 3×3 pixels in the frequency distribution generation region, the frequencies of the specified directions as classes to which the gradient vectors belong to generate a frequency distribution of (inclination directions represented by) the specified directions.

Thereafter, the classification section 40 obtains (sets) the GALF direction as a specified direction to which the representative vector belongs from the directions of the eight directions of GALF as a specified direction of the pixel of interest. Further, the classification section 40 obtains (sets) a value corresponding to the frequency of the specified direction of the pixel of interest in the frequency distribution of the specified directions regarding the pixel of interest as a reliability degree of the specified direction of the pixel of interest.

In FIG. 9, the specified direction of the pixel of interest is a specified direction represented by the GALF direction to which 101 in binary number is allocated from among the directions of the eight directions of GALF (hereinafter referred to as specified direction 101), and a value corresponding to the frequency of the specified direction 101 in the frequency distribution of the specified directions regarding the pixel of interest is obtained (set) as a reliability degree of the specified direction of the pixel of interest.

Then, the classification section 40 performs classification according to the specified direction, reliability degree, and so forth of the pixel of interest to obtain a class (final class) of the pixel of interest.

In particular, the classification section 40 performs classification according to the specified direction and the reliability degree of the pixel of interest and the activity sums sumA(V), sumA(H), sumA(D0), and sumA(D1) in the H direction, D0 direction, and D1 direction of the pixel of interest similarly, for example, as in the first frequency distribution method described hereinabove with reference to FIGS. 6 to 8 to classify the pixel of interest into any of the 25 classes of the final classes 0 to 24 similarly as in the classification of GALF.

Figure 10:
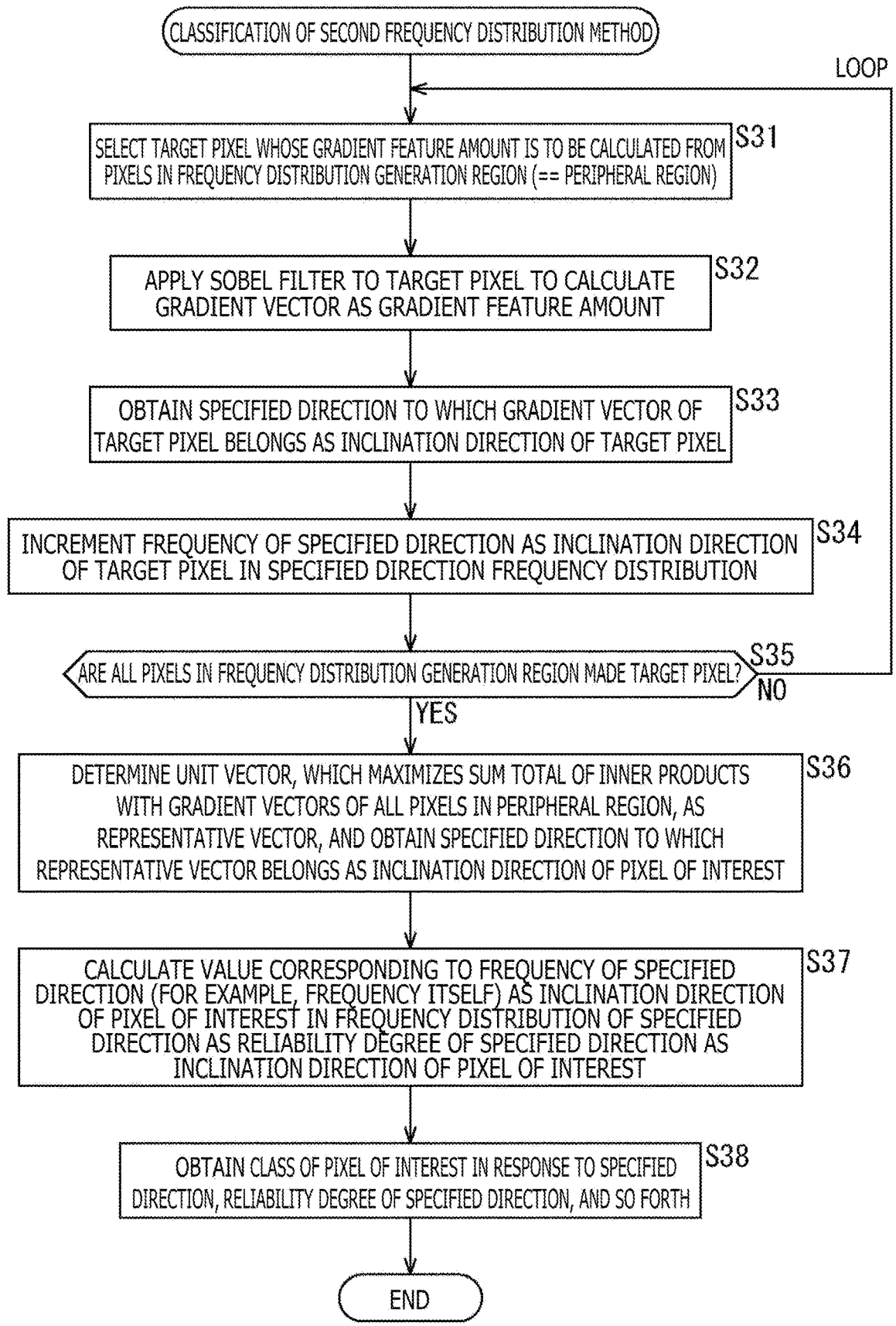
FIG. 10 is a flow chart illustrating an example of processing of classification of the second frequency distribution method performed for a pixel of interest by the classification section 40.

FIG. 10 is a flow chart illustrating an example of processing of classification of the second frequency distribution method performed for a pixel of interest by the classification section 40 of FIG. 9.

In steps S31 to S35, the classification section 40 performs a loop process similar to that of steps S21 to S25 of FIG. 8, respectively.

Then, in the case where it is decided in step S35 that all of the 3×3 pixels in the frequency distribution generation region have been selected as a target pixel, namely, in the case where the gradient vectors of all of the 3×3 pixels in the peripheral region coincident with the frequency distribution generation region are obtained and a frequency distribution of specified directions of the 3×3 pixels in the frequency distribution generation region are obtained, the processing advances to step S36.

In step S36, the classification section 40 obtains a unit vector that maximizes, regarding the pixel of interest, the sum total of the inner products of the gradient vectors of the 3×3 pixels in the peripheral region coincident with the frequency distribution generation region as a representative vector similarly as in step S14 of FIG. 5. Further, the classification section 40 obtains (sets) the GALF direction to which (the direction of) the representative vector regarding the pixel of interest from among direction of the eight directions of GALF among the directions of the eight directions of GALF as a specified direction indicating an inclination direction of the pixel of interest. Then, the processing advances from step S36 to step S37.

In step S37, the classification section 40 obtains (sets) a value corresponding to the frequency of the specified direction of the pixel of interest (for example, the frequency itself of the specified direction of the pixel of interest) in the frequency distribution of the specified directions regarding the pixel of interest as a reliability degree of the specified direction of the pixel of interest, and the processing advances to step S38.

In step S38, the classification section 40 performs classification similarly as in the case described hereinabove with reference to FIG. 7 according to the specified direction and reliability degree of the pixel of interest and the activity sums of the four directions to obtain a final class of the pixel of interest and then ends the processing of classification regarding the pixel of interest.

According to the classification of the second frequency distribution method, since classification is performed according to the reliability degree of the specified direction of the pixel of interest, the performance of the filter process as a classification prediction process can be improved.

Further, in the classification of the second frequency distribution method, only one loop process in steps S31 to S35 exists as a loop process performed in which a plurality of pixels in a frequency distribution generation region is made target pixels as described with reference to the flow chart of FIG. 10.

Accordingly, the throughput can be improved in comparison with that of classification of the inner production reliability method (FIG. 5) in which two loop processes exist.

Further, in the classification of the second frequency distribution method, the GALF direction that is obtained in a similar manner as in the inner product reliability method and to which a representative vector regarding a pixel of interest belongs is obtained as a specified direction indicating an inclination direction of the pixel of interest. Then, using gradient vectors themselves as local gradient feature amounts of a plurality of pixels in a frequency distribution generation region, the frequency distribution of the specified directions to which the gradient vectors belong is generated. Then, using the frequency distribution, the reliability degree of the specified direction as the inclination direction of the pixel of interest is obtained. Accordingly, according to the second frequency distribution method, a reliability degree can be obtained without performing complicated calculation for obtaining an inner product as in the inner product reliability method.

<Classification of Third Frequency Distribution Method>

Figure 11:
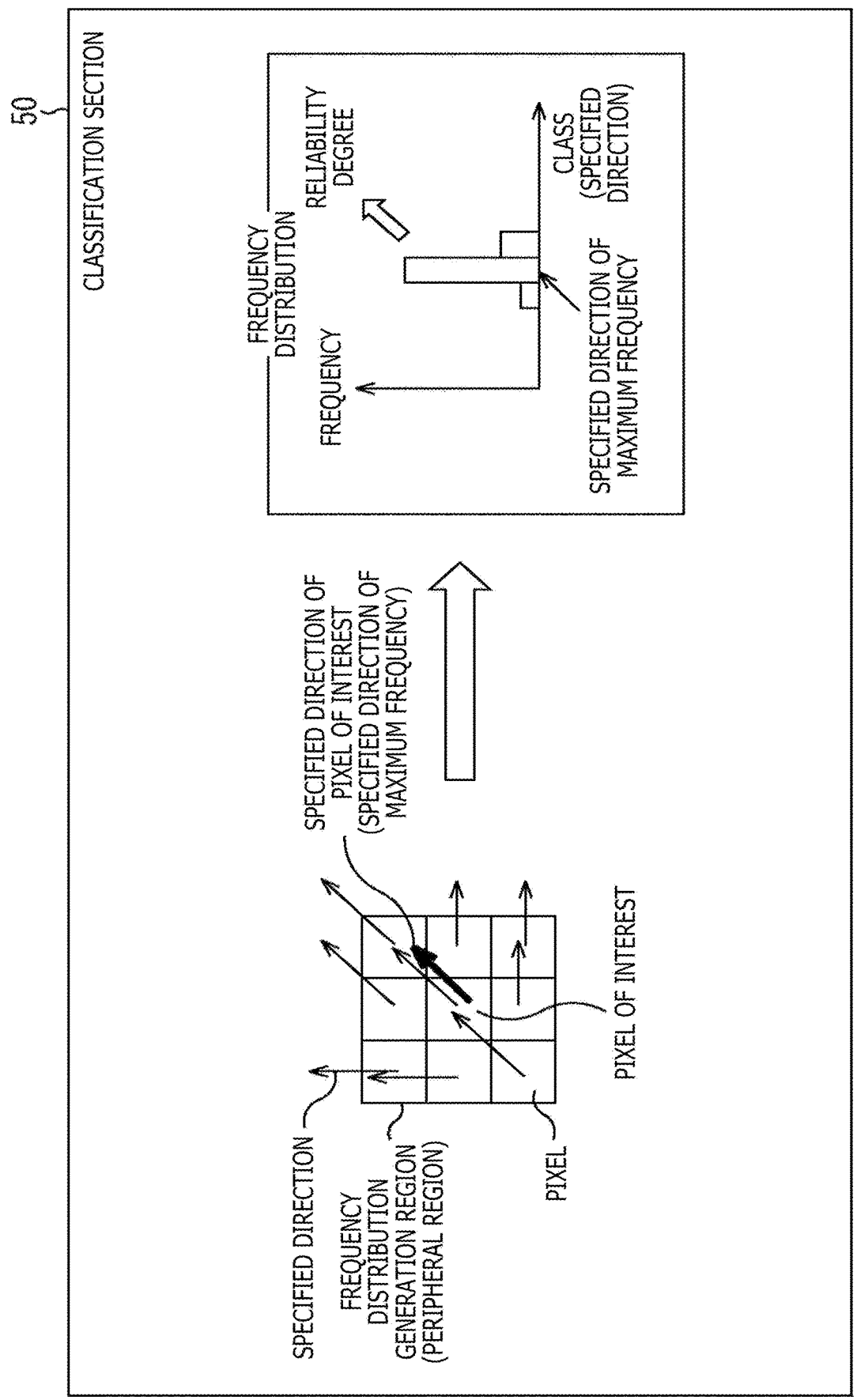
FIG. 11 is a view illustrating an overview of processing of a classification section 50 that performs classification of a third frequency distribution method.

FIG. 11 is a view illustrating an overview of processing of a classification section 50 that performs classification of a third frequency distribution method.

The third frequency distribution method is one of reliability methods similarly to the first and second frequency distribution methods.

The classification section 50 that performs classification of the third frequency distribution method successively selects pixels that become a target of classification in a decoded image as a pixel of interest. Then, the classification section 50 applies, regarding a pixel of interest, a Laplacian filter to the decoded image to obtain activity sums sumA(V), sumA(H), sumA(D0), and sumA(D1) in the four directions of the V direction, H direction, D0 direction, and D1 direction as local gradient feature amounts of the pixel of interest, for example, similarly as in GALF.

The classification section 50 obtains the activities A(V), A(H), A(D0), and A(D1) in the four directions as local gradient feature amounts also in regard to the eight pixels other than the pixel of interest from among the 3×3 pixels in the frequency distribution generation region including the pixel of interest.

Then, the classification section 50 generates a frequency distribution of inclination directions using the activities A(V), A(H), A(D0), and A(D1) in the four directions as local gradient feature amounts of the 3×3 pixels in the frequency distribution generation region of the pixel of interest.

In particular, the classification section 50 uses, for example, the directions of the eight directions of GALF described hereinabove with reference to FIG. 1 as specified directions indicating classes of the frequency distribution and counts the frequency of specified directions targeting specified directions represented by the directions of GALF obtained for the individual activities A(V), A(H), A(D0), and A(D1) in the four directions of the four directions of the 3×3 pixels in the frequency distribution generation region to generate a frequency distribution of the specified directions.

In particular, the classification section 50 calculates (sets) MainDir and SecDir as described hereinabove with reference to FIG. 2 in regard to the 3×3 pixels in the frequency distribution generation region using the activities A(V), A(H), A(D0), and A(D1) in the four directions in place of the activity sums sumA(H), sumA(D0), and sumA(D1) in the four directions. Further, the classification section 50 obtains (sets) the GALF direction allocated to the MainDir and the SecDir as a specified direction of a pixel in regard to each of the 3×3 pixels in the frequency distribution generation region as described hereinabove with reference to FIG. 2.

Then, the classification section 50 counts the frequency of specified directions obtained (set) in regard to the 3×3 pixels in the frequency distribution generation region in such a manner as described above to generate a frequency distribution of the specified directions regarding the pixel of interest.

Thereafter, the classification section 50 obtains (sets) a specified direction of a maximum frequency in the frequency distribution of the specified directions regarding the pixel of interest as a specified direction of the pixel of interest and obtains (sets) a value corresponding to the maximum frequency as a reliability degree of the specified direction of the pixel of interest.

The classification section 50 performs classification according to the specified direction, reliability degree, and so forth of the pixel of interest to obtain a class (final class) of the pixel of interest.

In particular, the classification section 50 performs classification according to the specified direction and the reliability degree of the pixel of interest and the activity sums sumA(V), sumA(H), sumA(D0), and sumA(D1) in the V direction, H direction, D0 direction, and D1 direction similarly, for example, as in the first frequency distribution method described hereinabove with reference to FIGS. 6 to 8 to classify the pixel of interest into any of the 25 classes of the final classes 0 to 24 similarly as in the classification of GALF.

Figure 12:
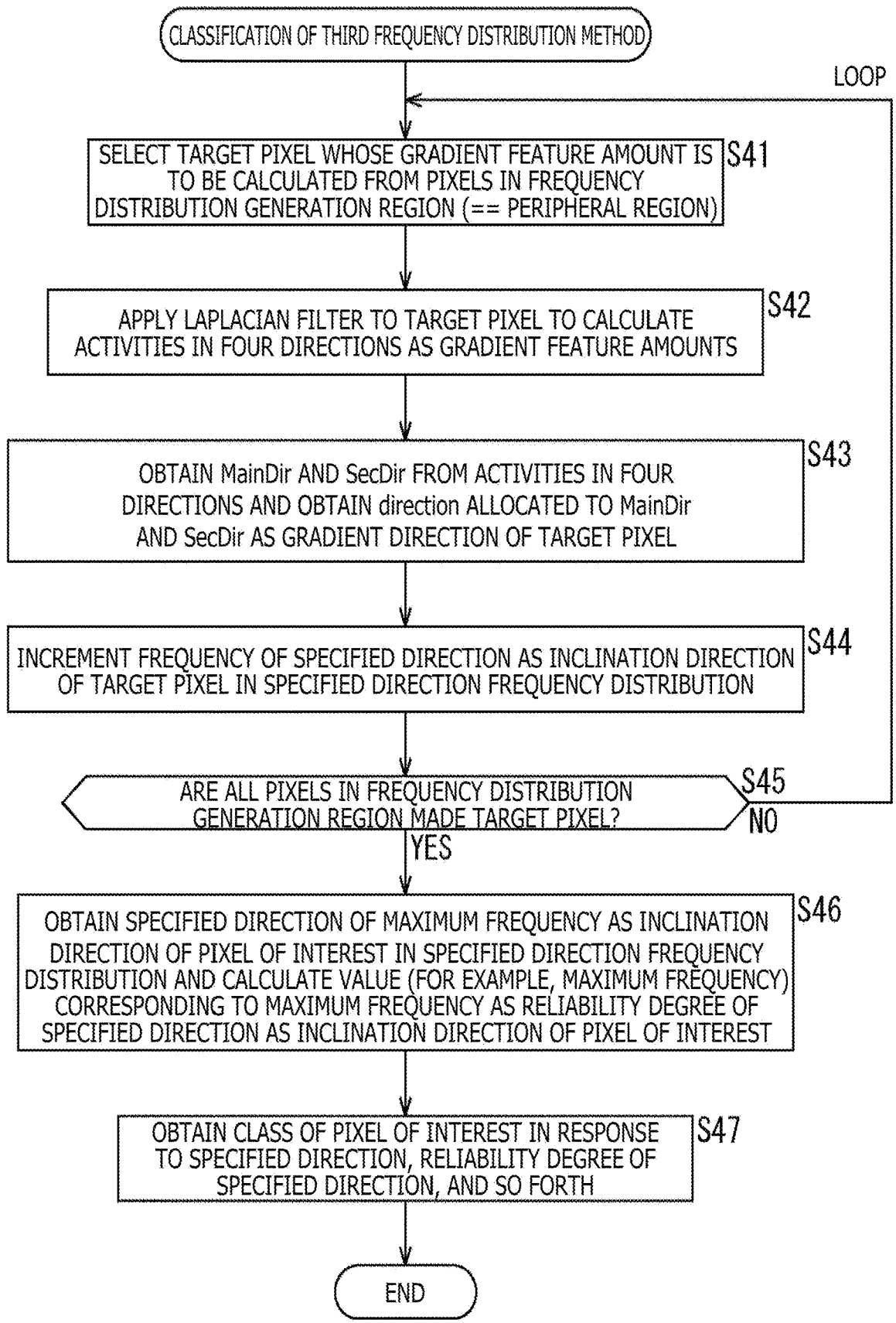
FIG. 12 is a flow chart illustrating an example of processing of classification of the third frequency distribution method performed for a pixel of interest by the classification section 50.

FIG. 12 is a flow chart illustrating an example of processing of classification of the third frequency distribution method performed for a pixel of interest by the classification section 50 of FIG. 11.

In step S41, the classification section 50 selects one of pixels that have not been selected as a target pixel that is a target whose activity as a gradient feature amount is to be obtained from among the 3×3 pixels in the frequency distribution generation region coincident with a peripheral region of the noticed image as a target pixel, and the processing advances to step S42.

In step S42, the classification section 50 applies a Laplacian filter to the decoded image to obtain activities in the four directions (V direction, H direction, D0 direction, and D1 direction) as gradient feature amounts of the target pixel, and the processing advances to step S43.

In step S43, the classification section 50 obtains (sets) MainDir and SecDir for the activities in the four directions of the target pixel and obtains the GALF direction allocated to the MainDir and the SecDir as a specified direction indicating an inclination direction of the target pixel.

In step S44, the classification section 50 increments the frequency of the specified direction of the pixel of interest in (the variables holding the frequencies of the classes of) the frequency distribution of the noticed direction regarding the pixel of interest. Further, in step S44, the classification section 50 adds the activities in the four directions of the pixel of interest to (the variables as) the activity sums in the four directions of the pixel of interest, and the processing advances to step S45.

Here, (the variables holding the frequencies of the classes of) the frequency distribution of the specified direction regarding the pixel of interest and (the variables as) the activity sums in the four directions of the pixel of interest are reset to 0 before the process in step S41 is performed for the first time regarding the pixel of interest similarly as in the case of FIG. 8.

In step S45, the classification section 50 decides whether or not all of the 3×3 pixels in the frequency distribution generation region have been selected as a pixel of interest.

In the case where it is decided in step S45 that all of the 3×3 pixels in the frequency distribution generation region have not been selected as a pixel of interest as yet, the processing returns to step S41. In step S41, the classification section 50 selects a target pixel newly from among the 3×3 pixels in the frequency distribution generation region and then repeats similar processes.

On the other hand, in the case where it is decided in step S45 that all of the 3×3 pixels in the frequency distribution generation region have been selected as a pixel of interest, the processing advances to step S46.

In step S46, the classification section 50 obtains (sets) a specified direction of a maximum frequency in the frequency distribution of the specified distributions regarding the pixel of interest as a specified direction of the pixel of interest and obtains (sets) a value corresponding to the maximum frequency (for example, the maximum frequency itself) as a reliability degree of the specified direction of the pixel of interest. Then, the processing advances to step S47.

In step S47, the classification section 50 performs the classification described hereinabove with reference to FIG. 7 according to the specified direction of the pixel of interest and the activity sums in the four directions to obtain a final class of the pixel of interest. Then, the processing of the classification regarding the pixel of interest ends.

According to the classification of the third frequency distribution method, since classification is performed according to the reliability degree of the specified direction of the pixel of interest, the performance of a filter process as a classification prediction process can be improved.

Further, in the classification of the third frequency distribution method, only one loop process in steps S41 to S45 exists as a loop process performed in which a plurality of pixels in a frequency distribution generation region is made target pixels as described with reference to the flow chart of FIG. 12.

Accordingly, the throughput can be improved in comparison with that of classification of the inner production reliability method (FIG. 5) in which two loop processes exist.

Further, in the classification of the third frequency distribution method, activities themselves in the four directions as local gradient feature amounts of a plurality of pixels in a frequency distribution generation region are used to generate a frequency distribution of specified directions represented by the directions of GALF allocated to MainDir and SecDir obtained from the activities, and the frequency distribution is used to obtain (set) a specified direction as an inclination direction of the pixel of interest and a reliability degree of the specified direction. Accordingly, according to the third frequency distribution method, the reliability degree can be obtained (set) without performing complicated calculation for obtaining an inner product as in the inner product reliability method.

It is to be noted that, since the classification of the third frequency distribution method does not require obtaining of a gradient vector as a local gradient feature amount but is sufficient if only an activity is obtained similarly as in the classification of GALF, it can be applied readily to GALF.

<Classification of Fourth Frequency Distribution Method>

Figure 13:
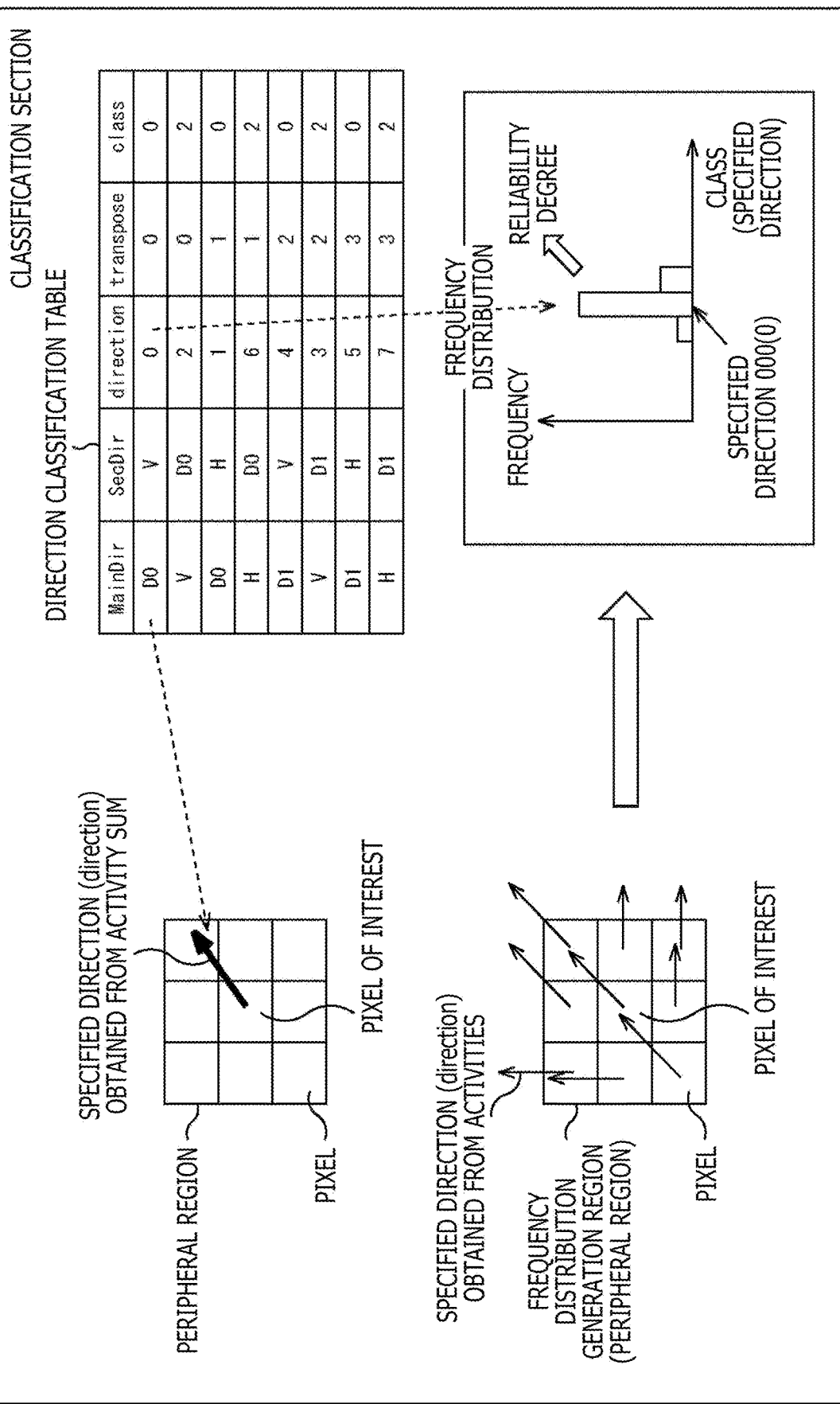
FIG. 13 is a view illustrating an overview of processing of a classification section 60 that performs classification of a fourth frequency distribution method.

FIG. 13 is a view illustrating an overview of processing of a classification section 60 that performs classification of a fourth frequency distribution method.

The fourth frequency distribution method is one of reliability methods similarly to the first to third frequency distribution methods.

The classification section 60 that performs classification of the fourth frequency distribution method successively selects pixels that become a target of classification in a decoded image as a pixel of interest.

Then, the classification section 60 obtains (sets) a GALF direction as a specified direction of the pixel of interest, for example, similarly as in GALF.

In particular, the classification section 60 obtains activities A(V), A(H), A(D0), and A(D1) in the four directions of the V direction, H direction, D0 direction, and D1 direction as local gradient feature amounts of the 3×3 pixels in the peripheral region that is also a frequency distribution generation region including the pixel of interest.

Further, the classification section 60 adds the activities A(D) of the 3×3 pixels in the peripheral region regarding the noticed image to obtain activity sums sumA(V), sumA(H), sumA(D0), and sumA(D1) in the four directions as macro gradient feature amounts.

The classification section 60 obtains (sets) MainDir and SecDir for the activity sums sumA(H), sumA(D0), and sumA(D1) in the four directions regarding the pixel of interest as described hereinabove with reference to FIG. 2 and obtains (sets) the GALF direction allocated to the MainDir and SecDir in the direction classification table (FIG. 2) as a specified direction of the pixel of interest.

Further, the classification section 60 generates a frequency distribution of inclination directions regarding the pixel of interest similarly as in the third frequency distribution method described hereinabove with reference to FIGS. 11 and 12.

In particular, the classification section 60 applies a Laplacian filter to the decoded image to obtain activities A(V), A(H), A(D0), and A(D1) in the four respective directions of the V direction, H direction, D0 direction, and D1 direction as local gradient feature mounts of the 3×3 pixels in the frequency distribution generation region including the pixel of interest. It is to be noted here that, since the frequency distribution generation region coincides with the peripheral region, as the activities A(V), A(H), A(D0) and A(D1) in the four respective directions of the 3×3 pixels in the frequency distribution generation region, the activities A(V), A(H), A(D0), and A(D1) in the four respective directions in the 3×3 pixels in the peripheral region obtained when the GALF direction as the specified direction of the pixel of interest is obtained can be used as they are.

The classification section 60 determines, for example, the directions of the eight directions of GALF as specified directions indicating classes of a frequency distribution and counts, targeting the specified directions represented by the directions of GALF obtained (set) for the activities A(V), A(H), A(D0), and A(D1) in the four respective directions of the 3×3 pixels in the frequency distribution generation region regarding the pixel of interest, the frequency of the specified directions to generate a frequency distribution of the specified directions.

In particular, the classification section 60 uses the activities A(V), A(H), A(D0), and A(D1) in the four respective directions in place of the activity sums sumA(H), sumA (D0), and sumA(D1) in the four respective directions to obtain (set) MainDir and SecDir regarding each of the 3×3 pixels in the frequency distribution generation region as described hereinabove with reference to FIG. 2. Further, the classification section 60 obtains (sets), regarding each of the 3×3 pixels in the frequency distribution generation region, the GALF direction allocated to MainDir and SecDir as a specified direction of the pixel.

Then, the classification section 60 counts the frequency of specified directions obtained (set) regarding each of the 3×3 pixels in the frequency distribution generation region in such a manner as described above to generate a frequency distribution of the specified directions regarding the pixel of interest.

Thereafter, the classification section 60 obtains (sets) a value corresponding to the frequency of (the class of) the GALF direction as the specified direction of the pixel of interest in the frequency distribution of the specified directions regarding the pixel of interest as a reliability degree of the specified direction of the pixel of interest.

In FIG. 13, the specified direction of the pixel of interest is a specified direction 000 (specified direction to which 0 in decimal number (000 in binary number) is allocated) from among the specified directions as the directions of the eight direction of GALF, and a value corresponding to the frequency of the specified direction 000 in the frequency distribution of the specified directions regarding the pixel of interest is obtained as a reliability degree of the specified direction of the pixel of interest.

The classification section 60 performs classification according to the specified direction, reliability degree, and so forth of the pixel of interest to obtain a final class of the pixel of interest.

In particular, the classification section 60 performs classification according to the specified direction and the reliability degree of the pixel of interest and the activity sums sumA(V), sumA(H), sumA(D0), and sumA(D1) in the V direction, H direction, D0 direction, and D1 direction similarly, for example, as in the first frequency distribution method described hereinabove with reference to FIGS. 6 to 8 to classify the pixel of interest into any of the 25 classes of the final classes 0 to 24 similarly as in the classification of GALF.

Figure 14:
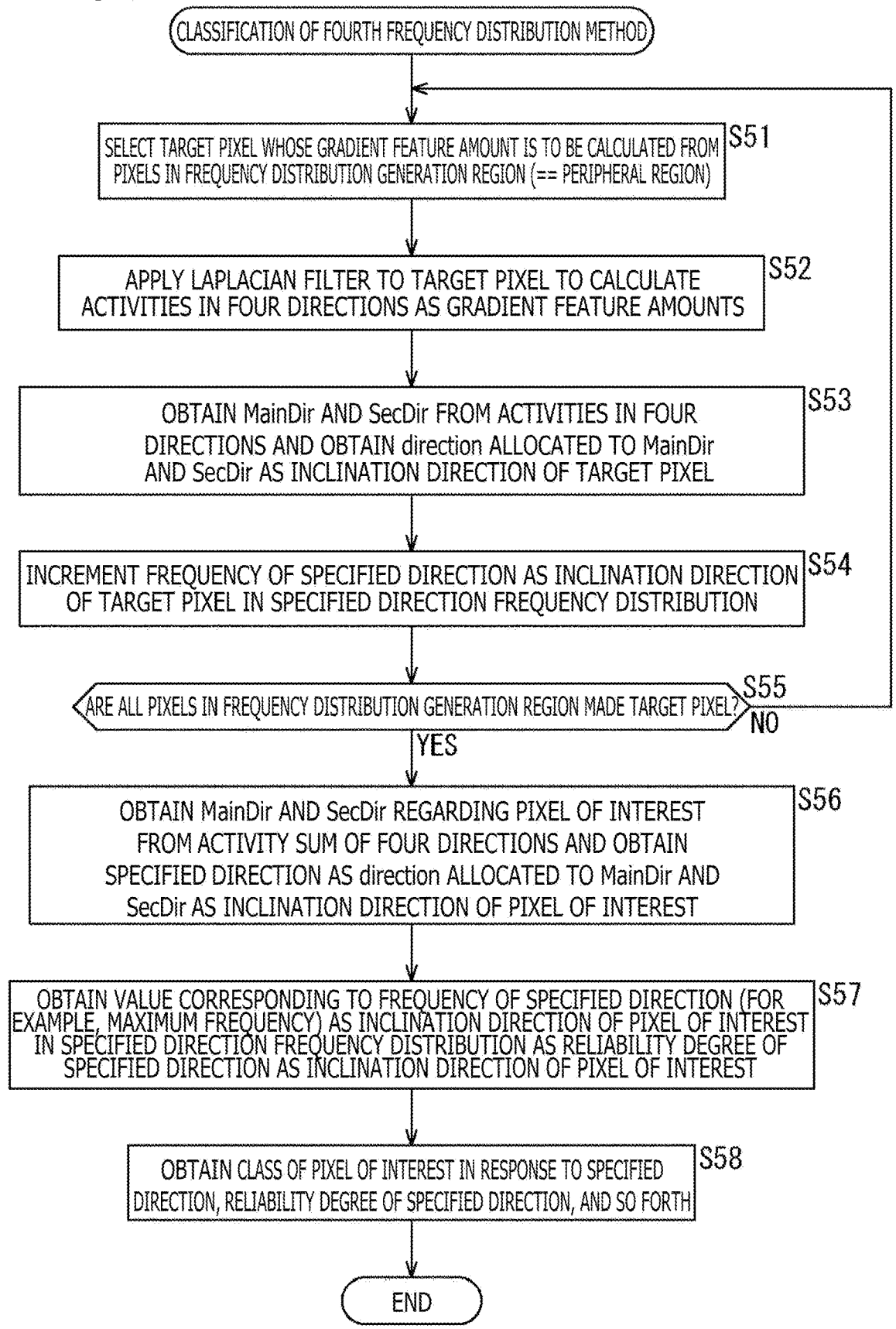
FIG. 14 is a flow chart illustrating an example of processing of classification of the fourth frequency distribution method performed for a pixel of interest by the classification section 60.

FIG. 14 is a flow chart illustrating an example of processing of classification of the fourth frequency distribution method performed for the pixel of interest by the classification section 60 of FIG. 13.

In steps S51 to S55, the classification section 60 performs a loop process similar to that of steps S41 to S45 of FIG. 12.

Then, in the case where it is decided in step S55 that all of the 3×3 pixels in the frequency distribution generation region have been selected as a target pixel, namely, in the case where a frequency distribution of specified directions of the 3×3 pixels in the frequency distribution generation region regarding the pixel of interest is obtained and activity sums in the four respective directions are obtained by adding the activities in the respective four directions of the 3×3 pixels in the peripheral region coincident with the frequency distribution generation region, the processing advances to step S56.

In step S56, the classification section 60 obtains (sets) MainDir and SecDir for each of the activity sums in the four directions regarding the pixel of interest as described hereinabove with reference to FIG. 2 and obtains (sets) the direction allocated to the MainDir and SecDir in the direction classification table (FIG. 2) as a specified direction of the pixel of interest. Thereafter, the processing advances from step S56 to step S57.

In step S57, the classification section 60 obtains (sets) a value corresponding to the frequency of (the class of) the GALF direction as the specified direction of the pixel of interest in the frequency distribution of the specified directions regarding the pixel of interest (for example, the frequency itself of the notified direction of the pixel of interest) as a reliability degree of the specified direction of the pixel of interest. Then, the processing advances to step S58.

In step S58, the classification section 60 performs classification described hereinabove with reference to FIG. 7 according to the specified direction of the pixel of interest, the reliability and the activity sums of the respective four directions to obtain a final class of the pixel of interest and then ends the processing of classification regarding the pixel of interest.

According to the classification of the fourth frequency distribution method, since classification is performed according to a reliability degree of a specified direction of a pixel of interest, the performance of a filter process as a classification prediction process can be improved.

Further, in the classification of the fourth frequency distribution method, only one loop process in steps S51 to S55 exists as a loop process executed setting a plurality of pixels in a frequency distribution generation region as a target pixel as depicted in the flow chart of FIG. 14.

Accordingly, the throughput can be improved in comparison with that by the classification (FIG. 5) of the inner production reliability method in which two loop processes exist.

Further, in the classification of the fourth frequency distribution method, activities themselves in the respective four directions as local gradient feature amounts of a plurality of pixels in a frequency distribution generation region are used to generate a frequency distribution of the specified directions represented by the directions of GALF, and the frequency distribution is used to obtain (set) a specified direction as an inclination direction of the pixel of interest and a reliability degree of the specified direction. Accordingly, according to the fourth frequency distribution method, a reliability degree can be obtained (set) without performing complicated calculation for obtaining an inner product as in the inner production reliability method.

It is to be noted that, since the classification of the fourth frequency distribution method does not require obtaining of a gradient vector as a local gradient feature amount similarly as in the classification of GALF but requires obtaining only of an activity, it can be applied readily to GALF.

In the classification of the fourth frequency distribution method, the classification section 60 not only can obtain a final class described hereinabove with reference to FIG. 7 according to a specified direction and a reliability degree of a pixel of interest and activity sums in respective four directions but also can obtain a final class described hereinabove with reference to FIG. 3, which is obtained by classification of GALF.

FIG. 15 is a view illustrating how to obtain a final class that is obtained by classification of GALF in classification of the fourth frequency distribution method.

In the classification of GALF, in direction subclass classification, a pixel of interest is classified, according to the GALF direction as the specified direction of the pixel of interest, into the direction class 0 representing that the inclination direction of the pixel of interest is the D0 direction or the D1 direction and the class 2 representing that the inclination direction of the pixel of interest is the V direction or the H direction.

The classification section 60 performs direction subclass classification similarly to the classification of GALF. However, the classification section 60 performs direction subclass classification not only according to the GALF direction as a prescribed direction of a pixel of interest but also according to a reliability degree of the specified direction.

Therefore, in FIG. 15, in regard to the direction class, a none (None) class representing that the reliability is low is prepared in addition to the direction classes 0 and 2.

In the case where the reliability degree of a specified direction of a pixel of interest is lower than a threshold value p, the classification section 60 classifies the pixel of interest into the none class direction class as a direction subclass. Then, the classification section 60 classifies the pixel of interest into any of the final classes 0 to 4 according to the activity sums sumA(V), sumA(H), sumA(D0), and sumA(D1) of the V direction, H direction, D0 direction, and D1 direction as the spatial feature amount of the pixel of interest similarly as in the classification of GALF.

In the case where the reliability degree of the specified direction of the pixel of interest is equal to or higher than the threshold value p, the classification section 60 classifies the pixel of interest into the direction class 0 or 2 as a direction subclass according to the GALF direction as the specified direction of the pixel of interest similarly as in the classification of GALF.

In the case where the pixel of interest is classified into the direction class 0 or 2 in the direction subclass classification, the classification section 60 calculates the gradient strength ratio of the expression (2) or the expression (3) similarly as in the classification of GALF and performs gradient strength ratio subclass classification of obtaining a class of the pixel of interest indicating the gradient strength ratio according to the gradient strength ratio.

Thereafter, similarly as in the classification of GALF described hereinabove with reference to FIG. 3, the pixel of interest is classified into any of the final classes 5 to 24 according to the none class, weak class or strong class obtained as a result of the gradient strength ratio subclass classification and the activity sums sumA(V), sumA(H), sumA(D0), and sumA(D1) in the V direction, H direction, D0 direction, and D1 direction as the spatial feature amount of the noticed vector.

In particular, in the case where the direction class of the pixel of interest is the direction class 0, the classification section 60 calculates the gradient strength $r_{d1,d2}$ of the expression (2).

In the case where the gradient strength $r_{d1,d2}$ is equal to or lower than the first threshold value $t_1$, the pixel of interest is classified into the none class as a gradient strength ratio subclass. Then, the pixel of interest is classified into any of the final classes 0 to 4 according to the activity sums sumA(V), sumA(H), sumA(D0), and sumA(D1) in the V direction, H direction, D0 direction, and D1 direction.

In the case where the gradient strength $r_{d1,d2}$ is equal to or higher than the first threshold value $t_1$ but lower than the second threshold value $t_2$, the pixel of interest is classified into the weak class as a gradient strength ratio subclass. Then, the pixel of interest is classified into any of the final classes 5 to 9 according to the activity sums sumA(V), sumA(H), sumA(D0), and sumA(D1) in the V direction, H direction, D0 direction, and D1 direction.

In the case where the gradient strength $r_{d1,d2}$ is equal to or higher than the second threshold value $t_2$, the pixel of interest is classified into the strong class as a gradient strength ratio subclass. Then, the pixel of interest is classified into any of the final classes 10 to 14 according to the activity sums sumA(V), sumA(H), sumA(D0), and sumA (D1) in the V direction, H direction, D0 direction, and D1 direction.

On the other hand, in the case where the direction class of the pixel of interest is the direction class 2, the classification section 60 calculates the gradient strength ration $r_{h,v}$ of the expression (3).

In the case where the gradient strength ration $r_{h,v}$ is lower than the first threshold value $t_1$, the pixel of interest is classified into the none class as a gradient strength ratio subclass. Then, the pixel of interest is classified into any of the final classes 0 to 4 according to the activity sums sumA(V), sumA(H), sumA(D0), and sumA(D1) in the V direction, H direction, D0 direction, and D1 direction.

In the case where the gradient strength ration $r_{h,v}$ is equal to or higher than the first threshold value $t_1$ but lower than the second threshold value $t_2$, the pixel of interest is classified into the weak class as a gradient strength ratio subclass. Then, the pixel of interest is classified into any of the final classes 15 to 19 according to the activity sums sumA (V), sumA(H), sumA(D0), and sumA(D1) in the V direction, H direction, D0 direction, and D1 direction.

In the case where the gradient strength ration $r_{h,v}$ is equal to or higher than the second threshold value $t_2$, the pixel of interest is classified into the strong class as a gradient strength ratio subclass. Then, the pixel of interest is classified into any of the final classes 20 to 24 according to the activity sums sumA(V), sumA(H), sumA(D0), and sumA (D1) in the V direction, H direction, D0 direction, and D1 direction.

It is to be noted that the threshold value p for the reliability degree of a specified direction can be set according to the pixel number in the frequency distribution generation region similarly to the first threshold value p1 and the second threshold value p2. For example, in the case where the frequency itself of the frequency distribution of a specified direction is adopted as the reliability degree of the specified direction, when the frequency distribution generation region is a region of 6×6 pixels, the threshold value p can be set, for example, to ¼ or ⅛ the pixel number (for example, 36 pixels) of the frequency distribution generation region.

The classification of FIG. 15 can be regarded as classification that introduces the reliability degree of an inclination direction (specified direction) into classification of GALF of FIG. 3. According to the classification of FIG. 15, since a pixel is classified depending upon the reliability degree of an inclination direction, in the case where the reliability degree of the inclination direction is low, namely, in the case where the reliability degree of the GALF direction indicating an inclination direction is low, such a situation can be prevented that a pixel is classified into the direction class 0 or 2 by direction subclass classification according to such GALF direction and is classified into a direction class that does not correspond to the inclination direction. As a result, a pixel can be classified into an appropriate class (final class) and a filter process as an appropriate prediction process can be performed using a tap coefficient of the class. Accordingly, the performance of a filter process can be improved.

<Generation of Frequency Distribution of Inclination Directions>

Figure 16:
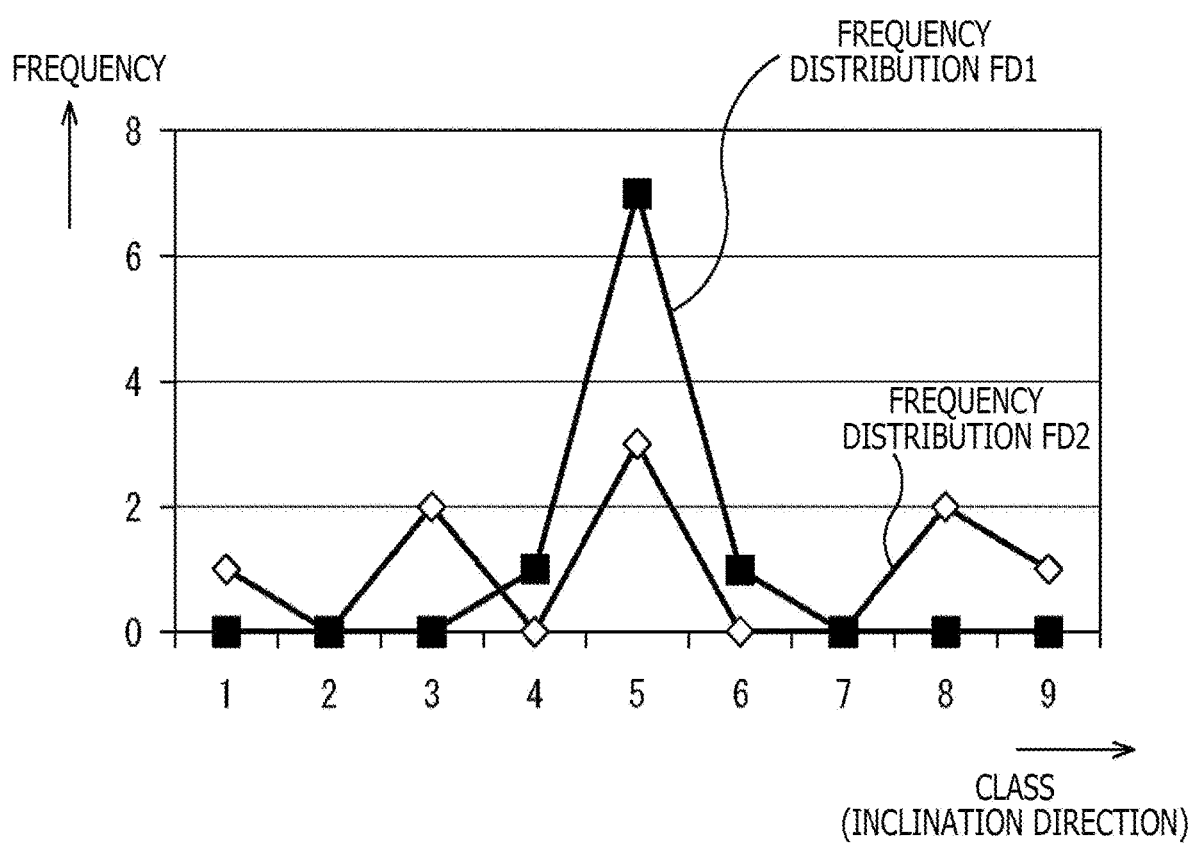
FIG. 16 is a view illustrating generation of a frequency distribution of inclination directions (specified directions).

FIG. 16 is a view illustrating generation of a frequency distribution of inclination directions (specified directions).

In the frequency distribution methods (first to fourth frequency distribution methods), a frequency distribution of inclination directions is generated, targeting (inclination directions of) a plurality of pixels in a frequency distribution generation region.

In the present technology, from a point of view that, if an inclination direction of a pixel of interest is similar to inclination directions of a comparatively great number of pixels in a frequency distribution generation region including the pixel of interest, then the reliability degree of the inclination direction of the pixel of interest is high, the reliability degree of the inclination direction of the pixel of interest is obtained (set) from a frequency distribution of inclination directions. Accordingly, it is necessary for the frequency distribution generation region to be a region of pixels that are comparatively near from the pixel of interest such as a peripheral region of the pixel of interest or the like. Therefore, the frequency distribution generation region is not a region in which the pixel number is not very great.

In the case where a frequency distribution of inclination directions is generated, targeting a plurality of pixels in a frequency distribution generation region in which the pixel number is not very great in this manner, since the pixel number in the frequency distribution generation region is small, an appropriate frequency distribution cannot sometimes be obtained.

In particular, as a frequency distribution of inclination directions, it is ideal that a maximum frequency stands out in comparison with the other frequencies, for example, as in a frequency distribution FD1 of FIG. 16. However, in the case where the pixel number in the frequency distribution generation region is small, such a situation possibly occurs that a plurality of classes of maximum frequencies exists in a frequency distribution of inclination directions or a maximum frequency is not different very much from the other frequencies as in a frequency distribution FD2 of FIG. 16.

Therefore, in generation of a frequency distribution of inclination directions, counting of the frequency can be devised.

In particular, in generation of a frequency distribution of inclination directions, to a frequency of a frequency direction of a pixel near to the pixel of interest from among pixels in a frequency distribution generation region, a weight greater than that of an inclination direction of a pixel far from the pixel of interest is provided to count a frequency, so that a frequency distribution can be generated.

For example, the frequency can be counted setting the weight to the frequency of an inclination direction of a pixel of interest in a frequency distribution generation region to 2 and setting the weight to a frequency of an inclination direction of any other pixel to 1.

Further, in generation of a frequency distribution of inclination directions, a value corresponding to a gradient feature amount of each pixel in a frequency distribution generation region is used as a frequency of the inclination direction to count the frequency, so that a frequency distribution can be generated.

For example, an activity sum of a direction of MainDir of pixels in a frequency distribution generation region is used as a frequency of an inclination direction to count a frequency, so that a frequency distribution can be generated. Further, for example, in the case where the direction of MainDir of a pixel in a frequency distribution generation region is the D0 or D1 direction, the gradient strength ratio $r_{d1,d2}$ of the expression (2) is used as a frequency of the inclination direction to count a frequency, but in the case where the direction of MainDir is the V or H direction, the gradient strength ration $r_{h,v}$ of the expression (3) is used as a frequency of the inclination direction to count a frequency, so that a frequency distribution can be generated.

By devising the counting of a frequency in such a manner as described above, a frequency distribution in which a maximum frequency stands out in comparison with the other frequencies, for example, like the frequency distribution FD1 can be generated.

<Example of Configuration of Classification Prediction Filter that Performs Classification of Frequency Distribution Method>

Figure 17:
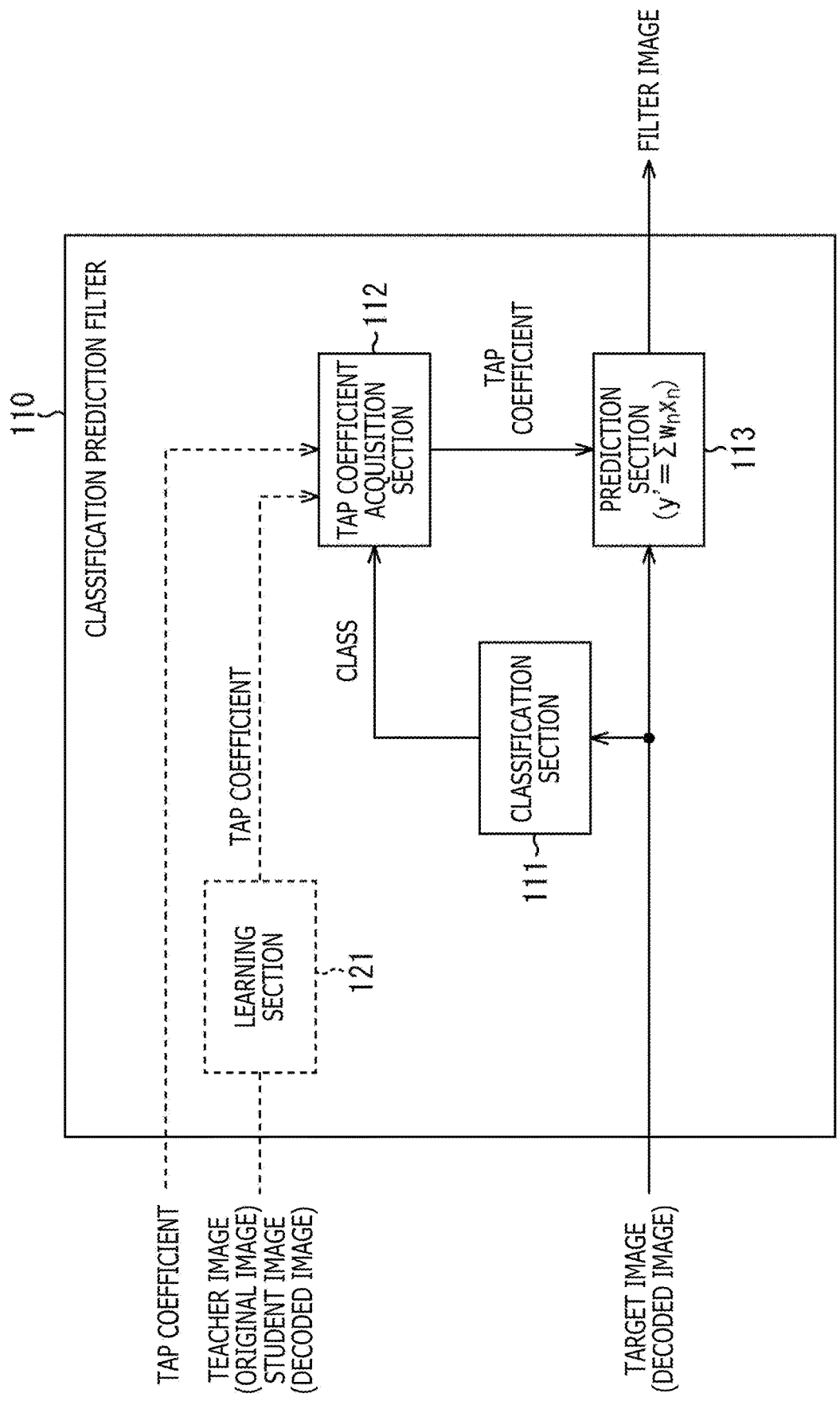
FIG. 17 is a block diagram depicting an example of a configuration of a classification prediction filter that performs classification of the frequency distribution method.

FIG. 17 is a block diagram depicting an example of a configuration of a classification prediction filter that performs a filter process as a classification prediction process of performing classification of the frequency distribution method and applying a prediction formula in which tap coefficients of classes obtained by the classification is used.

Referring to FIG. 17, the classification prediction filter 110 includes a classification section 111, a tap coefficient acquisition section 112, and a prediction section 113.

To the classification section 111 and the prediction section 113, a target image (for example, a decoded image) that becomes a target of a filter process is supplied.

The classification section 111 successively selects pixels of the target image as a pixel of interest, performs classification of the frequency distribution method regarding the pixel of interest to obtain a class (final class) of the pixel of interest, and supplies the final class of the pixel of interest to the tap coefficient acquisition section 112.

The tap coefficient acquisition section 112 has stored therein tap coefficients for individual classes obtained by tap coefficient learning and acquires a tap coefficient to be used for a filter process as a prediction process of a pixel of interest according to a class of the pixel of interest from the classification section 111.

In particular, the tap coefficient acquisition section 112 selects a tap coefficient of the class of the pixel of interest from the classification section 111 from among the tap coefficients for the individual classes and supplies the selected tap coefficient to the prediction section 113.

The prediction section 113 performs a filter process as a prediction process of applying a prediction formula that uses the tap coefficient of the class of the pixel of interest from the tap coefficient acquisition section 112 for the target image and outputs a filter image generated by the filter process.

In particular, the prediction section 113 selects a plurality of pixels, for example, in the proximity of a pixel of interest among pixels of a target image as prediction taps of the pixel of interest. Further, the prediction section 113 performs a prediction process of applying a prediction formula configured from tap coefficients of a class of the pixel of interest, namely, performs calculation of a prediction formula $y'=\Sigma w_n x_n$ configured from (pixel values of) pixels $x_n$ as the prediction taps of the pixel of interest and the tap coefficients $w_n$ of the class of the pixel of interest to obtain a prediction value y' of (the pixel value of) a pixel of a predetermined image for the noticed image (image corresponding to a teacher image) (for example, an original image to the decoded image). Then, the prediction section 113 generates an image in which the prediction value y' is a pixel value and outputs the image as a filter image.

Tap coefficients for individual classes to be stored into the tap coefficient acquisition section 112 in the classification prediction filter 110 can be supplied from the outside to the classification prediction filter 110.

Further, it is possible for the classification prediction filter 110 to have a built-in learning section 121 that performs tap coefficient learning such that tap coefficients for individual classes obtained by the learning section 121 performing tap coefficient learning using a teacher image and a student image are stored into the tap coefficient acquisition section 112.

In the case where the classification prediction filter 110 is applied to an encoding apparatus, an original image of an encoding target can be adopted as a teacher image and a decoded image obtained by encoding and locally decoding the original image can be adopted as a student image. In the tap coefficient learning of the learning section 121, classification of a frequency distribution method similar to that by the classification section 111 is performed using the decoded image as a student image, and for each of the classes obtained by the classification, a tap coefficient that statistically minimizes a prediction error of a prediction value of the teacher image obtained by a prediction formula configured from the tap coefficients and the prediction taps is obtained by the least-squares method.

Here, the classification prediction filter 110 that has the built-in learning section 121 is referred to specifically as the classification prediction filter 110 with a learning function.

Figure 18:
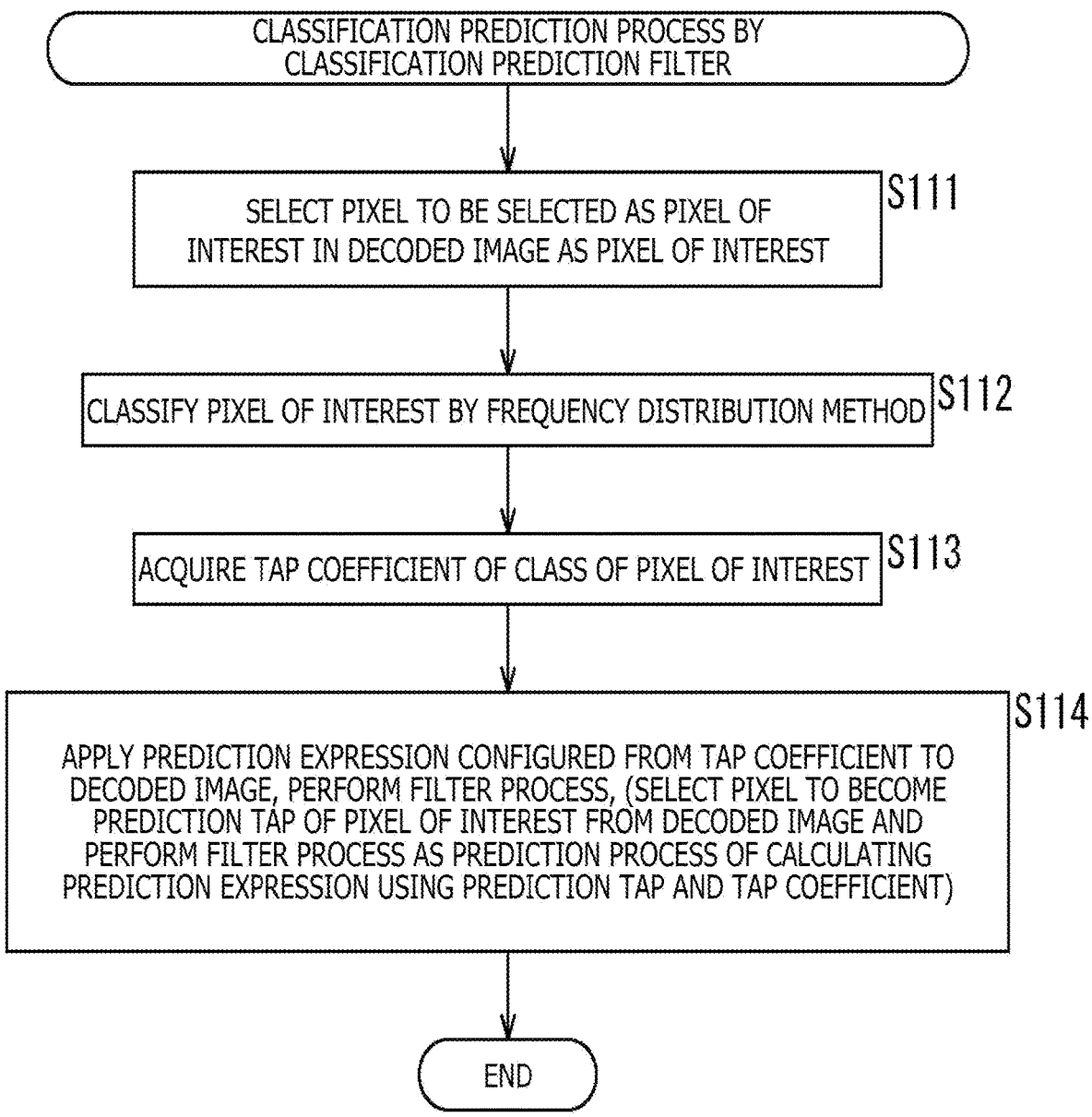
FIG. 18 is a flow chart illustrating an example of a filter process as a classification prediction process performed by a classification prediction filter 110.

FIG. 18 is a flow chart illustrating an example of a filter process as a classification prediction process performed by the classification prediction filter 110 of FIG. 17.

In step S111, the classification section 111 successively selects, as a pixel of interest, pixels to be selected as a pixel of interest in a decoded image as a target image, and the processing advances to step S112.

In step S112, the classification section 111 performs classification of the frequency distribution method regarding the pixel of interest to obtain a class (final class) of the pixel of interest and supplies the final class of the pixel of interest to the tap coefficient acquisition section 112. Then, the processing advances to step S113.

In step S113, the tap coefficient acquisition section 112 acquires tap coefficients of the class of the pixel of interest from the classification section 111 from among the tap coefficients for the individual classes, and the processing advances to step S114.

In step S114, the prediction section 113 performs, for the decoded image, a filter process as a prediction process of applying a prediction formula configured from the tap coefficients of the class of the pixel of interest from the tap coefficient acquisition section 112.

In particular, the prediction section 113 selects pixels that become prediction taps of the pixel of interest from within the decoded image and calculates a first-order prediction formula configured from the prediction taps and tap coefficients of the class of the pixel of interest to obtain a prediction value (of a pixel value) of a pixel of the original image corresponding to the pixel of interest. Then, the prediction section 113 generates an image in which the prediction value is a pixel value and outputs the generated image as a filter image, and the classification prediction process ends therewith.

<Embodiment of Image Processing System to which Present Technology is Applied>

Figure 19:
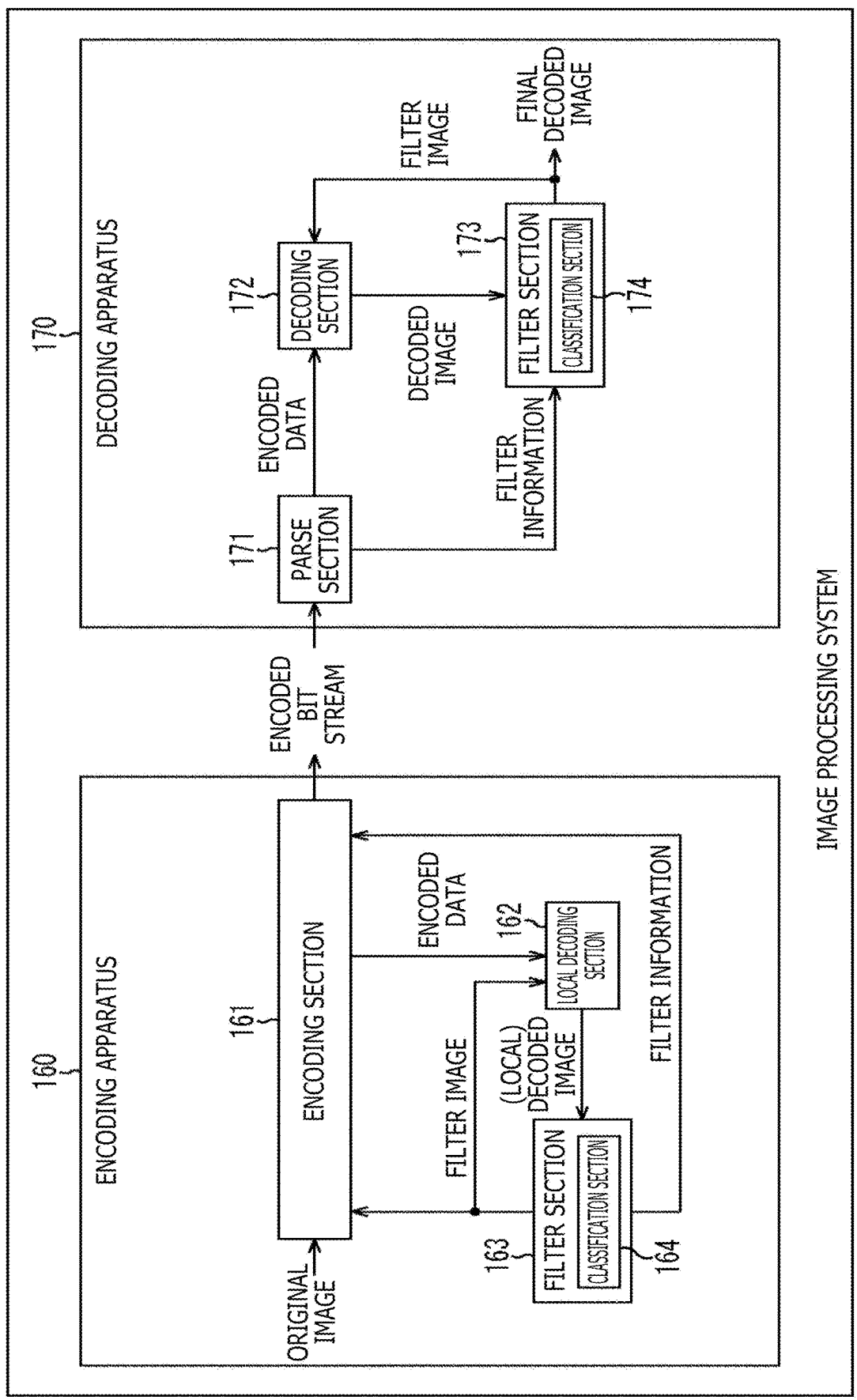
FIG. 19 is a block diagram depicting an overview of an embodiment of an image processing system to which the present technology is applied.

FIG. 19 is a block diagram depicting an overview of an embodiment of an image processing system to which the present technology is applied.

Referring to FIG. 19, the image processing system includes an encoding apparatus 160 and a decoding apparatus 170.

The encoding apparatus 160 includes an encoding section 161, a local decoding section 162, and a filter section 163.

To the encoding section 161, an original image (data) that is an image of an encoding target is supplied and a filter image is supplied from the filter section 163.

The encoding section 161 uses the filter image from the filter section 163 to (prediction) encode the original image in a predetermined block unit such as, for example, a CU and supplies encoded data obtained by the encoding to the local decoding section 162.

In particular, the encoding section 161 subtracts a prediction image of the original image obtained by performing motion compensation of the filter image from the filter section 163 from the original image and encodes a residual obtained by the subtraction.

To the encoding section 161, filter information is supplied from the filter section 163.

The encoding section 161 generates and transmits (sends) an encoded bit stream including the encoded data and the filter information from the filter section 163.

To the local decoding section 162, encoded data is supplied from the encoding section 161 and a filter image is supplied from the filter section 163.

The local decoding section 162 performs local decoding of the encoded data from the encoding section 161 using the filter image from the filter section 163 and supplies a (locally) decoded image obtained as a result of the local decoding to the filter section 163.

In particular, the local decoding section 162 decodes the encoded data from the encoding section 161 into a residual and adds, to the residual, a prediction image of the original image obtained by performing motion compensation for the filter image from the filter section 163 to decode the original image to generate a decoded image.

The filter section 163 includes a classification section 164 that is configured similarly, for example, to the classification prediction filter 110 with a learning function and performs classification of the frequency distribution method.

The filter section 163 uses the decoded image from the local decoding section 162 and the original image corresponding to the decoded image as a student image and a teacher image, respectively, to perform tap coefficient learning to obtain tap coefficients for individual classes.

Further, in the filter section 163, the classification section 164 uses the decoded image from the local decoding section 162 to perform classification of the frequency distribution method. Further, the filter section 163 performs a filter process as a prediction process of applying, to the decoded image, a prediction formula for performing product sum calculation of the tap coefficients of the class of the pixel of interest obtained by classification of the classification section 164 and the pixels of the decoded image.

Then, the filter section 163 supplies a filter image obtained by the filter process to the encoding section 161 and the local decoding section 162. Further, the filter section 163 supplies tap coefficients for the individual classes obtained by tap coefficient learning as filter information to the encoding section 161.

The decoding apparatus 170 includes a parsing section 171, a decoding section 172, and a filter section 173.

The parsing section 171 receives and parses an encoded bit stream transmitted from the encoding apparatus 160 and supplies filter information obtained by the parsing to the filter section 173. Further, the parsing section 171 supplies encoded data included in the encoded bit stream to the decoding section 172.

To the decoding section 172, not only the encoded data from the parsing section 171 is supplied but also a filter image from the filter section 173 is supplied.

The decoding section 172 performs decoding of the encoded data from the parsing section 171 using the filter image from the filter section 173 in a predetermined block unit such as, for example, a CU and supplies a decoded image obtained as a result of the decoding to the filter section 173.

In particular, the decoding section 172 decodes the encoded data from the parsing section 171 into a residual similarly to the local decoding section 162 and adds, to the residual, a prediction image of the original image obtained by performing motion compensation for the filter image from the filter section 173 to generate a decoded image of the original image.

The filter section 173 includes a classification section 174 that is configured similarly, for example, to the classification prediction filter 110 without a learning function and performs classification of the frequency distribution method.

The filter section 173 performs a filter process similar to that of the filter section 163 for the decoded image from the decoding section 172 to generate a filter image and supplies the filter image to the decoding section 172.

In particular, in the filter section 173, the classification section 174 performs classification of the frequency distribution method using the decoded image from the decoding section 172. Further, the filter section 173 performs a filter process as a prediction process of applying, to the decoded image, a prediction formula for performing product sum calculation of tap coefficients of the class of the pixel of interest obtained by classification of the classification section 174 and the pixels of the decoded image. The tap coefficients of the class of the pixel of interest used in the filter process are acquired from the tap coefficients for the individual classes included in the filter information from the parsing section 171.

The filter section 173 supplies a filter image obtained by the filter process to the decoding section 172 and outputs the filter image as a final decoded image of the original image.

It is to be noted that it is possible for the filter sections 163 and 173 to have stored (preset) therein tap coefficients for individual classes obtained by performing tap coefficient learning in which an image corresponding to the original image and an image corresponding to the decoded image are used as a teacher image and a student image, respectively. In this case, the filter section 163 can be configured similarly to the classification prediction filter 110 that does not have a learning function.

Figure 20:
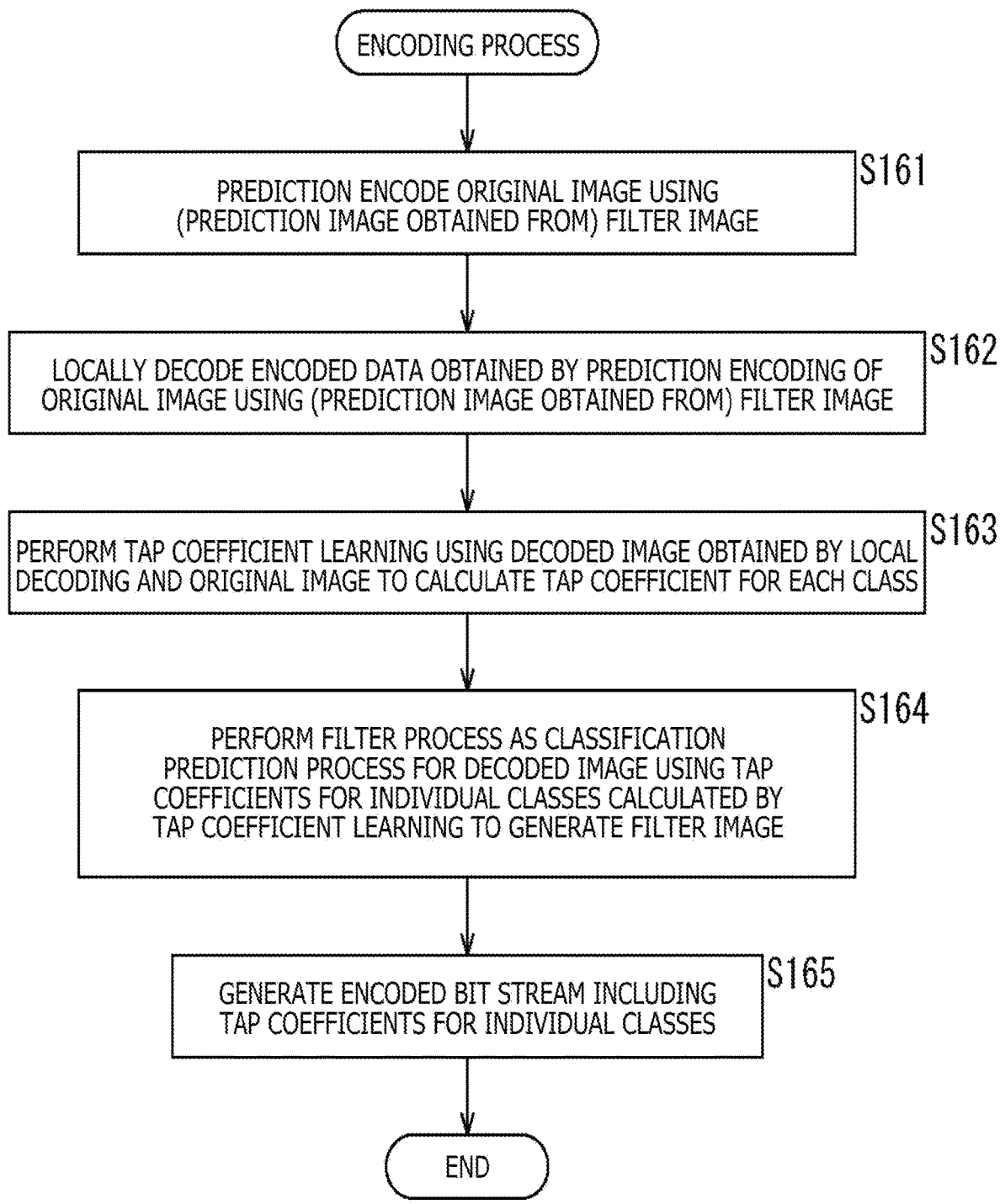
FIG. 20 is a flow chart illustrating an overview of an encoding process of an encoding apparatus 160.

FIG. 20 is a flow chart illustrating an overview of an encoding process of the encoding apparatus 160 of FIG. 19.

The processing according to the flow chart of FIG. 20 is performed, for example, in a unit of a frame (picture).

In step S161, the encoding section 161 (FIG. 19) (prediction) encodes an original image using a filter image from the filter section 163 and supplies encoded data obtained by the encoding to the local decoding section 162. Then, the processing advances to step S162.

In step S162, the local decoding section 162 performs local decoding of the encoded data from the encoding section 161 using the filter image from the filter section 163 and supplies a (local) decoded image obtained as a result of the local decoding to the filter section 163. Then, the processing advances to step S163.

In step S163, the filter section 163 perform tap coefficient learning using the decoded image from the local decoding section 162 and the original image corresponding to the decoded image as a student image and a teacher image, respectively, to obtain tap coefficients for individual classes. Then, the processing advances to step S164. It is to be noted that, in the tap coefficient learning, classification is performed and a normal equation is set up for each class. Then, by solving the normal equation for each class, tap coefficients for the class are obtained. The classification performed by the tap coefficient learning is classification of the frequency distribution method.

In step S164, the filter section 163 uses the tap coefficients for the individual classes obtained by the tap coefficient learning to perform a filter process as a classification prediction process for the decoded image from the local decoding section 162 to generate a filter image.

In particular, the classification section 164 of the filter section 163 performs classification of the frequency distribution method regarding the pixel of interest of the decoded image from the local decoding section 162. Further, the filter section 163 performs a filter process as a prediction process of applying, to the decoded image, a prediction formula for performing product sum calculation of the tap coefficients of the class of the pixel of interest from among the tap coefficients for the individual classes obtained by the tap coefficient learning and pixels of the decoded image to generate a filter image. The filter image is supplied from the filter section 163 to the encoding section 161 and the local decoding section 162. The filter process supplied from the filter section 163 to the encoding section 161 and the local decoding section 162 is used in the processing in steps S161 and S162 performed, targeting a next frame.

Further, the filter section 163 supplies the tap coefficients for the individual classes obtained by the tap coefficient learning as filter information to the encoding section 161.

Thereafter, the processing advances from step S164 to S165, in which the encoding section 161 generates and transmits an encoded bit stream including the encoded data obtained in step S161 and the tap coefficients for the individual classes as the filter information from the filter section 163.

Figure 21:
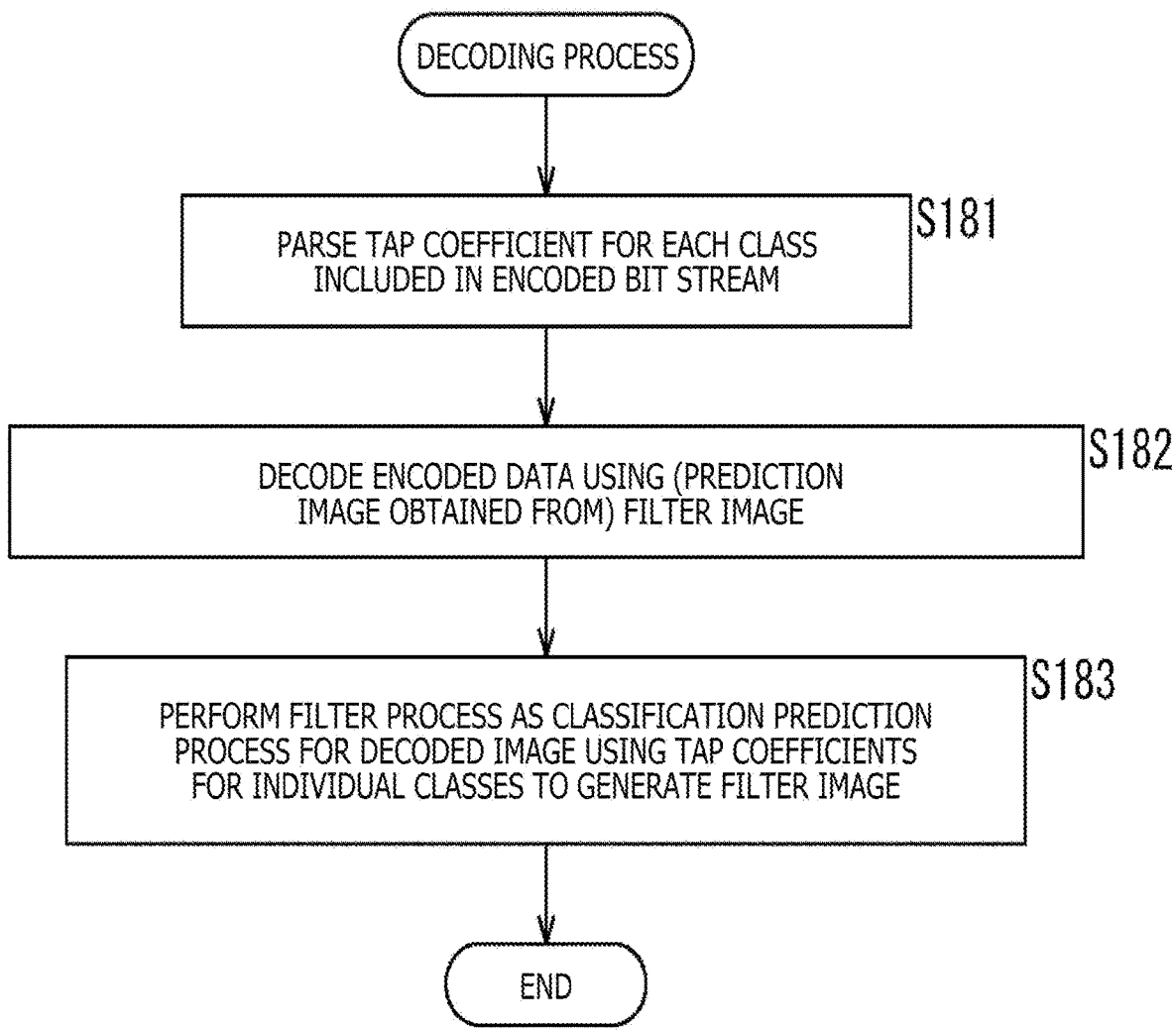
FIG. 21 is a flow chart illustrating an overview of a decoding process of a decoding apparatus 170.

FIG. 21 is a flow chart illustrating an overview of a decoding process of the decoding apparatus 170 of FIG. 19.

Processes according to the flow chart of FIG. 21 are performed in a unit of a frame similarly, for example, to those as in the encoding process of FIG. 20.

In step S181, the parsing section 171 (FIG. 19) receives an encoded bit stream transmitted from the encoding apparatus 160, parses tap coefficients for individual classes as filter information included in the encoded bit stream and supplies the tap coefficients to the filter section 173. Further, the parsing section 171 supplies encoded data included in the encoded bit stream to the decoding section 172, and the processing advances from step S181 to step S182.

In step S182, the decoding section 172 performs decoding of the encoded data from the parsing section 171 using the filter image from the filter section 173 and supplies a decoded image obtained as a result of the decoding to the filter section 173. Then, the processing advances to step S183.

In step S183, the filter section 173 uses the tap coefficients for the individual classes as the filter image from the parsing section 171 to perform a filter process as a classification prediction process for the decoded image from the decoding section 172 to generate a filter image.

In particular, the classification section 174 of the filter section 173 performs classification of the frequency distribution method regarding the pixel of interest of the decoded image from the decoding section 172. Further, the filter section 173 performs a filter process as a prediction process of applying, to the decoded image, a prediction formula for performing product sum calculation of the tap coefficients of the class of the pixel of interest from among the tap coefficients for the individual classes from the decoding section 172 and the pixels of the decoded image to generate a filter image.

The filter image is supplied from the filter section 173 to the decoding section 172 and is outputted as a final decoded image obtained by decoding the original image.

The filter image supplied from the filter section 173 to the decoding section 172 is used in processing in step S182 that is performed, targeting a next frame of the decoded image.

<Example of Configuration of Encoding Apparatus 160>

Figure 22:
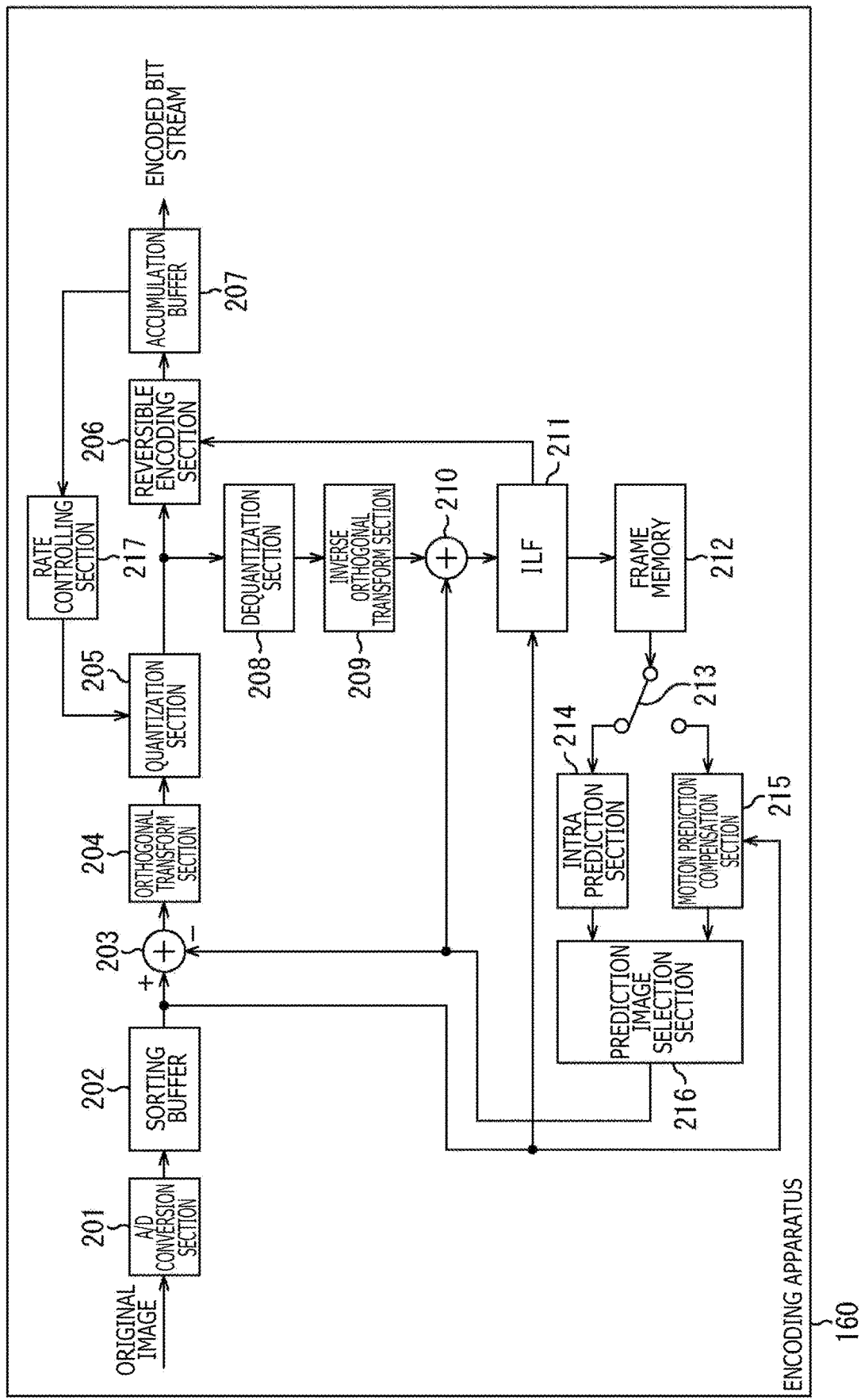
FIG. 22 is a block diagram depicting an example of a detailed configuration of the encoding apparatus 160.

FIG. 22 is a block diagram depicting an example of a detailed configuration of the encoding apparatus 160 of FIG. 19.

It is to be noted that, in block diagrams with reference to which description is given below, in order to avoid complicated illustration, description of lines for supplying information (data) necessitated in processing of the blocks is suitably omitted.

Referring to FIG. 22, the encoding apparatus 160 includes an A/D conversion section 201, a sorting buffer 202, an arithmetic section 203, an orthogonal transform section 204, a quantization section 205, a reversible encoding section 206, and an accumulation buffer 207. The encoding apparatus 160 further includes a dequantization section 208, an inverse orthogonal transform section 209, an arithmetic section 210, an ILF 211, a frame memory 212, a selection section 213, an intra prediction section 214, a motion prediction compensation section 215, a prediction image selection section 216, and a rate controlling section 217.

The A/D conversion section 201 A/D converts an original image of an analog signal into an original signal of a digital signal and supplies the original image of the digital signal to the sorting buffer 202 so as to be stored.

The sorting buffer 202 sorts frames of the original image from a displaying order into an encoding (decoding) order according to the GOP (Group of Picture) and supplies the sorted frames of the original image to the arithmetic section 203, intra prediction section 214, motion prediction compensation section 215, and ILF 211.

The arithmetic section 203 subtracts a prediction image supplied from the intra prediction section 214 or the motion prediction compensation section 215 through the prediction image selection section 216 from the original image from the sorting buffer 202 and supplies a residual (prediction residual) obtained by the subtraction to the orthogonal transform section 204.

For example, in the case of an image for which inter encoding is to be performed, the arithmetic section 203 subtracts the prediction image supplied from the motion prediction compensation section 215 from the original image read out from the sorting buffer 202.

The orthogonal transform section 204 performs orthogonal transform such as discrete cosine transform or Karhunen Loeve transform for the residual supplied from the arithmetic section 203. It is to be noted that the method of this orthogonal transform is optional. The orthogonal transform section 204 supplies orthogonal transform coefficients obtained by the orthogonal transform to the quantization section 205.

The quantization section 205 quantizes the orthogonal transform coefficients supplied from the orthogonal transform section 204. The quantization section 205 sets a quantization parameter QP on the basis of a target amount for the code amount (code amount target value) supplied from the rate controlling section 217 and performs quantization of the orthogonal transform coefficients. It is to be noted that the method of quantization is optional. The quantization section 205 supplies encoded data of the quantized orthogonal transform coefficients to the reversible encoding section 206.

The reversible encoding section 206 encodes the quantized orthogonal transform coefficients as the encoded data from the quantization section 205 by a predetermined reversible encoding method. Since the orthogonal transform coefficients are quantized under the control of the rate controlling section 217, the code amount of an encoded bit stream obtained by the reversible encoding of the reversible encoding section 206 becomes the code amount target value set by the rate controlling section 217 (or is approximated to the code amount target value).

Further, the reversible encoding section 206 acquires encoded information necessary for decoding by the decoding apparatus 170 from within the encoded information regarding prediction encoding by the encoding apparatus 160 from the associated blocks.

Here, as the encoded information, for example, a prediction mode of intra prediction or inter-prediction, motion information such as motion vectors, a code amount target value, a quantization parameter QP, a picture type (I, P, or B), information of a CU (Coding Unit) or a CTU (Coding Tree Unit), and so forth are available.

For example, the prediction mode can be acquired from the intra prediction section 214 or the motion prediction compensation section 215. Further, for example, the motion information can be acquired from the motion prediction compensation section 215.

The reversible encoding section 206 not only acquires encoded information but also acquires tap coefficients for individual classes as filter information relating to a filter process by the ILF 211 from the ILF 211.

The reversible encoding section 206 encodes the encoded information and the filter information by variable length encoding such as, for example, CAVLC (Context-Adaptive Variable Length Coding) or CABAC (Context-Adaptive Binary Arithmetic Coding) or a reversible encoding method such as arithmetic encoding or the like to generate an encoded bit stream including the encoded information and filter information after the encoding and the encoded data from the quantization section 205 and supplies the encoded bit stream to the accumulation buffer 207.

The accumulation buffer 207 temporarily accumulates an encoded bit stream supplied from the reversible encoding section 206. The encoded bit stream accumulated in the accumulation buffer 207 is read out and transmitted at a predetermined timing.

The encoded data that is orthogonal transform coefficients quantized by the quantization section 205 is supplied to the reversible encoding section 206 and supplied also to the dequantization section 208. The dequantization section 208 dequantizes the quantized orthogonal transform coefficients by a method corresponding to that of the quantization by the quantization section 205 and supplies orthogonal transform coefficients obtained by the dequantization to the inverse orthogonal transform section 209.

The inverse orthogonal transform section 209 inverse orthogonal transforms the orthogonal transform coefficients supplied from the dequantization section 208 by a method corresponding to that of the orthogonal transform process by the orthogonal transform section 204 and supplies a residual obtained as a result of the inverse orthogonal transform to the arithmetic section 210.

The arithmetic section 210 adds, to the residual supplied from the inverse orthogonal transform section 209, a prediction image supplied from the intra prediction section 214 or the motion prediction compensation section 215 through the prediction image selection section 216 to obtain (part of) a decoded image of the original image, and outputs the decoded image.

The decoded image outputted from the arithmetic section 210 is supplied to the ILF 211.

The ILF 211 is configured similarly, for example, to the classification prediction filter 110 with a learning function (FIG. 17) and performs a filter process as a classification prediction process thereby to function as one of or, two or more of a deblocking filter, an adaptive offset filter, a bilateral filter, and an ALF. In the case where the ILF 211 is caused to function as two or more ones of a deblocking filter, an adaptive offset filter, a bilateral filter, and an ALF, the order of arrangement of the two or more filters is optional.

To the ILF 211, not only a decoded image is supplied from the arithmetic section 210, but also an original image corresponding to the decoded image is supplied from the sorting buffer 202.

The ILF 211 uses, for example, the decoded image from the arithmetic section 210 and the original image from the sorting buffer 202 as a student image and a teacher image, respectively, to perform tap coefficient learning to obtain tap coefficients for the individual classes. In the tap coefficient learning, the decoded image as the student image is used to perform classification of the frequency distribution method, and a tap coefficient that statistically minimizes a prediction error of a prediction value of the original image as the teacher image obtained by a prediction formula configured from tap coefficients and prediction taps for each of classes obtained by the classification is obtained by the least-squares method.

The ILF 211 supplies tap coefficients for the individual classes obtained by the tap coefficient learning as filter information to the reversible encoding section 206.

Further, the ILF 211 successively selects, for example, pixels of the decoded image from the arithmetic section 210 as a pixel of interest. Further, the ILF 211 performs classification of the noticed distribution method regarding the pixel of interest to obtain a class of the pixel of interest. Further, the ILF 211 acquires (reads out) tap coefficients of the class of the pixel of interest from among tap coefficients for the individual classes determined by tap coefficient learning. Then, the ILF 211 selects pixels in the proximity of the pixel of interest as prediction taps from the decoded image and performs a filter process as a prediction process of applying, to the decoded image, a prediction formula for performing product sum calculation of the tap coefficients of the class of the pixel of interest and the pixels of the decoded image as the prediction taps to generate a filter image. It is to be noted that, in the classification by the ILF 211, for example, a class obtained by classification of an upper left one of 2×2 pixels can be adopted as classes individually of the 2×2 pixels.

The filter image generated by the ILF 211 is supplied to the frame memory 212.

The frame memory 212 temporarily stores the filter image supplied from the ILF 211. The filter image stored in the frame memory 212 is supplied as a reference image to be used for generation of a prediction image to the selection section 213 at a necessary timing.

The selection section 213 selects a supplying destination of the reference image supplied from the frame memory 212. For example, in the case where intra prediction is to be performed by the intra prediction section 214, the selection section 213 supplies the reference image supplied from the frame memory 212 to the intra prediction section 214. On the other hand, for example, in the case where inter-prediction is to be performed by the motion prediction compensation section 215, the selection section 213 supplies the reference image supplied from the frame memory 212 to the motion prediction compensation section 215.

The intra prediction section 214 uses the original image supplied from the sorting buffer 202 and the reference image supplied from the frame memory 212 through the selection section 213 to perform intra prediction (in-screen prediction) using, for example, a PU (Prediction Unit) as a processing unit. The intra prediction section 214 selects an optimum intra prediction mode on the basis of a predetermined cost function (for example, an RD cost or the like), and supplies a prediction image obtained by the optimum intra prediction mode to the prediction image selection section 216. Further, as described hereinabove, the intra prediction section 214 suitably supplies the prediction mode indicative of the intra prediction mode selected on the basis of the cost function to the reversible encoding section 206 and so forth.

The motion prediction compensation section 215 uses the original image supplied from the sorting buffer 202 and the reference image supplied from the frame memory 212 through the selection section 213 to perform motion prediction (inter-prediction) using, for example, a PU as a processing unit. Further, the motion prediction compensation section 215 performs motion compensation according to a motion vector detected by the motion prediction to generate a prediction image. The motion prediction compensation section 215 performs inter-prediction in a plurality of inter-prediction modes prepared in advance to generate a prediction image.

The motion prediction compensation section 215 selects an optimum inter-prediction mode on the basis of predetermined cost functions of the prediction image obtained individually for the plurality of inter-prediction modes. Further, the motion prediction compensation section 215 supplies the prediction image generated in the optimum inter-prediction mode to the prediction image selection section 216.

Further, the motion prediction compensation section 215 supplies the prediction mode indicative of the inter-prediction mode selected on the basis of the cost functions, motion information such as motion vectors and so forth necessary when encoded data encoded by the inter-prediction mode is decoded and so forth to the reversible encoding section 206.

The prediction image selection section 216 selects a supplying source (the intra prediction section 214 or the motion prediction compensation section 215) of a prediction image to be supplied to the arithmetic section 203 and the arithmetic section 210 and supplies a prediction image supplied from the selected supplying source to the arithmetic section 203 and the arithmetic section 210.

The rate controlling section 217 controls the rate of quantization action of the quantization section 205 on the basis of the code amount of the encoded bit stream accumulated in the accumulation buffer 207 such that an overflow or an underflow does not occur. In particular, the rate controlling section 217 sets a target code amount of an encoded bit stream such that any of an overflow and an underflow of the accumulation buffer 207 does not occur and supplies the target code amount to the quantization section 205.

It is to be noted that, in FIG. 22, the blocks from the arithmetic section 203 to the reversible encoding section 206 correspond to the encoding section 161 of FIG. 19; the blocks from the dequantization section 208 to the arithmetic section 210 correspond to the local decoding section 162 of FIG. 19; and the ILF 211 corresponds to the filter section 163 of FIG. 19.

<Encoding Process>

Figure 23:
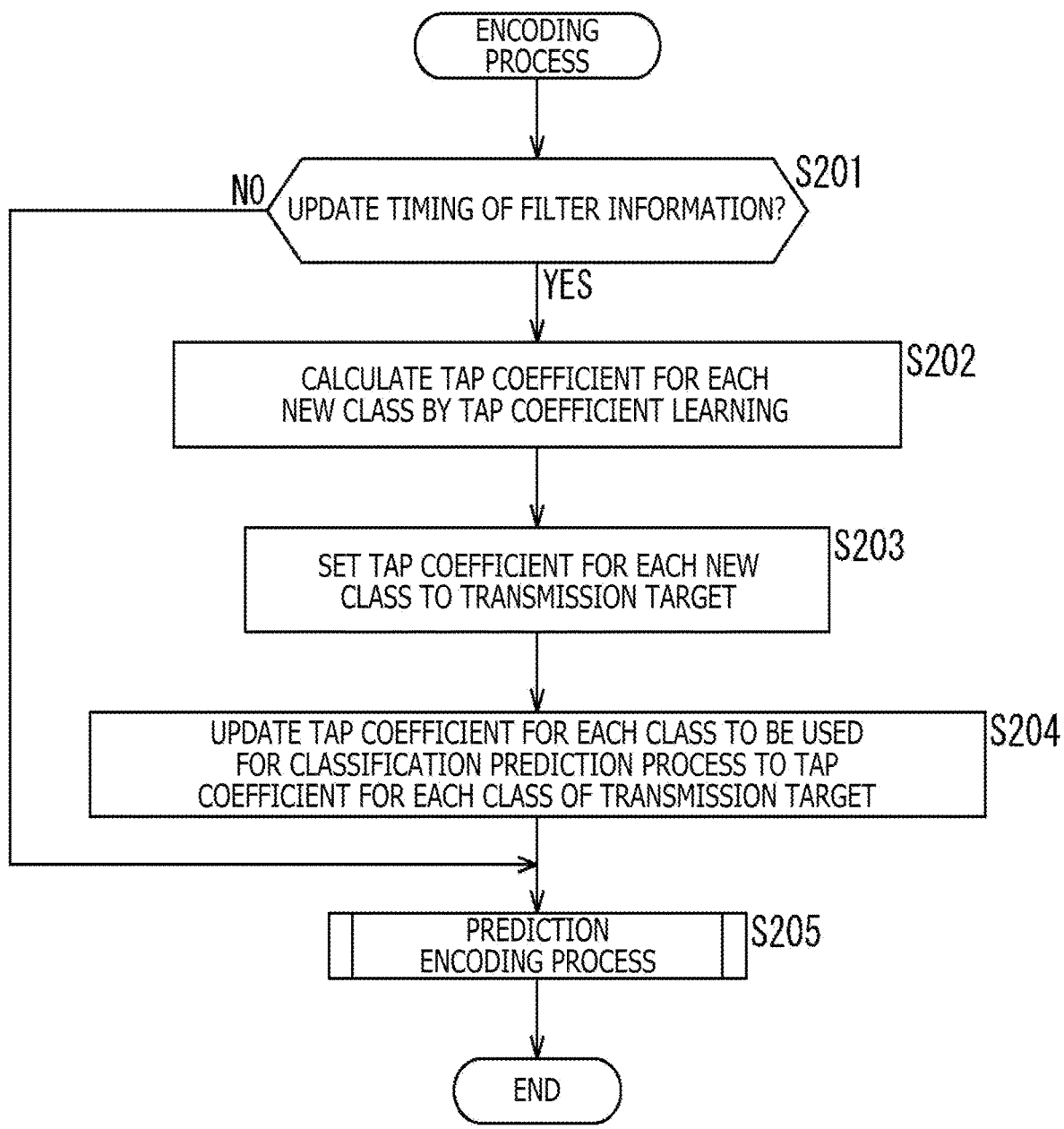
FIG. 23 is a flow chart illustrating an example of an encoding process of the encoding apparatus 160.

FIG. 23 is a flow chart illustrating an example of an encoding process of the encoding apparatus 160 of FIG. 22.

It is to be noted that the order of steps of the encoding process depicted in FIG. 23 and so forth is an order according to the convenience of description, and actual steps of the encoding process are suitably performed in parallel or in a necessary order. This similarly applies also to processes hereinafter described.

In the encoding apparatus 160, the ILF 211 temporarily stores a decoded image supplied from the arithmetic section 210 and temporarily stores an original image corresponding to the decoded image from the arithmetic section 210 supplied from the sorting buffer 202.

Then, (a control section not depicted of) the encoding apparatus 160 decides in step S201 whether or not the current timing is an update timing at which filter information is to be updated.

Here, the update timing of filter information can be determined in advance such that it comes, for example, after every one or more frames (pictures), one or more sequences, one or more slices, one or more lines of a predetermined block such as a CTU or the like.

Further, as the update timing of filter information, not only a periodic (fixed) timing like a timing after every one or more frames (pictures) but also what is called a dynamic timing such as a timing at which the S/N of the filter becomes equal to or lower than a threshold value (timing at which the error of the filter image from the original image becomes equal to or greater than the threshold value) or a timing at which (the absolute value sum or the like of) the residual becomes equal to or higher than a threshold value can be adopted.

Here, it is assumed that, for example, the ILF 211 uses one frame of a decoded image and an original image to perform tap coefficient learning and a timing after every one frame is an update timing of filter information.

In the case where it is decided in step S201 that the current timing is not an update timing for filter information, the processing skips steps S202 to S204 and advances to step S205.

On the other hand, in the case where it is decided in step S201 that the current timing is an update timing of filter information, the processing advances to step S202, in which the ILF 211 performs tap coefficient learning for obtaining tap coefficients for each class.

In particular, the ILF 211 uses a decoded image and an original image stored, for example, after the last update timing till the current update timing (here, a decoded image and an original image of the latest one frame supplied to the ILF 211) to perform tap coefficient learning thereby to obtain tap coefficients for each class.

Then, the processing advances from step S202 to step S203, in which the ILF 211 supplies the tap coefficients for the individual classes as filter information to the reversible encoding section 206. The reversible encoding section 206 sets the filter information from the ILF 211 as a transmission target, and the processing advances from step S203 to step 204. The filter information set as a transmission target is placed into and transmitted together with an encoded bit stream in a prediction encoding process performed in step S205 hereinafter described.

In step S204, the ILF 211 updates the tap coefficients to be used in the classification prediction process with the tap coefficients for the individual classes obtained by the tap coefficient learning in the latest step S202, and then the processing advances to step S205.

In step S205, a prediction encoding process for the original image is performed, and the encoding process ends therewith.

Figure 24:
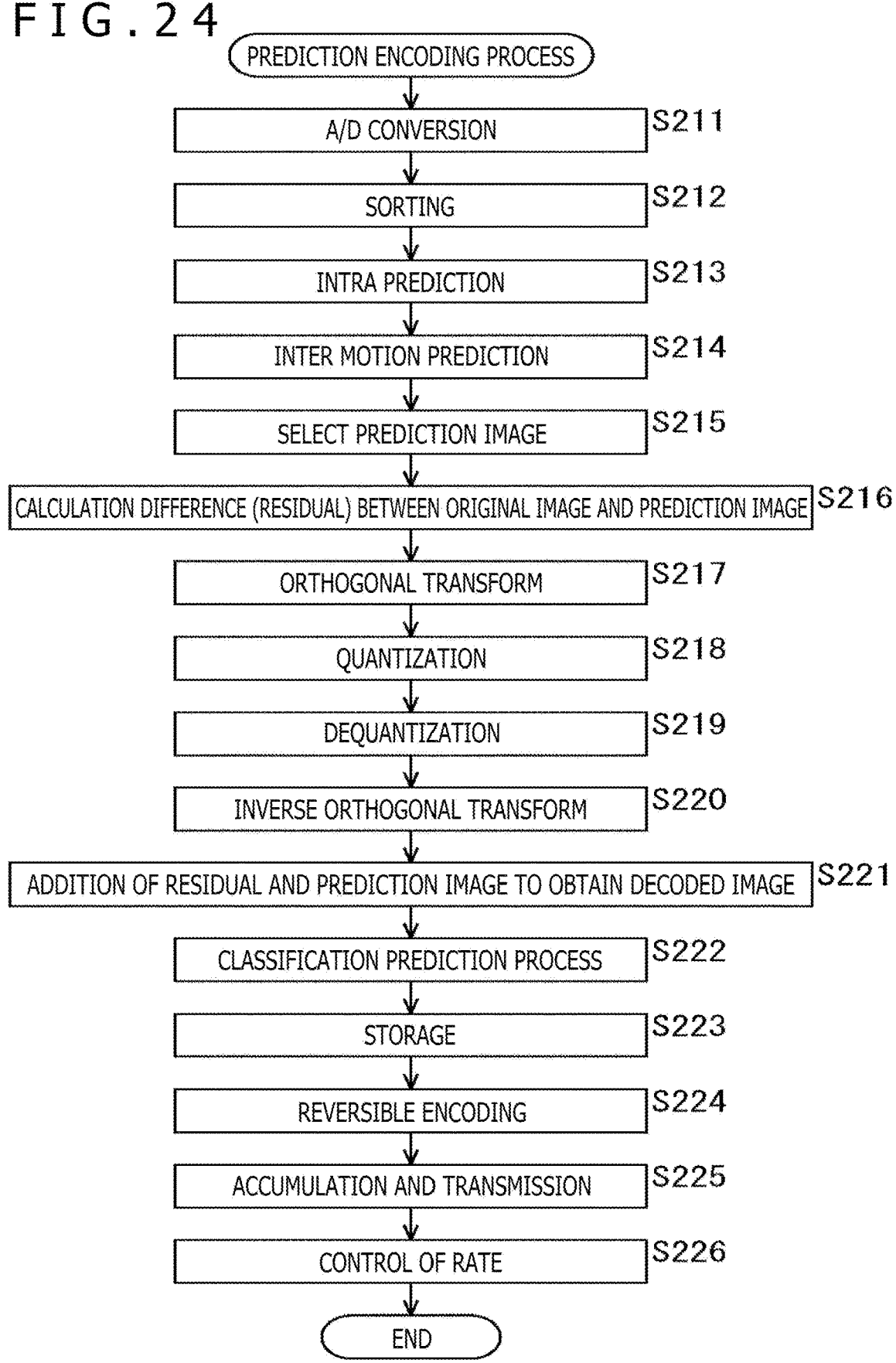
FIG. 24 is a flow chart illustrating an example of a prediction encoding process in step S205.

FIG. 24 is a flow chart illustrating an example of the prediction encoding process in step S205 of FIG. 23.

In the prediction encoding process, in step S211, the A/D conversion section 201 A/D converts and supplies an original image to the sorting buffer 202, and the processing advances to step S212.

In step S212, the sorting buffer 202 stores the original image from the A/D conversion section 201, performs sorting of the original image into an encoding order and outputs a resulting image, and the processing advances to step S213.

In step S213, the intra prediction section 214 performs an intra prediction process of an intra prediction mode, and the processing advances to step S214. In step S214, the motion prediction compensation section 215 performs an inter motion prediction process of performing motion prediction and motion compensation in the inter-prediction mode, and the processing advances to step S215.

In the intra prediction process of the intra prediction section 214 and the inter motion prediction process of the motion prediction compensation section 215, cost functions of various kinds of prediction modes are obtained and a prediction image is generated.

In step S215, the prediction image selection section 216 determines an optimum prediction mode on the basis of the cost functions obtained by the intra prediction section 214 and the motion prediction compensation section 215. Then, the prediction image selection section 216 selects a prediction image of the optimum prediction mode from between the prediction image generated by the intra prediction section 214 and the prediction image generated by the motion prediction compensation section 215, and the processing advances from step S215 to step S216.

In step S216, the arithmetic section 203 calculates a residual between the target image of the encoding target that is the original image outputted from the sorting buffer 202 and the prediction image outputted from the prediction image selection section 216 and supplies the residual to the orthogonal transform section 204. Then, the processing advances to step S217.

In step S217, the orthogonal transform section 204 orthogonally transforms the residual from the arithmetic section 203 and supplies orthogonal transform coefficients obtained as a result of the orthogonal transform to the quantization section 205, and the processing advances to step S218.

In step S218, the quantization section 205 quantizes the orthogonal transform coefficients from the orthogonal transform section 204 and supplies the quantization coefficients obtained by the quantization to the reversible encoding section 206 and the dequantization section 208. Then, the processing advances to step S219.

In step S219, the dequantization section 208 dequantizes the quantization coefficients from the quantization section 205 and supplies orthogonal transform coefficients obtained as a result of the dequantization to the inverse orthogonal transform section 209, and the processing advances to step S220. In step S220, the inverse orthogonal transform section 209 performs inverse orthogonal transform of the orthogonal transform coefficients from the dequantization section 208 and supplies a residual obtained as a result of the inverse orthogonal transform to the arithmetic section 210. Then, the processing advances to step S221.

In step S221, the arithmetic section 210 adds the residual from the inverse orthogonal transform section 209 and the prediction image outputted from the prediction image selection section 216 to generate a decoded image corresponding to the original image that has been a target of the calculation of the residual by the arithmetic section 203. The arithmetic section 210 supplies the decoded image to the ILF 211, and the processing advances from step S221 to step S222.

In step S222, the ILF 211 performs a filter process as a classification prediction process for the decoded image from the arithmetic section 210 and supplies a filter process obtained by the filter process to the frame memory 212. Then, the processing advances from step S222 to step S223.

In the classification prediction process in step S222, a process similar to that by the classification prediction filter 110 (FIG. 17) is performed.

In particular, as described hereinabove with reference to FIG. 18, the ILF 211 performs classification of the frequency distribution method regarding the pixel of interest of the decoded image from the arithmetic section 210 to obtain a class (final class) of the pixel of interest. Further, the ILF 211 acquires tap coefficients of the class of the pixel of interest from among the tap coefficients for the individual classes updated in step S204 of FIG. 23. Thereafter, the ILF 211 performs a filter process as a prediction process of applying a prediction formula configured using the tap coefficients of the class of the pixel of interest to the decoded image to generate a filter image. The filter image is supplied from the ILF 211 to the frame memory 212.

In step S223, the frame memory 212 stores the filter image supplied from the ILF 211, and the processing advances to step S224. The filter image stored in the frame memory 212 is used as a reference image on the basis of which a prediction image is to be generated in step S213 or step S114.

In step S224, the reversible encoding section 206 encodes encoded data that is the quantization coefficients from the quantization section 205 to generate an encoded bit stream including the encoded data. Further, the reversible encoding section 206 encodes, as occasion demands, the quantization parameters QP used for quantization by the quantization section 205 and encoded information of the prediction mode obtained by the intra prediction process by the intra prediction section 214, the prediction mode obtained by the inter motion prediction process by the motion prediction compensation section 215, motion information, and so forth, and places the encoded information into the encoded bit stream.

Further, the reversible encoding section 206 encodes, as occasion demands, the filter information set as the transmission target in step S203 of FIG. 23 and places the encoded filter information into the encoded bit stream. Then, the reversible encoding section 206 supplies the encoded bit stream to the accumulation buffer 207, and the processing advances from step S224 to step S225.

In step S225, the accumulation buffer 207 accumulates the encoded bit stream from the reversible encoding section 206, and the processing advances to step S226. The encoded bit stream accumulated in the accumulation buffer 207 is read out and transmitted suitably.

In step S226, the rate controlling section 217 controls the rate of the quantization action of the quantization section 205 on the basis of the code amount (generation code amount) of the encoded bit stream accumulated in the accumulation buffer 207 such that an overflow or an underflow does not occur. Then, the encoding process ends therewith.

<Example of Configuration of Decoding Apparatus 170>

Figure 25:
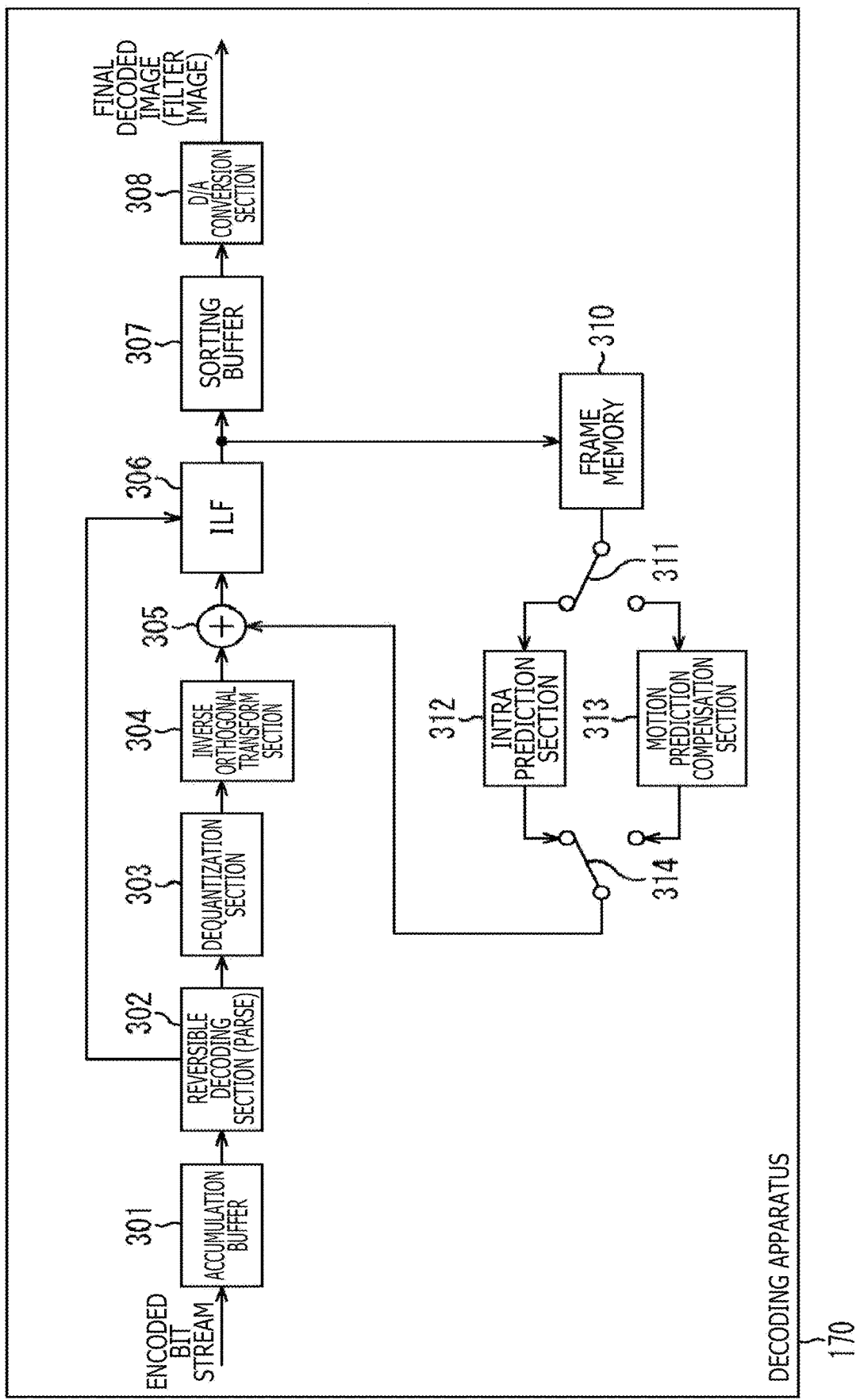
FIG. 25 is a block diagram depicting an example of a detailed configuration of the decoding apparatus 170.

FIG. 25 is a block diagram depicting an example of a detailed configuration of the decoding apparatus 170 of FIG. 19.

Referring to FIG. 25, the decoding apparatus 170 includes an accumulation buffer 301, a reversible decoding section 302, a dequantization section 303, an inverse orthogonal transform section 304, an arithmetic section 305, an ILF 306, a sorting buffer 307, and a D/A conversion section 308. The decoding apparatus 170 further includes a frame memory 310, a selection unit 311, an intra prediction section 312, a motion prediction compensation section 313, and a selection section 314.

The accumulation buffer 301 temporarily accumulates an encoded bit stream transmitted thereto from the encoding apparatus 160 and supplies the encoded bit stream to the reversible decoding section 302 at a predetermined timing.

The reversible decoding section 302 receives the encoded bit stream from the accumulation buffer 301 and decodes the encoded bit stream by a method corresponding to the encoding method of the reversible encoding section 206 of FIG. 22.

Then, the reversible decoding section 302 supplies quantization coefficients as encoded data included in a result of the decoding of the encoded bit stream to the dequantization section 303.

Further, the reversible decoding section 302 has a function for performing parsing. The reversible decoding section 302 parses necessary encoded information and filter information included in the decoding result of the encoded bit stream and supplies the encoded information to the intra prediction section 312, the motion prediction compensation section 313, and other associated blocks. Further, the reversible decoding section 302 supplies the filter information to the ILF 306.

The dequantization section 303 dequantizes the quantization coefficients as the encoded data from the reversible decoding section 302 by a method corresponding to the quantization method of the quantization section 205 of FIG. 22 and supplies orthogonal transform coefficients obtained by the dequantization to the inverse orthogonal transform section 304.

The inverse orthogonal transform section 304 inversely orthogonally transforms the orthogonal transform coefficients supplied from the dequantization section 303 by a method corresponding to the orthogonal transform method of the orthogonal transform section 204 of FIG. 22, and supplies a residual obtained as a result of the inverse orthogonal transform to the arithmetic section 305.

To the arithmetic section 305, not only the residual is supplied from the inverse orthogonal transform section 304 but also the prediction image is supplied from the intra prediction section 312 or the motion prediction compensation section 313 through the selection section 314.

the arithmetic section 305 adds the residual from the inverse orthogonal transform section 304 and the prediction image from the selection section 314 to generate a decoded image and supplies the decoded image to the ILF 306.

The ILF 306 is configured similarly, for example, to the classification prediction filter 110 without a learning function (FIG. 17) and functions, by performing a filter process as a classification prediction process, as one or two or more filters from among a deblocking filter, an adaptive offset filter, a bilateral filter and an ALF similarly to the ILF 211 of FIG. 22.

The ILF 306 successively selects pixels of the decoded image from the arithmetic section 305 as a pixel of interest. The ILF 306 performs classification of the frequency distribution method regarding the pixel of interest to obtain a class of the pixel of interest. Further, the ILF 306 acquires tap coefficients of the class of the pixel of interest among tap coefficients for individual classes as filter information supplied from the reversible decoding section 302. Then, the ILF 306 selects pixels in the proximity of the pixel of interest as prediction taps from within the decoded image and performs a filter process as a prediction process of applying, to the decoded image, a prediction formula for performing product sum calculation of the tap coefficients of the class of the pixel of interest and pixels of the decoded image as the prediction taps to generate and output a filter image. It is to be noted that, similarly as in the ILF 211, it is possible to adopt, in the classification by the ILF 306, a class obtained, for example, by classification of the left upper pixel among the 2×2 pixels as classes individually of the 2×2 pixels.

The filter image outputted from the ILF 306 is an image similar to a filter image outputted from the ILF 211 of FIG. 22 and is supplied to the sorting buffer 307 and the frame memory 310.

The sorting buffer 307 temporarily stores the filter image supplied from the ILF 306 and sorts the arrangement of frames (pictures) of the filter image from an encoding (decoding) order to a displaying order, and then supplies the sorted filter image to the D/A conversion section 308.

The D/A conversion section 308 D/A converts the filter image supplied from the sorting buffer 307 and outputs the resulting filter image to a display not depicted so as to be displayed.

The frame memory 310 temporarily stores the filter image supplied from the ILF 306. Further, the frame memory 310 supplies the filter image as a reference image to be used for generation of a prediction image to the selection unit 311 at a predetermined timing or on the basis of an external request from the intra prediction section 312, the motion prediction compensation section 313, or the like.

The selection unit 311 selects a supplying destination of the reference image supplied from the frame memory 310. In the case where an intra encoded image is to be decoded, the selection unit 311 supplies the reference image supplied from the frame memory 310 to the intra prediction section 312. However, in the case where an inter encoded image is to be decoded, the selection unit 311 supplies the reference image supplied from the frame memory 310 to the motion prediction compensation section 313.

The intra prediction section 312 performs intra prediction using the reference image supplied from the frame memory 310 through the selection unit 311 in an intra prediction mode used by the intra prediction section 214 of FIG. 22 in accordance with the prediction mode included in the encoded information supplied from the reversible decoding section 302. Then, the intra prediction section 312 supplies a prediction image obtained by the intra prediction to the selection section 314.

The motion prediction compensation section 313 performs inter-prediction using the reference image supplied from the frame memory 310 through the selection unit 311 in an inter-prediction mode used by the motion prediction compensation section 215 of FIG. 22 in accordance with the prediction mode included in the encoded information supplied from the reversible decoding section 302. The inter-prediction is performed using the motion information and so forth included in the encoded information supplied from the reversible decoding section 302 as occasion demands.

The motion prediction compensation section 313 supplies a prediction image obtained by the inter-prediction to the selection section 314.

The selection section 314 selects the prediction image supplied from the intra prediction section 312 or the prediction image supplied from the motion prediction compensation section 313 and supplies the selected prediction image to the arithmetic section 305.

It is to be noted that, in FIG. 25, the reversible decoding section 302 corresponds to the parsing section 171 of FIG. 19; the blocks from the dequantization section 303 to the arithmetic section 305 correspond to the decoding section 172 of FIG. 19; and the ILF 306 corresponds to the filter section 173 of FIG. 19.

<Decoding Process>

Figure 26:
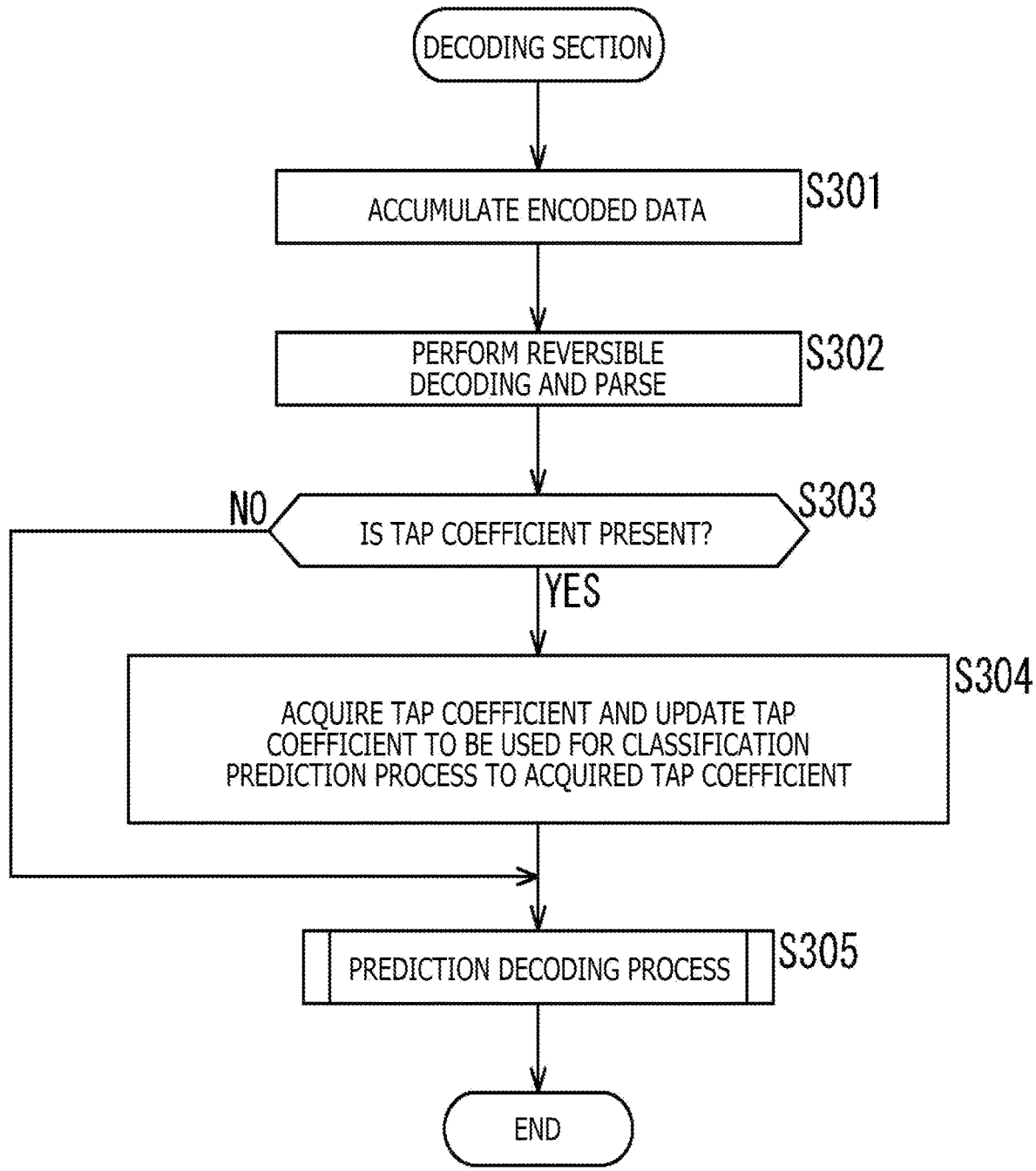
FIG. 26 is a flow chart illustrating an example of a decoding process of the decoding apparatus 170.

FIG. 26 is a flow chart illustrating an example of a decoding process of the decoding apparatus 170 of FIG. 25.

In the decoding process, in step S301, the accumulation buffer 301 temporarily accumulates an encoded bit stream transmitted thereto from the encoding apparatus 160 and suitably supplies the encoded bit stream to the reversible decoding section 302. Then, the processing advances to step S302.

In step S302, the reversible decoding section 302 receives and decodes the encoded bit stream supplied from the accumulation buffer 301 and supplies quantization coefficients as encoded data included in a result of the decoding of the encoded bit stream to the dequantization section 303.

Further, in the case where the result of the decoding of the encoded bit stream includes filter information or encoded information, the reversible decoding section 302 parses the filter information and the encoded information. Then, the reversible decoding section 302 supplies the necessary encoded information to the intra prediction section 312, the motion prediction compensation section 313, and other associated blocks. Further, the reversible decoding section 302 supplies the filter information to the ILF 306.

Thereafter, the processing advances from step S302 to step S303, in which the ILF 306 decides whether or not tap coefficients for individual classes as the filter information have been supplied from the reversible decoding section 302.

In the case where it is decided in step S303 that tap coefficients for individual classes as filter information have not been supplied, the processing skips step S304 and advances to step S305.

On the other hand, in the case where it is decided in step S303 that tap coefficients for individual classes as filter information have been supplied, the processing advances to step S304, in which the ILF 306 acquires tap coefficients for individual classes as filter information from the reversible decoding section 302. Further, the ILF 306 updates tap coefficients to be used in a classification prediction process with the tap coefficients for the individual classes as the filter information from the reversible decoding section 302.

Then, the processing advances from step S304 to step S305, in which a prediction decoding process is performed, and the decoding process ends therewith.

Figure 27:
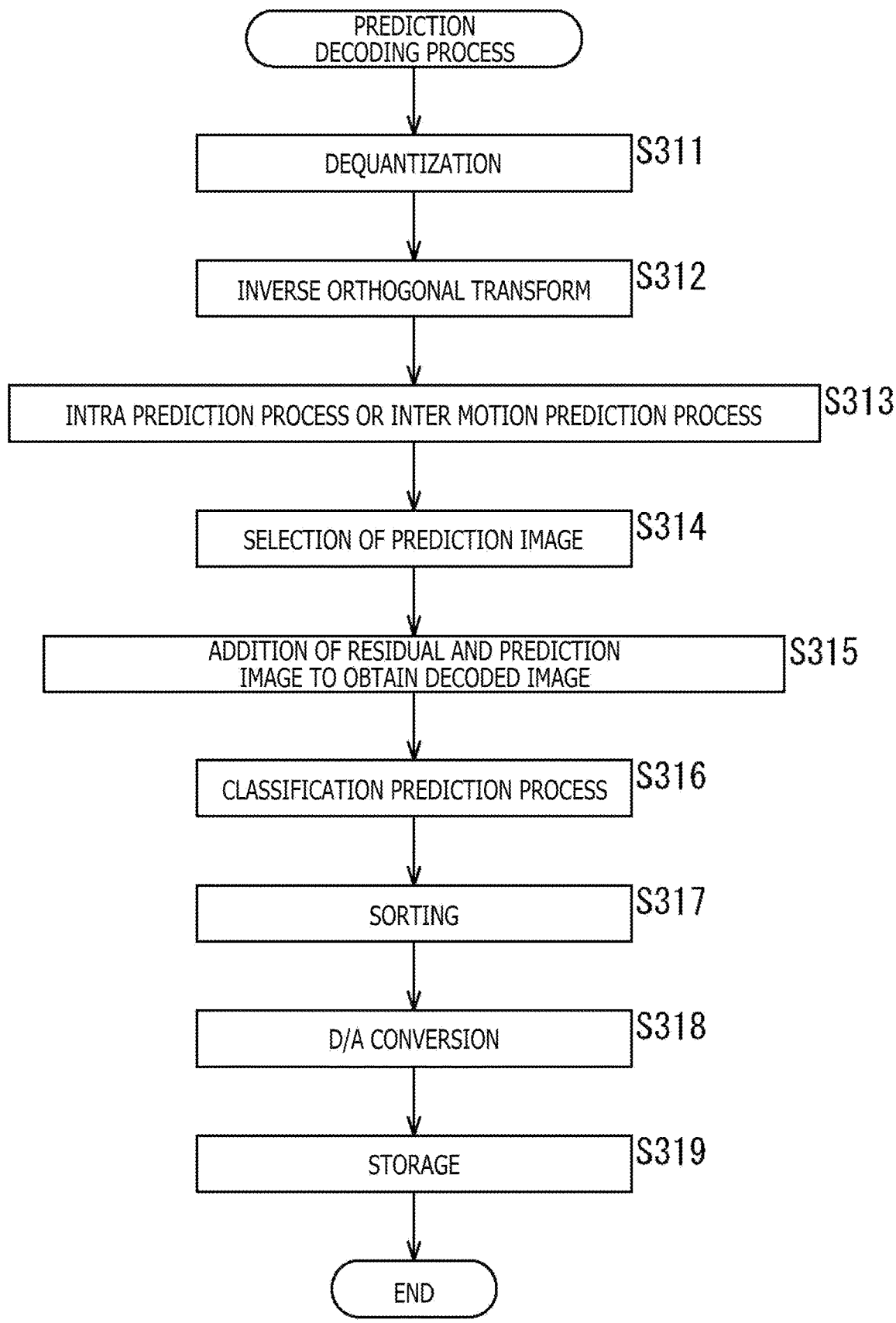
FIG. 27 is a flow chart illustrating an example of a prediction decoding process in step S305.

FIG. 27 is a flow chart illustrating an example of the prediction decoding process in step S305 of FIG. 26.

In step S311, the dequantization section 303 dequantizes quantization coefficients from the reversible decoding section 302 and supplies orthogonal transform coefficients obtained as a result of the dequantization to the inverse orthogonal transform section 304. Then, the processing advances to step S312.

In step S312, the inverse orthogonal transform section 304 performs inverse orthogonal transform of the orthogonal transform coefficients from the dequantization section 303 and supplies a residual obtained as a result of the inverse orthogonal transform to the arithmetic section 305. Then, the processing advances to step S313.

In step S313, the intra prediction section 312 or the motion prediction compensation section 313 performs an intra prediction process or an inter motion prediction process for generating a prediction image using a reference image supplied from the frame memory 310 through the selection unit 311 and encoded information supplied from the reversible decoding section 302. Then, the intra prediction section 312 or the motion prediction compensation section 313 supplies a prediction image obtained by the intra prediction process or the inter motion prediction process to the selection section 314, and the processing advances from step S313 to step S314.

In step S314, the selection section 314 selects the prediction image supplied from the intra prediction section 312 or the motion prediction compensation section 313 and supplies the selected prediction image to the arithmetic section 305, and the processing advances to step S315.

In step S315, the arithmetic section 305 adds the residual from the inverse orthogonal transform section 304 and the prediction image from the selection section 314 to generate a decoded image. Then, the arithmetic section 305 supplies the decoded image to the ILF 306, and the processing advances from step S315 to step S316.

In step S316, the ILF 306 performs a filter process as a classification prediction process for the decoded image from the arithmetic section 305 and supplies a filter image obtained by the filter process to the sorting buffer 307 and the frame memory 310. Then, the processing advances from step S316 to step S317.

In the classification prediction process in step S316, a process similar to that by the classification prediction filter 110 (FIG. 17) is performed.

In particular, as described with reference to FIG. 18, the ILF 306 performs classification of the frequency distribution method regarding the pixel of interest of the decoded image from the arithmetic section 305 to obtain a class (final class) of the pixel of interest. Further, the ILF 306 acquires tap coefficients of the class of the pixel of interest from among the tap coefficients for the individual classes updated in step S304 of FIG. 26. Thereafter, the ILF 306 performs, for the decoded image, a filter process as a prediction process of applying a prediction formula configured from the tap coefficients of the class of the pixel of interest to generate a filter image. The filter image is supplied from the ILF 306 to the sorting buffer 307 and the frame memory 310.

In step S317, the sorting buffer 307 temporarily stores the filter image supplied from the ILF 306. Further, the sorting buffer 307 sorts the stored filter image into a displaying order and supplies the sorted filter image to the D/A conversion section 308. Then, the processing advances from step S317 to step S318.

In step S318, the D/A conversion section 308 D/A converts the filter image from the sorting buffer 307, and the processing advances to step S319. The filter image after the D/A conversion is outputted to and displayed on a display not depicted.

In step S319, the frame memory 310 stores the filter image supplied from the ILF 306, and the decoding process ends therewith. The filter image stored in the frame memory 310 is used as a reference image on the basis of which a prediction image is to be generated in the intra prediction process or the inter motion prediction process in step S313.

It is to be noted that the classification prediction filter 110 (FIG. 17) can be applied not only to the ILF 211 and the ILF 306 but also, for example, to an interpolation filter or the like that used for generation of a prediction image by the motion prediction compensation section 215 and the motion prediction compensation section 313 in the encoding apparatus 160 or the decoding apparatus 170.

<Description of Computer to which Present Technology is Applied>

The series of processes described above can be executed not only by hardware but also by software. In the case where the series of processes is executed by software, a program that constructs the software is installed into a computer for exclusive use or the like.

Figure 28:
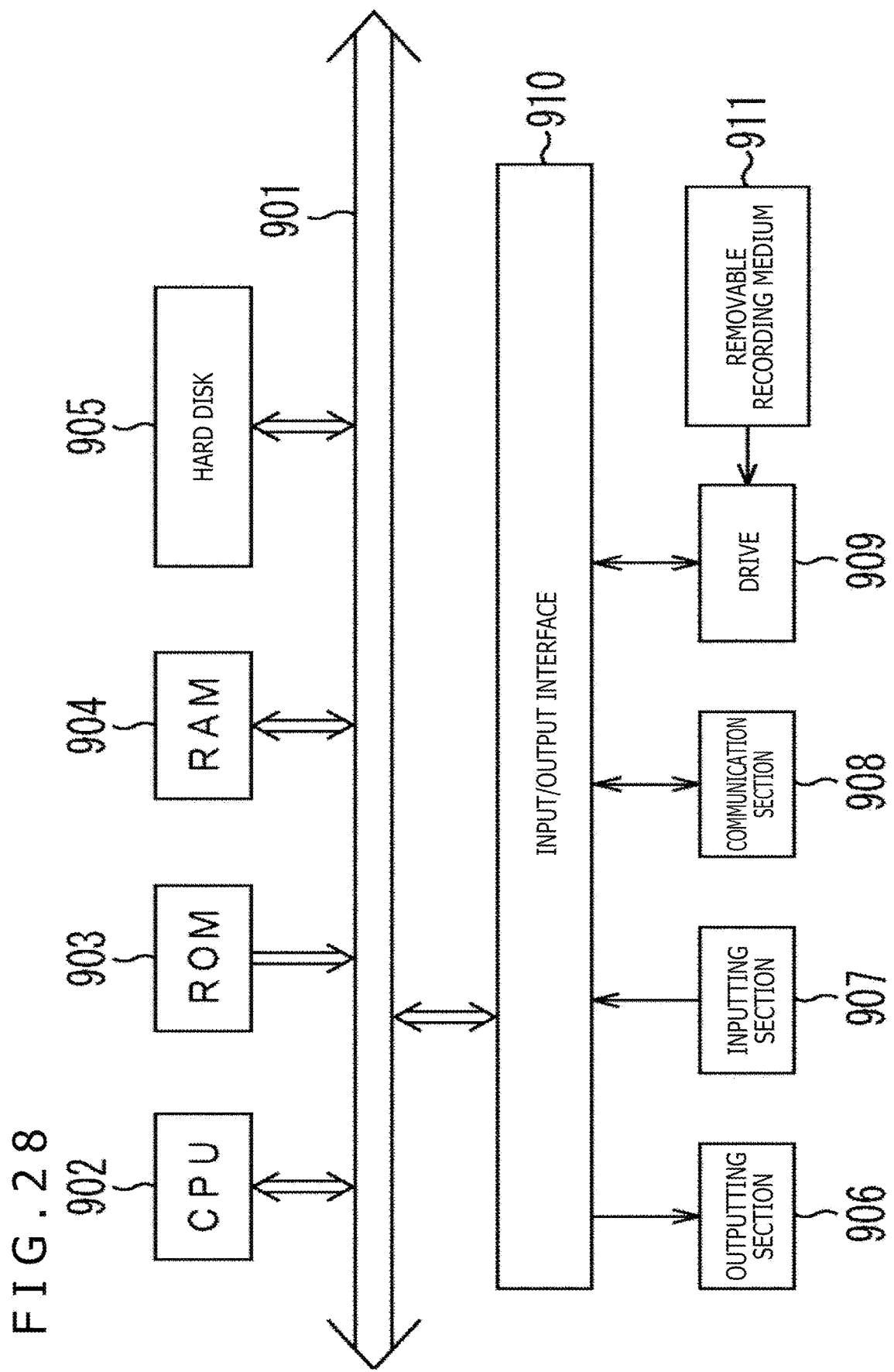
FIG. 28 is a block diagram depicting an example of a configuration of an embodiment of a computer.

FIG. 28 is a block diagram depicting an example of a configuration of an embodiment of a computer into which a program for executing the series of processes described hereinabove is installed.

The program can be recorded in advance into a hard disk 905 or a ROM 903 as a recording medium built in the computer.

Alternatively, it is possible to store (record) the program into a removable recording medium 911 in advance. Such a removable recording medium 911 as just described can be provided as what is called package software. Here, as the removable recording medium 911, for example, a flexible disk, a CD-ROM (Compact Disc Read Only Memory), an MO (Magneto Optical) disk, a DVD (Digital Versatile Disc), a magnetic disk, a semiconductor memory, and so forth are available.

It is to be noted that the program not only can be installed from such a removable recording medium 911 as described above into the computer but also can be downloaded into the computer through a communication network or a broadcasting network and installed into the built-in hard disk 905. In particular, the program can be transferred, for example, by wireless transfer from a download site to the computer through an artificial satellite for digital satellite broadcasting or transferred by wire transfer to the computer through such a network as a LAN (Local Area Network) or the Internet.

The computer has a CPU (Central Processing Unit) 902 built therein, and an input/output interface 910 is connected to the CPU 902 through a bus 901.

If an inputting section 907 is operated by a user to input an instruction to the CPU 902 through the input/output interface 910, then the CPU 902 executes the program stored in the ROM (Read Only Memory) 903 in accordance with the instruction. Alternatively, the CPU 902 loads the program stored on the hard disk 905 into a RAM (Random Access Memory) 904 and executes the program.

Consequently, the CPU 902 performs processing in accordance with the flow charts described hereinabove or processing performed by the configurations of the block diagrams described hereinabove. Then, the CPU 902 causes a result of the processing to be outputted from an outputting section 906, transmitted from a communication section 908, recorded on the hard disk 905 or the like as occasion demands or through the input/output interface 910.

It is to be noted that the inputting section 907 is configured from a keyboard, a mouse, a microphone, and so forth. Meanwhile, the outputting section 906 is configured from an LCD (Liquid Crystal Display), a speaker, and so forth.

Here, in the present specification, the processes performed in accordance with the program by the computer need not necessarily be performed in a time series in accordance with an order described as a flow chart. In other words, processes performed in accordance with the program by the computer include processes that are executed in parallel or individually (for example, processes by parallel processing or by an object).

Further, the program may be a program processed by one computer (processor) or may be a program processed distributedly by a plurality of computers. Further, the program may be a program that is transferred to and executed by a remote computer.

Further, in the present specification, the term system is used to signify an aggregation of a plurality of components (devices, modules (parts), and so forth), and it does not matter whether or not all components are accommodated in the same housing. Accordingly, a plurality of apparatuses accommodated in separate housings and connected to each other through a network is a system, and also one apparatus in which a plurality of modules is accommodated in a single housing is a system.

It is to be noted that the embodiment of the present technology is not restricted to the embodiments described above and can be altered in various manners without departing from the subject matter of the present technology.

For example, the present technology can assume a configuration for cloud computing by which a plurality of apparatuses shares and cooperates for processing through a network.

Further, each of the steps of the flow charts described hereinabove not only can be executed by a single apparatus but also can be shared and executed by a plurality of apparatuses.

Further, in the case where a plurality of processes is included in one step, the plurality of processes included in the one step not only can be executed by one apparatus but also can be shared and executed by a plurality of apparatuses.

Further, the advantageous effects described in the present specification are exemplary to the last and are not restrictive, and other advantageous effects may be available.

<Application Target of Present Technology>

The present technology can be applied to an optional image encoding and decoding method. In particular, specifications of various processes relating to image encoding and decoding such as transform (inverse transform), quantization (dequantization), encoding (decoding), prediction, and so forth are optional unless they conflict with the present technology, and are not restricted to those described hereinabove. Further, part of the processes may be omitted unless they conflict with the present technology.

<Processing Unit>

Data units with which various kinds of information described hereinabove are set and data units that are made a target of the various processes are individually optional and are not restricted to the examples described hereinabove. For example, such information or processes may be set for each TU (Transform Unit), TB (Transform Block), PU (Prediction Unit), PB (Prediction Block), CU (Coding Unit), LCU (Large Coding Unit), sub block, block, tile, slice, picture, sequence or component, or data of such data units may be targeted. Naturally, the data units can be set for each piece of information or for each process, and the data units of all information or all processes need not be unified. It is to be noted that the storage location of such information is optional and may be stored for each of headers, parameter sets or the like of the data units described above. Further, such information may be stored at a plurality of locations.

<Control Information>

The control information relating to the present technology described hereinabove in connection with the embodiments may be transmitted from the encoding side to the decoding side. For example, control information for controlling whether or not it is to be permitted (or inhibited) to apply the present technology described hereinabove (for example, enabled_flag). Further, control information, for example, indicative of a target to which the present technology is to be applied (or a target to which the present technology is not to be applied) may be transmitted. For example, control information that designates a block size (an upper limit or a lower limit or both of them), a frame, a component, a layer or the like to which the present technology is to be applied (or such application is to be permitted or inhibited) may be transmitted.

<Block Size Information>

When to designate a size of a block to which the present technology is to be applied, not only a block size may be designated directly but also a block size may be designated indirectly. For example, identification information for identifying a size may be used to designate a block size. Alternatively, a block size may be designated by a ratio to or a difference from a size of a block to be made a reference (for example, an LCU, an SCU, or the like). For example, in the case where information for designating a block size is transmitted as a syntax element or the like, such information that designates a size indirectly as described above may be used as the information. This sometimes makes it possible to reduce the information amount of the information and improve the encoding efficiency. Further, the designation of a block size includes also designation of a range of the block size (for example, designation of a permissible range for a block size or the like).

<Others>

It is to be noted that the term "flag" in the present specification signifies information for identifying a plurality of states and includes not only information to be used when two states of the true (1) and the false (0) are to be identified but also information capable of identifying three or more states. Accordingly, the value that can be taken by the "flag" may be, for example, two values of 1/0 or may be three values or more. In other words, the bit number configuring the "flag" is optional and may be 1 bit or a plurality of bits. Further, the identification information (including a flag) is assumed to have not only a form in which the identification information is included in a bit stream but also a form in which difference information of the identification information from information that becomes a certain reference is included in a bit stream. Therefore, in the present specification, the "flag" and the "identification information" include not only such information as described above but also difference information of such information from reference information.

REFERENCE SIGNS LIST 10, 20, 30, 40, 50, 60 Classification section, 110 Classification prediction filter, 111 Classification section, 112 Tap coefficient acquisition section, 113 Prediction section, 121 Learning section, 160 Encoding apparatus, 161 Encoding section, 162 Local decoding section, 163 Filter section, 164 Classification section, 170 Decoding apparatus, 171 Parsing section, 172 Decoding section, 173 Filter section, 174 Classification section, 201 A/D conversion section, 202 Sorting buffer, 203 Arithmetic section, 204 Orthogonal transform section, 205 Quantization section, 206 Reversible encoding section, 207 Accumulation buffer, 208 Dequantization section, 209 Inverse orthogonal transform section, 210 Arithmetic section, 211 ILF, 212 Frame memory, 213 Selection section, 214 Intra prediction section, 215 Motion prediction compensation section, 216 Prediction image selection section, 217 Rate controlling section, 301 Accumulation buffer, 302 Reversible decoding section, 303 Dequantization section, 304 Inverse orthogonal transform section, 305 Arithmetic section, 306 ILF, 307 Sorting buffer, 308 D/A conversion section, 310 Frame memory, 311 Selection unit, 312 Intra prediction section, 313 Motion prediction compensation section, 314 Selection section, 901 Bus, 902 CPU, 903 ROM, 904 RAM, 905 Hard disk, 906 Outputting section, 907 Inputting section, 908 Communication section, 909 Drive, 910 Input/output interface, 911 Removable recording medium

The invention claimed is:

1. A decoding apparatus, comprising:
a decoding section configured to decode encoded data included in an encoded bit stream using a filter image to generate a decoded image;
a classification section configured to perform classification of classifying, according to reliability degrees set according to a frequency distribution of inclination directions indicating directions of inclination of pixel values of a plurality of pixels in a frequency distribution generation region that includes a pixel of interest of the decoded image generated by the decoding section, the pixel of interest into any of a plurality of classes; and
a filter section configured to perform a filter process of applying, to the decoded image, a prediction formula for performing product sum calculation of tap coefficients of a class of the pixel of interest obtained by the classification performed by the classification section and pixels of the decoded image to generate the filter image,
wherein the decoding section, the classification section, and the filter section are each implemented via at least one processor.

2. The decoding apparatus according to claim 1, wherein the classification section performs the classification of the pixel of interest according to the inclination direction and the reliability degree of the pixel of interest.

3. The decoding apparatus according to claim 2, wherein the classification section sets an inclination direction of a maximum frequency in the frequency distribution as the inclination direction of the pixel of interest.

4. The decoding apparatus according to claim 2, wherein the classification section generates a frequency distribution of the inclination directions set using, regarding each of the pixels in the frequency distribution generation region, a gradient feature amount indicating an inclination direction of the pixel.

5. The decoding apparatus according to claim 4, wherein the classification section sets the inclination direction set using the gradient feature amounts of the plurality of pixels in a peripheral region of the pixel of interest as the inclination direction of the pixel of interest.

6. The decoding apparatus according to claim 4, wherein the classification section sets, to a frequency of an inclination direction of a pixel nearer to the pixel of interest, a weight greater than that to a frequency of an inclination direction of a pixel farther from the pixel of interest.

7. The decoding apparatus according to claim 4, wherein the classification section uses a value corresponding to a feature amount of an inclination direction of each of the pixels in the frequency distribution generation region as a frequency of the inclination direction.

8. The decoding apparatus according to claim 2, wherein the classification section
generates, regarding each of the pixels in the frequency distribution generation region, a frequency distribution of inclination directions set using a gradient vector indicating an inclination direction of the pixel,
sets an inclination direction of a maximum frequency in the frequency distribution as an inclination direction of the pixel of interest, and
sets a value corresponding to the maximum frequency in the frequency distribution as a reliability degree of the inclination direction of the pixel of interest.

9. The decoding apparatus according to claim 2, wherein the classification section
generates, regarding each of the pixels in the frequency distribution generation region, a frequency distribution of inclination directions set using a gradient vector indicating an inclination direction of the pixel,
sets a direction that maximizes a sum total of inner products with the gradient vectors of the plurality of pixels in a peripheral region of the pixel of interest as an inclination direction of the pixel of interest, and
sets a value corresponding to a frequency of the inclination direction of the pixel of interest in the frequency distribution as a reliability degree of the inclination direction of the pixel of interest.

10. The decoding apparatus according to claim 2, wherein the classification section
generates, regarding each of the pixels in the frequency distribution generation region, a frequency distribution of inclination directions set using activities of a plurality of directions of the pixel,
sets an inclination direction of a maximum frequency in the frequency distribution as an inclination direction of the pixel of interest, and
sets a value corresponding to the maximum frequency in the frequency distribution as a reliability degree of the inclination direction of the pixel of interest.

11. The decoding apparatus according to claim 2, wherein the classification section
generates, regarding each of the pixels in the frequency distribution generation region, a frequency distribution of inclination directions set using activities of a plurality of directions of the pixel,
sets an inclination direction set using the activities of the plurality of directions of a plurality of pixels in a peripheral region of the pixel of interest as an inclination direction of the pixel of interest, and
sets a value corresponding to a frequency of the inclination direction of the pixel of interest in the frequency distribution as a reliability degree of the inclination direction of the pixel of interest.

12. The decoding apparatus according to claim 1, further comprising:
a parsing section configured to parse the tap coefficients included in the encoded bit stream,
wherein the parsing section is implemented via at least one processor.

13. The decoding apparatus according to claim 1, wherein the decoding section decodes the encoded data using a CU (Coding Unit) of Quad-Tree Block Structure or QTBT (Quad Tree Plus Binary Tree) Block Structure as a processing unit.

14. A decoding method, comprising:
decoding encoded data included in an encoded bit stream using a filter image to generate a decoded image;
performing classification of classifying, according to reliability degrees set according to a frequency distribution of inclination directions indicating directions of inclination of pixel values of a plurality of pixels in a frequency distribution generation region that includes a pixel of interest of the decoded image, the pixel of interest into any of a plurality of classes; and
performing a filter process of applying, to the decoded image, a prediction formula for performing product sum calculation of tap coefficients of a class of the pixel of interest obtained by the classification and pixels of the decoded image to generate the filter image.

15. An encoding apparatus, comprising:
a classification section configured to perform classification of classifying, according to a reliability degree set according to a frequency distribution of inclination directions indicating directions of inclination of pixel values of a plurality of pixels in a frequency distribution generation region including a pixel of interest of a decoded image decoded locally, the pixel of interest into any of a plurality of classes;
a filter section configured to perform a filter process of applying, to the decoded image, a prediction formula for performing product sum calculation of tap coefficients of the class of the pixel of interest obtained by the classification performed by the classification section and pixels of the decoded image to generate a filter image; and
an encoding section configured to encode an original image using the filter image generated by the filter section,
wherein the classification section, the filter section, and the encoding section are each implemented via at least one processor.

16. The encoding apparatus according to claim 15, wherein
the classification section performs the classification of the pixel of interest according to the inclination direction and the reliability degree of the pixel of interest.

17. The encoding apparatus according to claim 16, wherein
the classification section sets an inclination direction of a maximum frequency in the frequency distribution as the inclination direction of the pixel of interest.

18. The encoding apparatus according to claim 16, wherein
the classification section generates a frequency distribution of the inclination directions set using, regarding each of the pixels in the frequency distribution generation region, a gradient feature amount indicating an inclination direction of the pixel.

19. The encoding apparatus according to claim 18, wherein
the classification section sets the inclination direction set using the gradient feature amounts of the plurality of pixels in a peripheral region of the pixel of interest as the inclination direction of the pixel of interest.

20. The encoding apparatus according to claim 18, wherein
the classification section sets, to a frequency of an inclination direction of a pixel nearer to the pixel of interest, a weight greater than that to a frequency of an inclination direction of a pixel farther from the pixel of interest.

21. The encoding apparatus according to claim 18, wherein
the classification section uses a value corresponding to a feature amount of an inclination direction of each of the pixels in the frequency distribution generation region.

22. The encoding apparatus according to claim 16, wherein
the classification section
generates, regarding each of the pixels in the frequency distribution generation region, a frequency distribution of inclination directions set using a gradient vector indicating an inclination direction of the pixel,
sets an inclination direction of a maximum frequency in the frequency distribution as an inclination direction of the pixel of interest, and
sets a value corresponding to the maximum frequency in the frequency distribution as a reliability degree of the inclination direction of the pixel of interest.

23. The encoding apparatus according to claim 16, wherein
the classification section
generates, regarding each of the pixels in the frequency distribution generation region, a frequency distribution of inclination directions set using a gradient vector indicating an inclination direction of the pixel,
sets a direction that maximizes a sum total of inner products with the gradient vectors of the plurality of pixels in a peripheral region of the pixel of interest as an inclination direction of the pixel of interest, and
sets a value corresponding to a frequency of the inclination direction of the pixel of interest in the frequency distribution as a reliability degree of the inclination direction of the pixel of interest.

24. The encoding apparatus according to claim 16, wherein
the classification section
generates, regarding each of the pixels in the frequency distribution generation region, a frequency distribution of inclination directions set using activities of a plurality of directions of the pixel,
sets an inclination direction of a maximum frequency in the frequency distribution as an inclination direction of the pixel of interest, and
sets a value corresponding to the maximum frequency in the frequency distribution as a reliability degree of the inclination direction of the pixel of interest.

25. The encoding apparatus according to claim 16, wherein
the classification section
generates, regarding each of the pixels in the frequency distribution generation region, a frequency distribution of inclination directions set using activities of a plurality of directions of the pixel,
sets an inclination direction set using the activities of the plurality of directions of a plurality of pixels in a peripheral region of the pixel of interest as an inclination direction of the pixel of interest, and
sets a value corresponding to a frequency of the inclination direction of the pixel of interest in the frequency distribution as a reliability degree of the inclination direction of the pixel of interest.

26. The encoding apparatus according to claim 15, wherein
the filter section obtains the tap coefficient that minimizes a statistical error of a prediction value of the original image obtained by the prediction expression using the original image and the decoded image, and
the encoding section generates an encoded bit stream including encoded data obtained by encoding the original image and the tap coefficients.

27. The encoding apparatus according to claim 15, wherein
the encoding section encodes the original image using a CU (Coding Unit) of Quad-Tree Block Structure or QTBT (Quad Tree Plus Binary Tree) Block Structure as a processing unit.

28. An encoding method, comprising:
performing classification of classifying, according to a reliability degree set according to a frequency distribution of inclination directions indicating directions of inclination of pixel values of a plurality of pixels in a frequency distribution generation region including a pixel of interest of a decoded image decoded locally, the pixel of interest into any of a plurality of classes;
performing a filter process of applying, to the decoded image, a prediction formula for performing product sum calculation of tap coefficients of the class of the pixel of interest obtained by the classification and pixels of the decoded image to generate a filter image; and
encoding an original image using the filter image.

* * * * *